INVENTORS
T. A. Deakins
J. A. Lasater
S. C. Northington, Jr.
C. J. Bryant
ATTORNEY

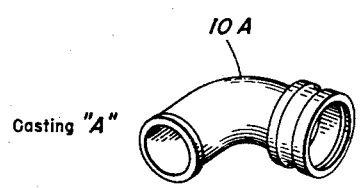
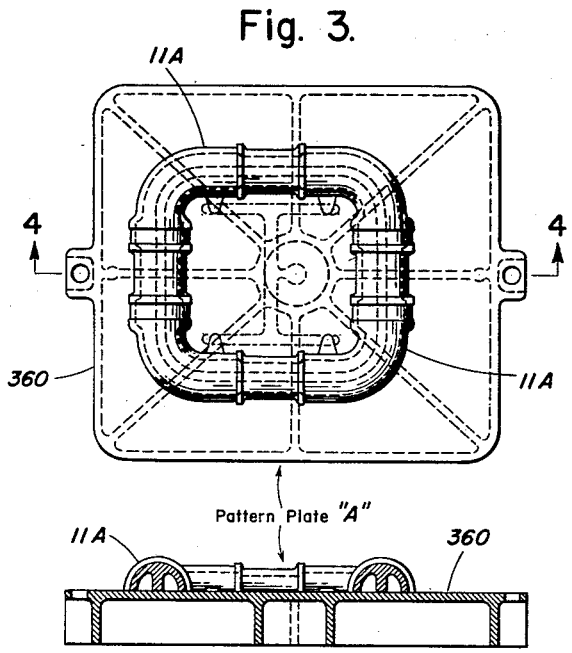
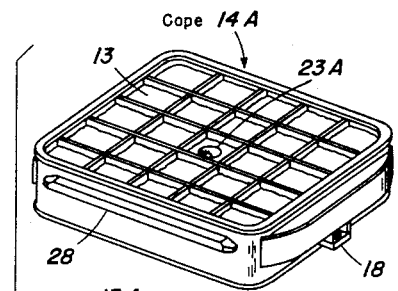
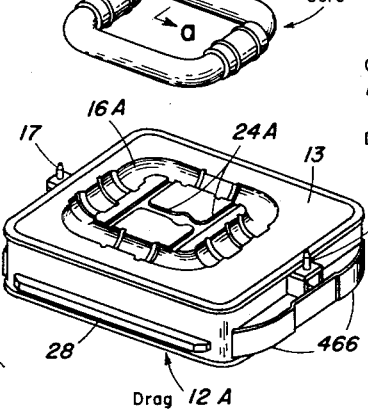
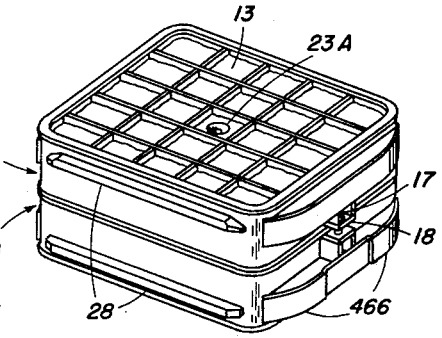

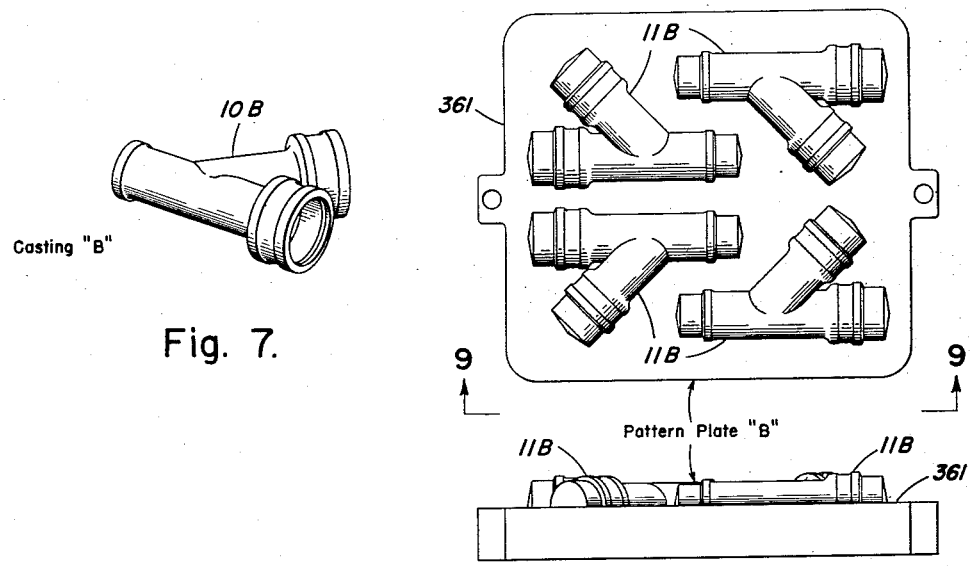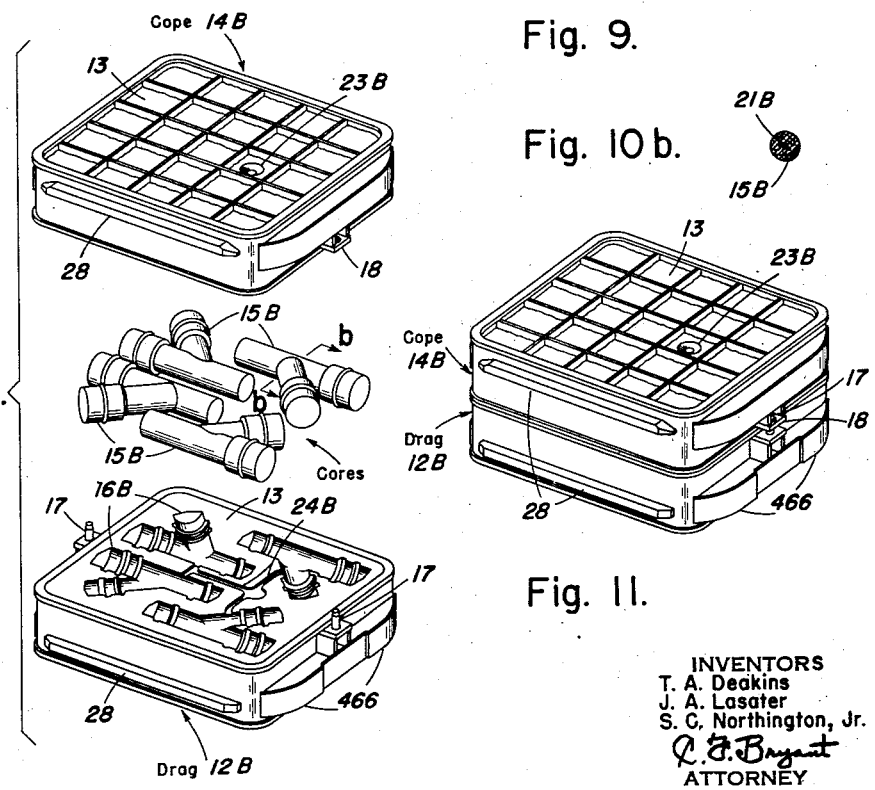

Oct. 18, 1960 T. A. DEAKINS ET AL 2,956,316
MECHANIZED FACILITIES FOR PRODUCING AND ASSEMBLING
FOUNDRY MOLDS OF ALTERNATELY DIFFERING TYPES
Filed April 28, 1958 29 Sheets-Sheet 4
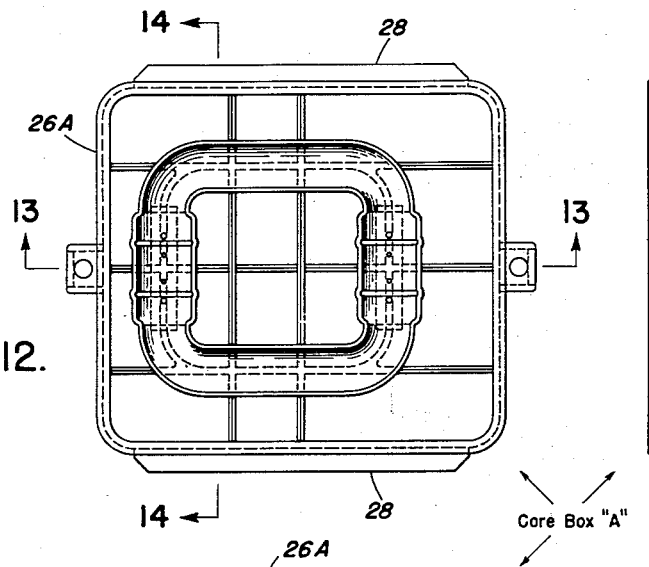
Fig. 12.
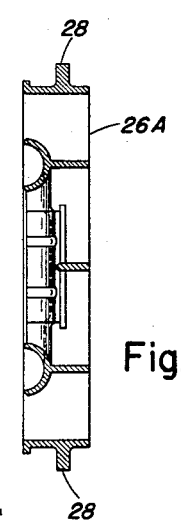
Fig. 14.
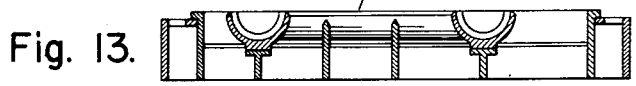
Fig. 13.
Core Box "A"
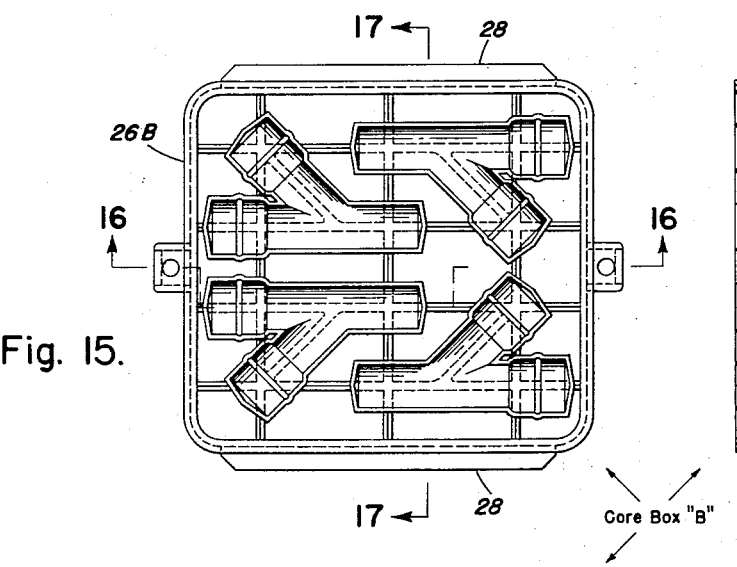
Fig. 15.
Fig. 17.
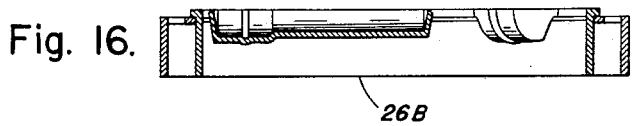
Fig. 16.
Core Box "B"
INVENTORS
T. A. Deakins
J. A. Lasater
S. C. Northington, Jr.
*Q. F. Bryant*
ATTORNEY

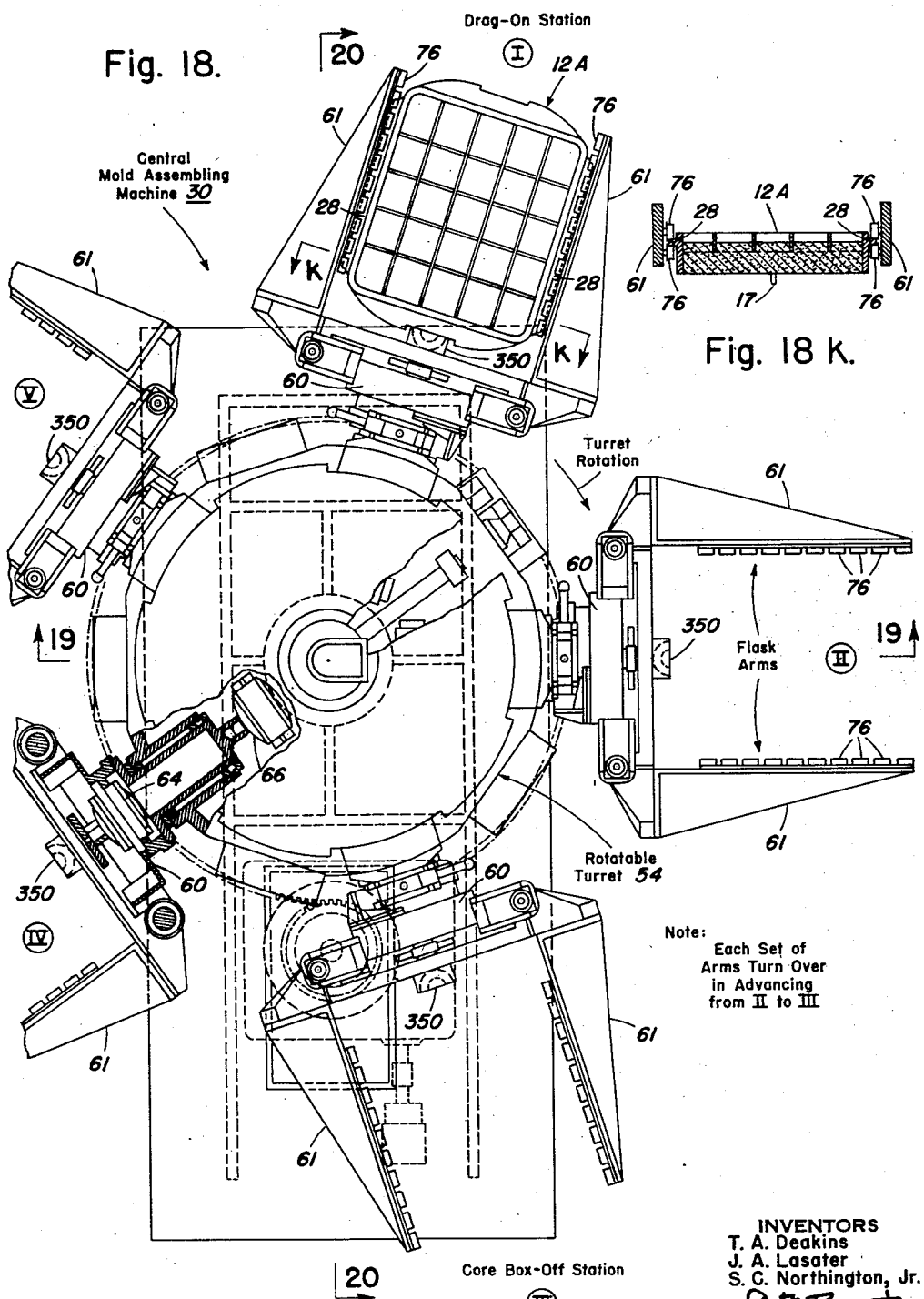

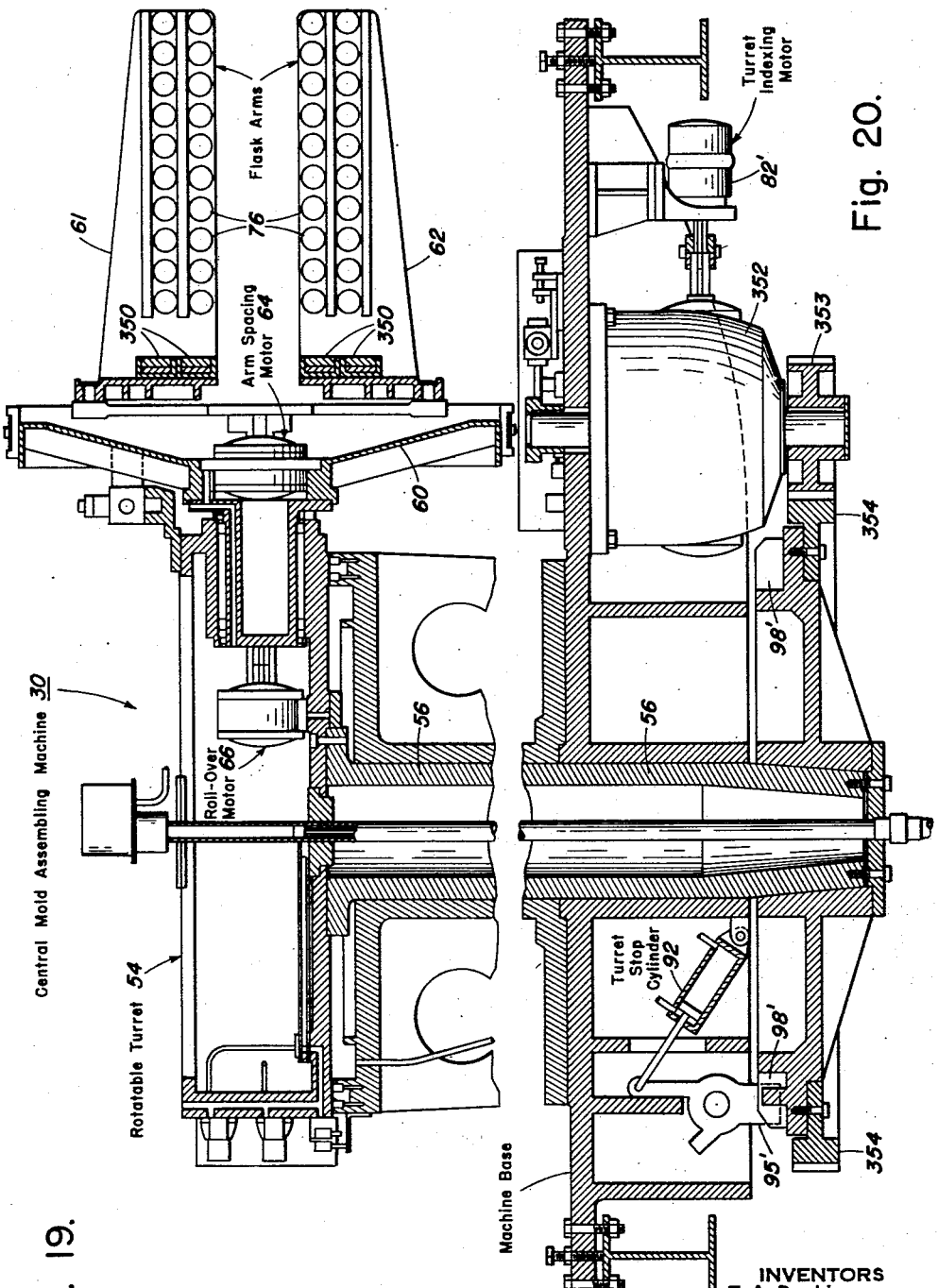

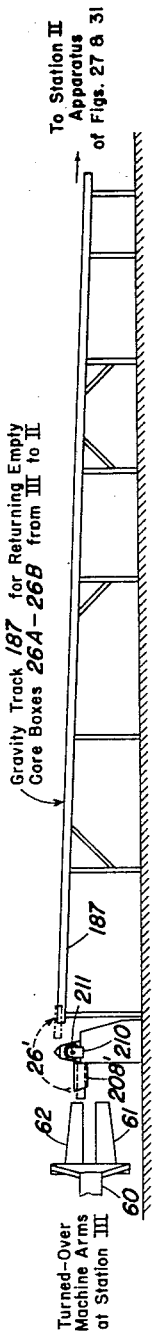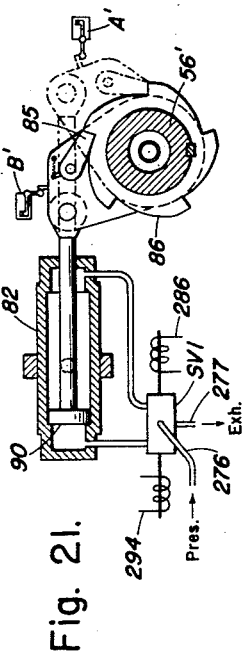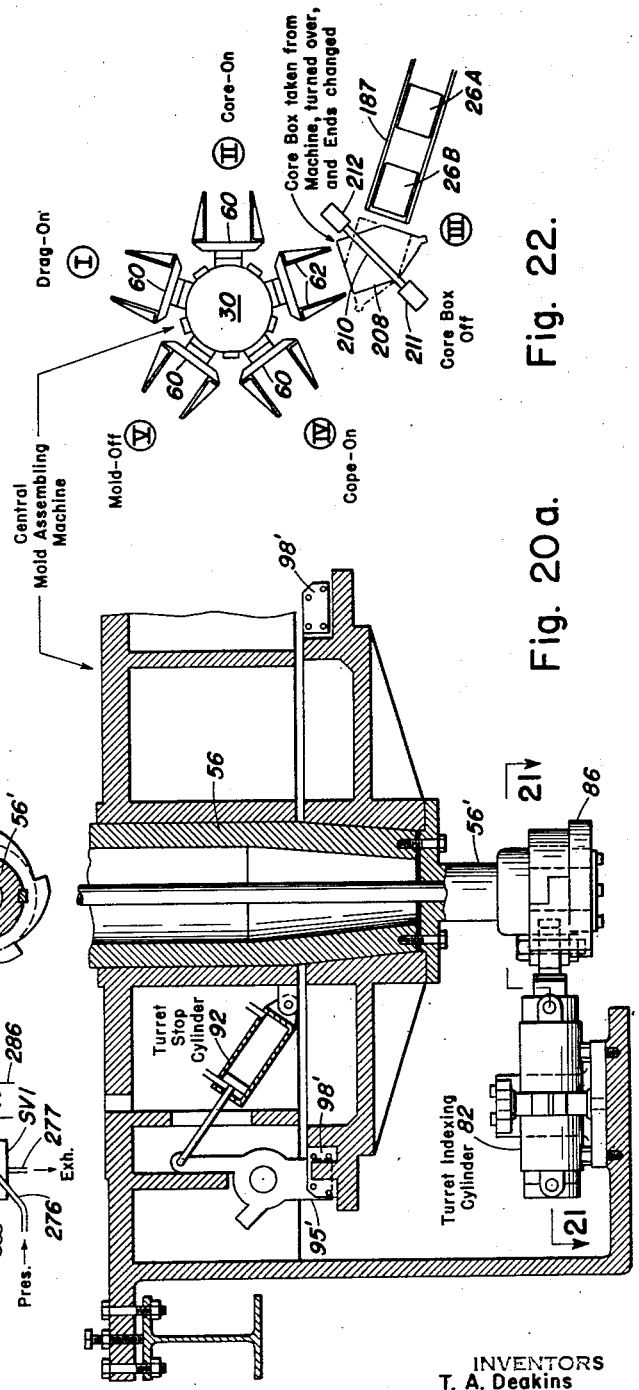

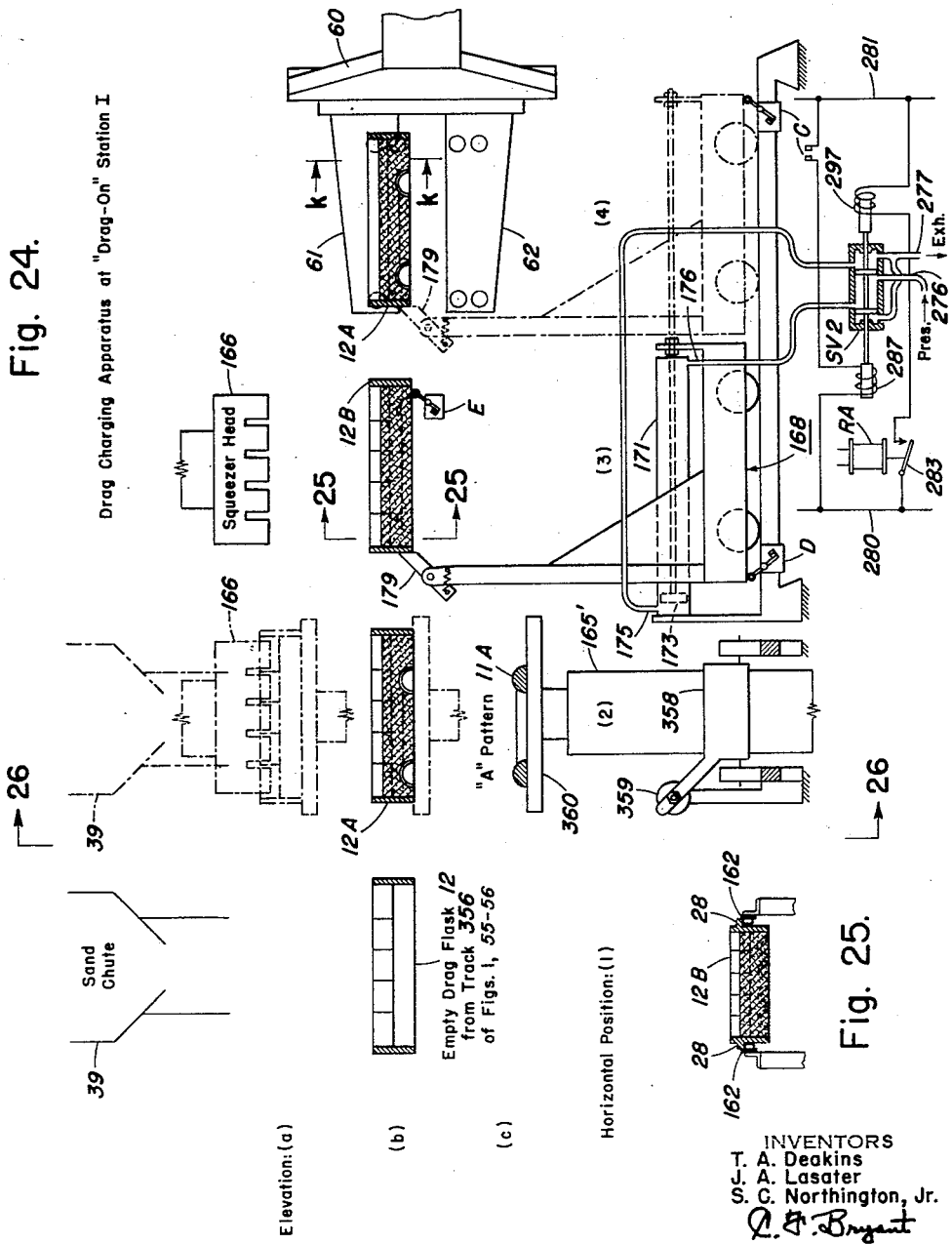

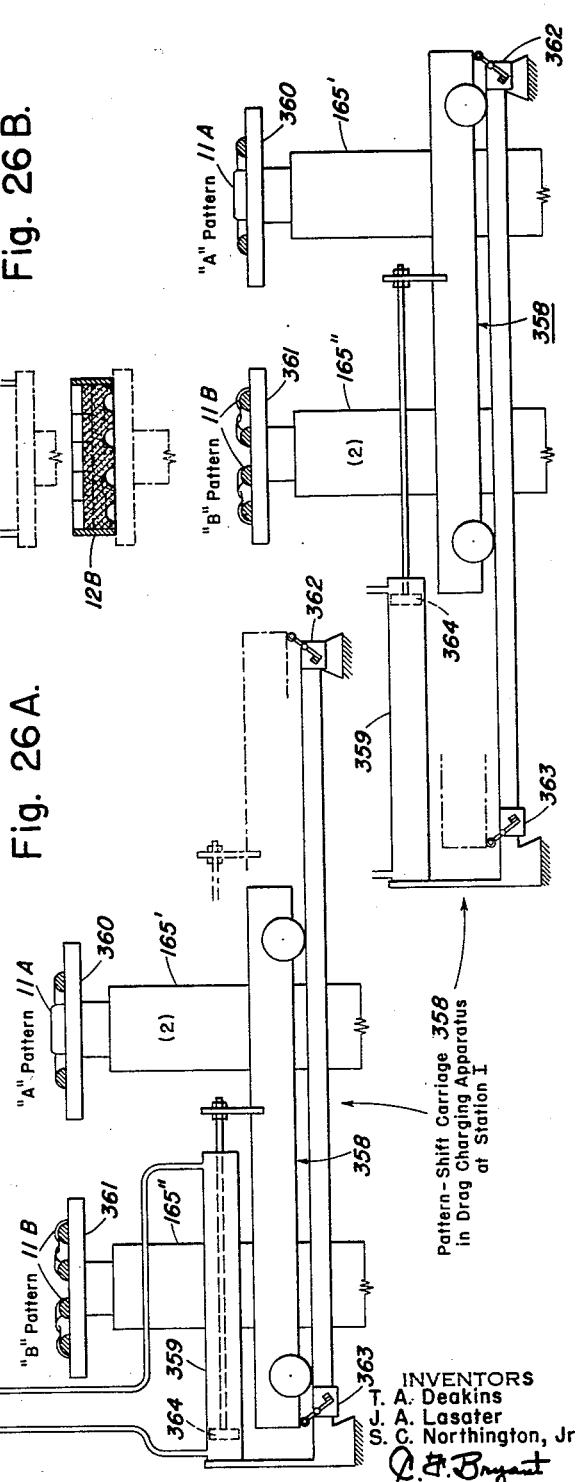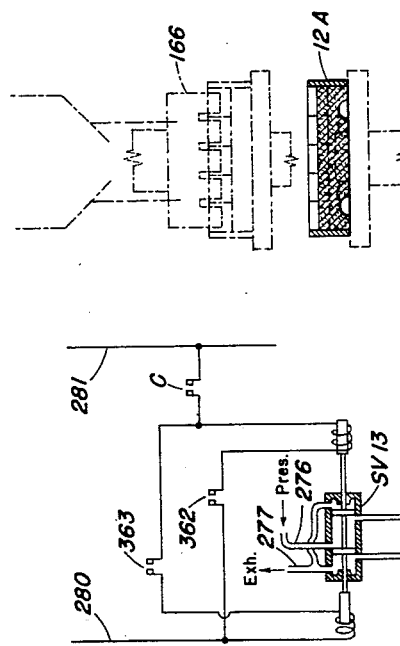

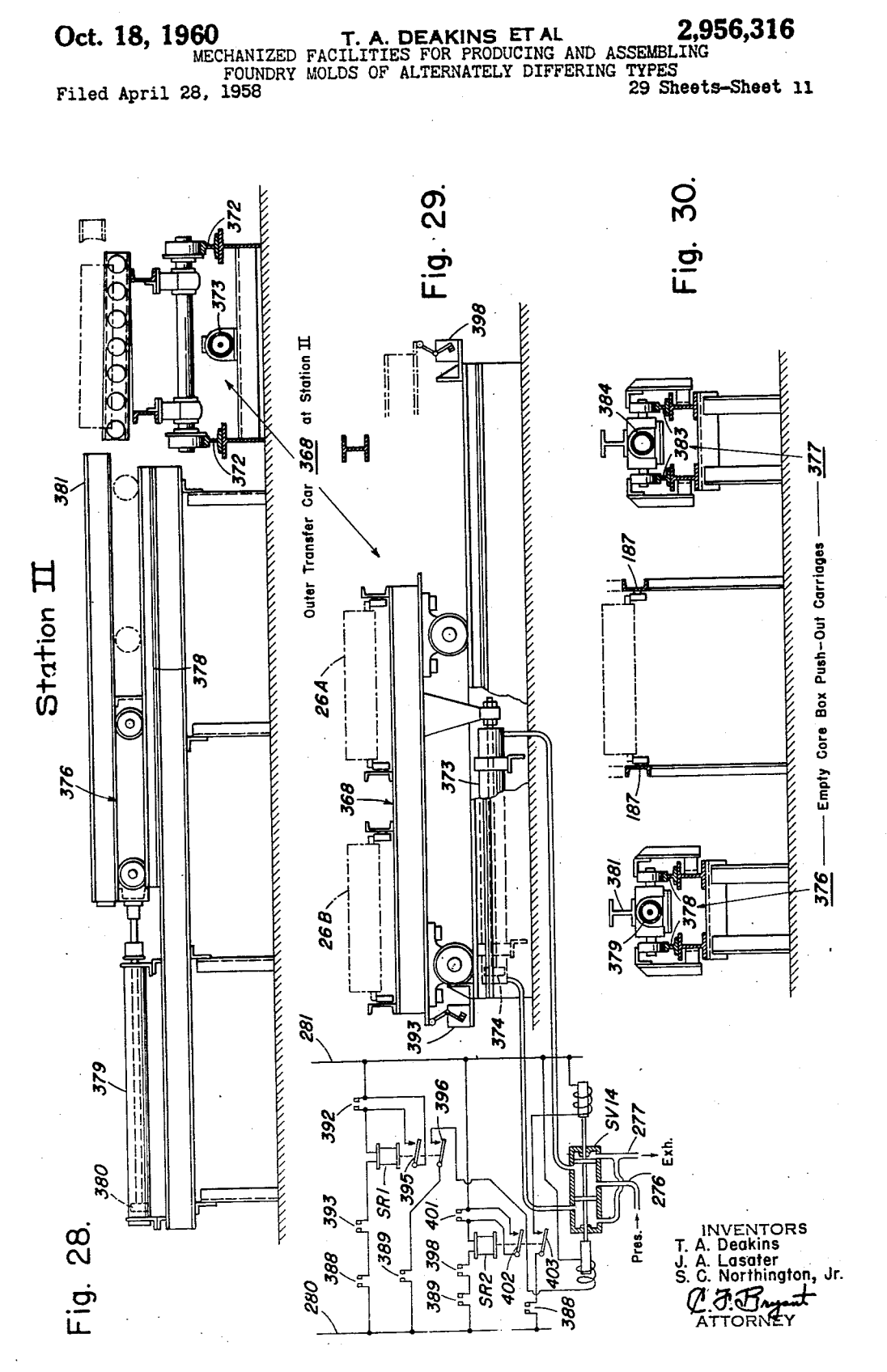

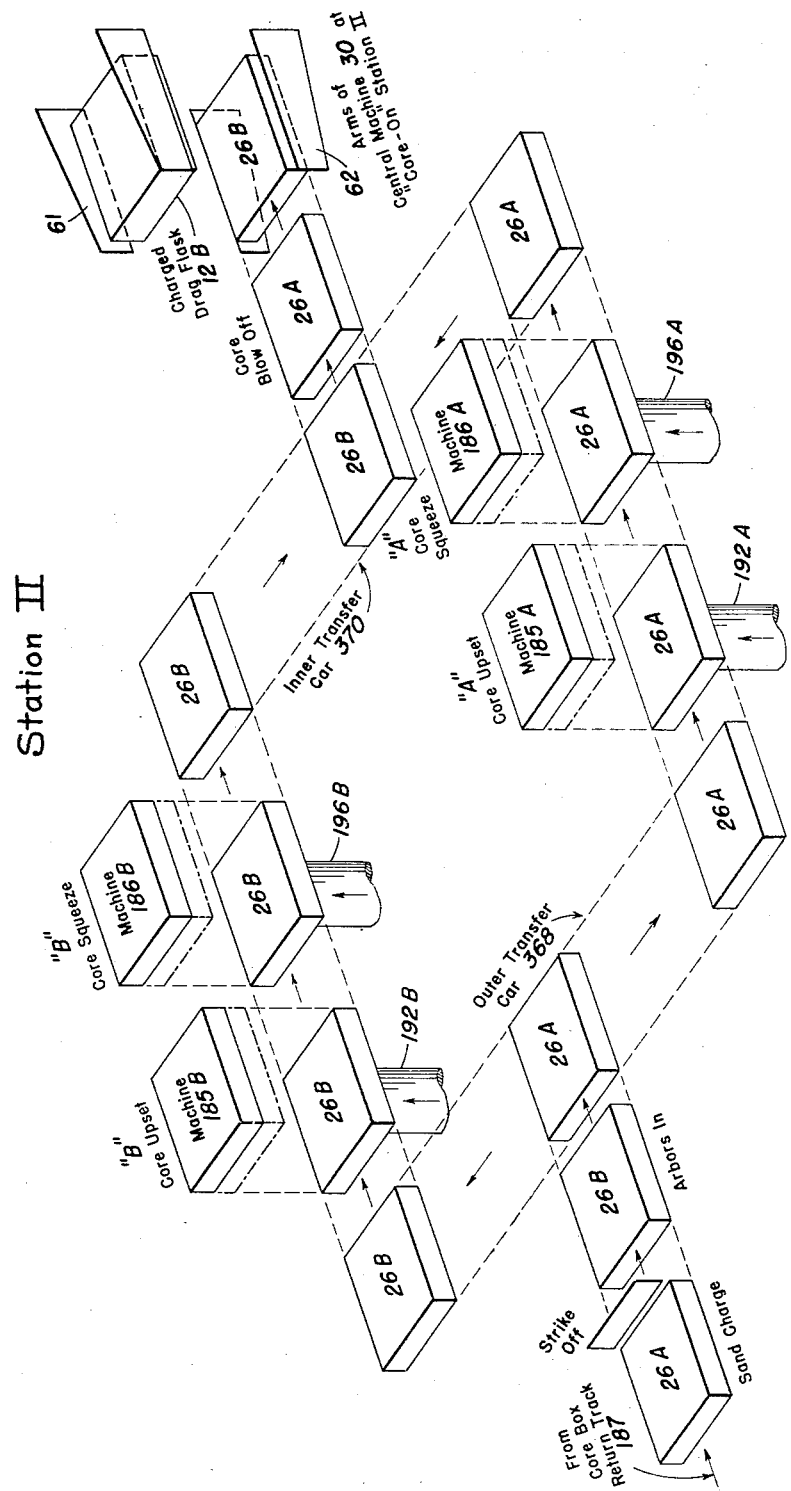

Inner Transfer Car *370* at Station II

Carriage *198'* for Inserting Core Boxes *26A* & *26B* with Cores *15*......into...... Lower Arms of Central Machine at "Core-On" Station II INVENTORS
T. A. Deakins
J. A. Lasater
S. C. Northington, Jr.

ATTORNEY

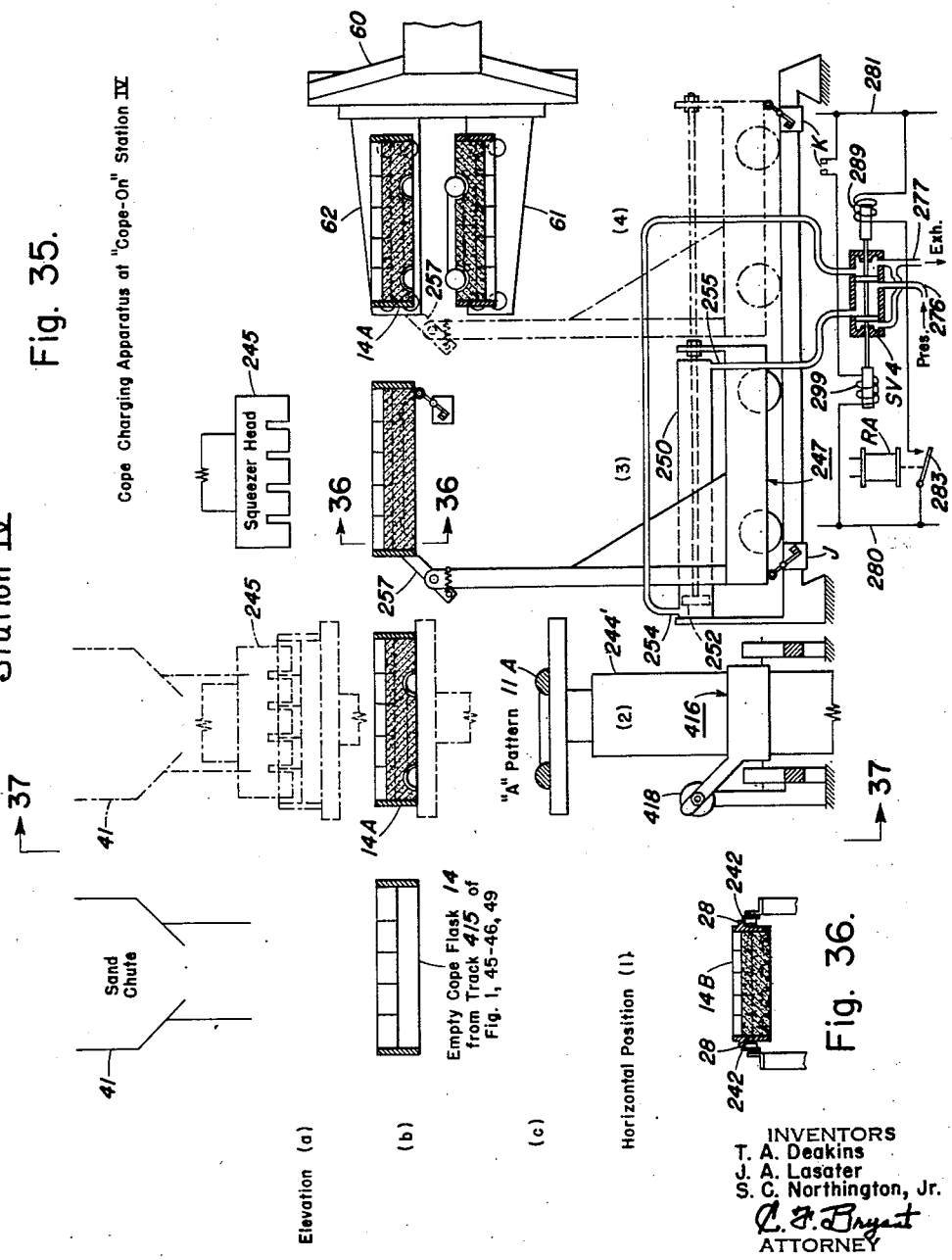

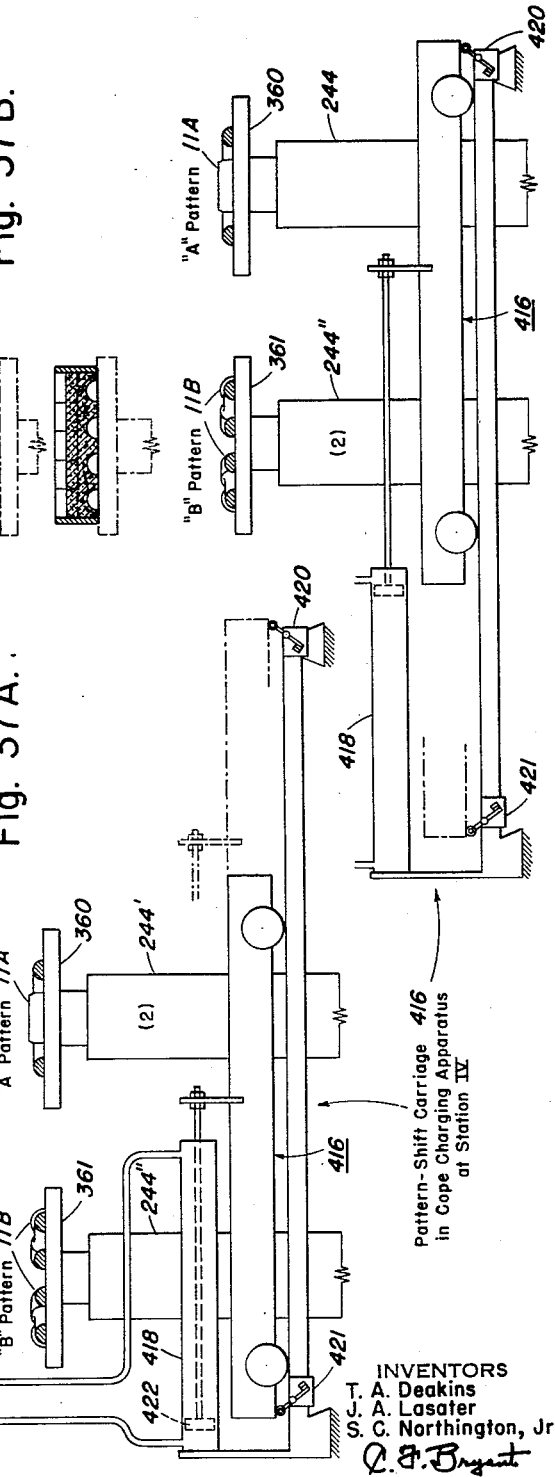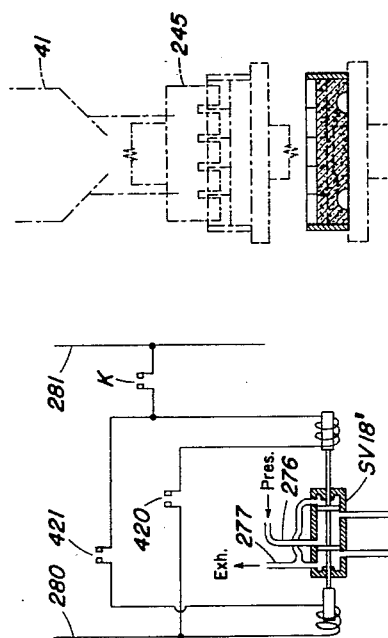

Operation Diagrams for Mold-Off Station V
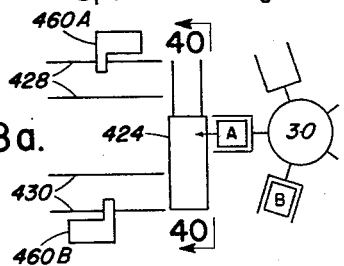
Fig. 38a.
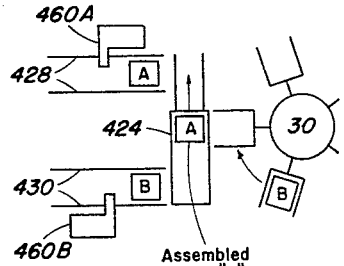
Fig. 38f.
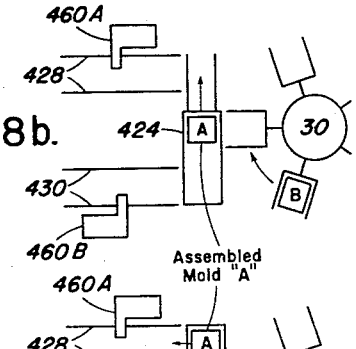
Fig. 38b.
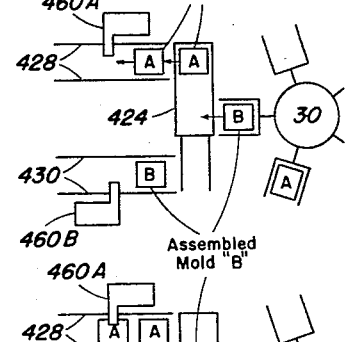
Fig. 38g.
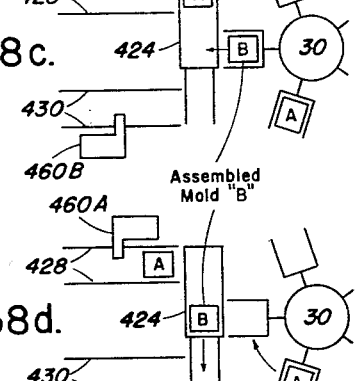
Fig. 38c.
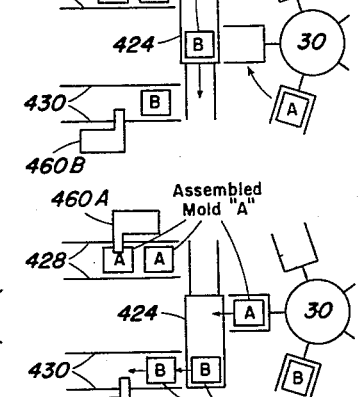
Fig. 38h.
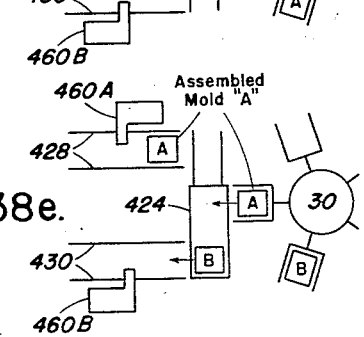
Fig. 38d.
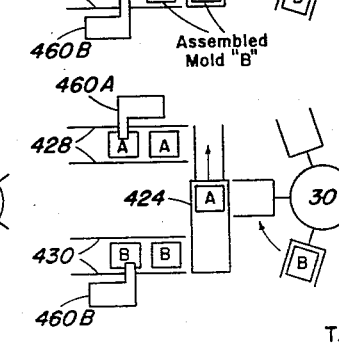
Fig. 38i.
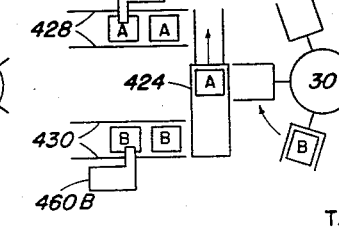
Fig. 38e.
Fig. 38j.
INVENTORS
T. A. Deakins
J. A. Lasater
S. C. Northington, Jr.
ATTORNEY

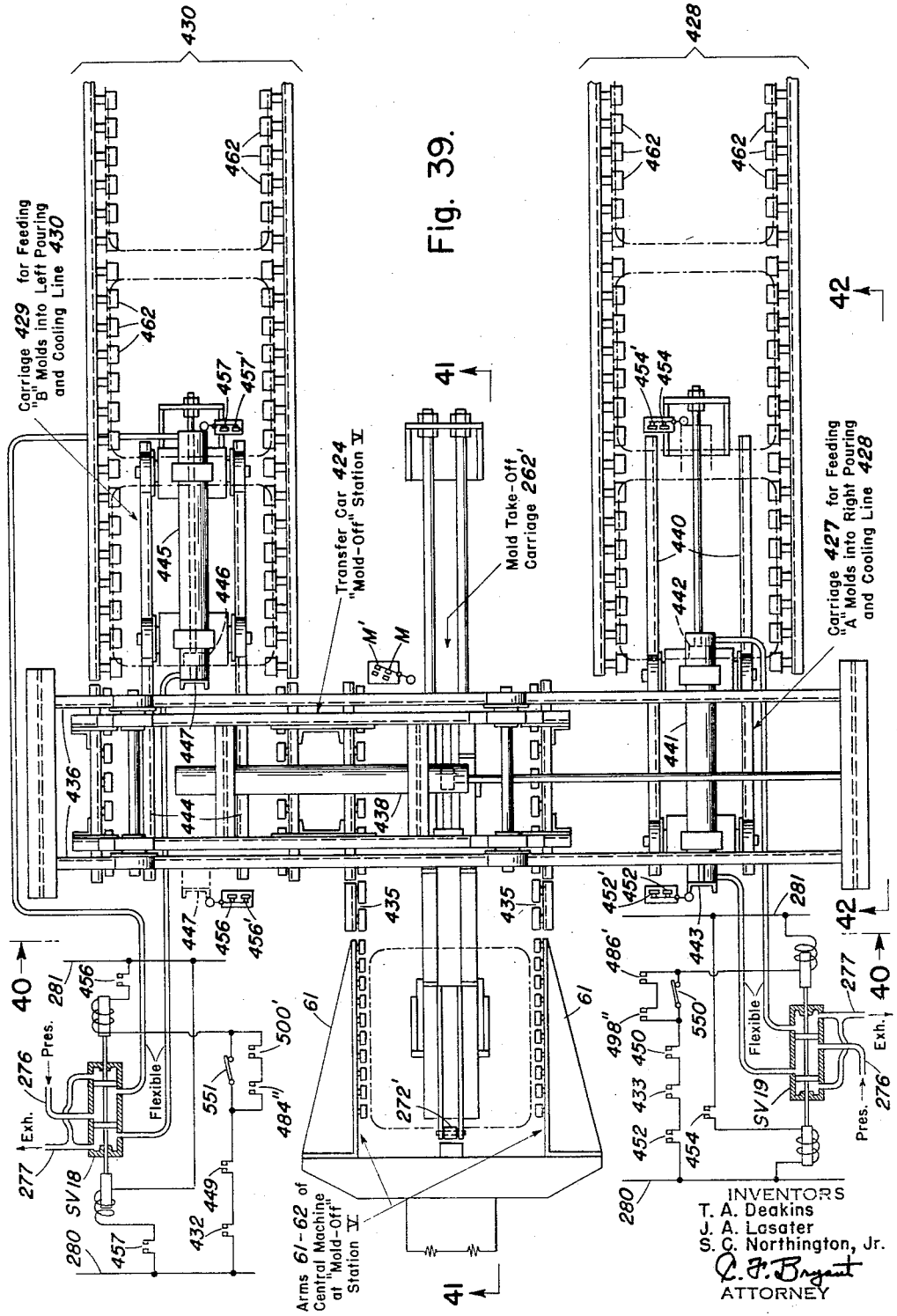

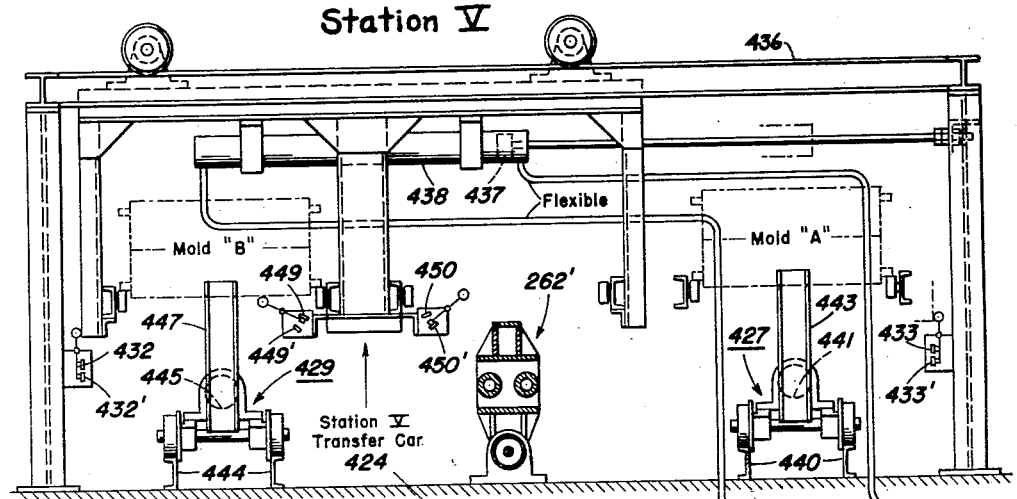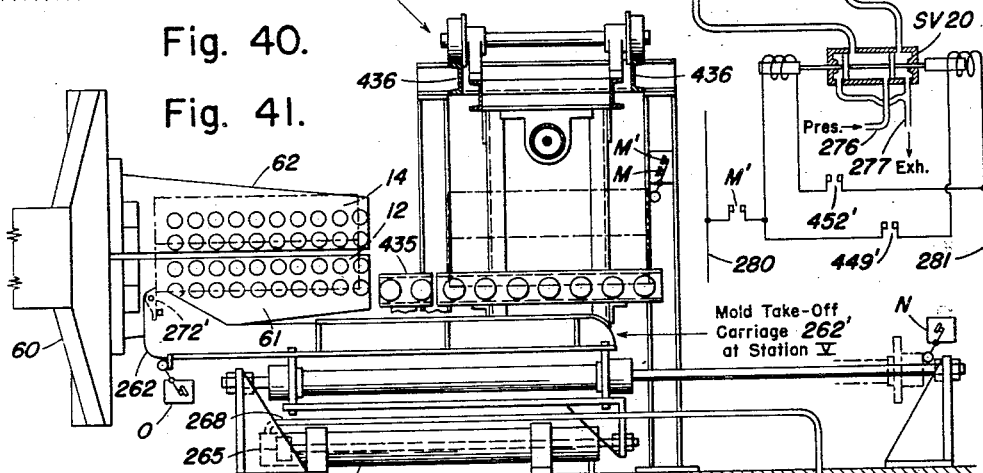

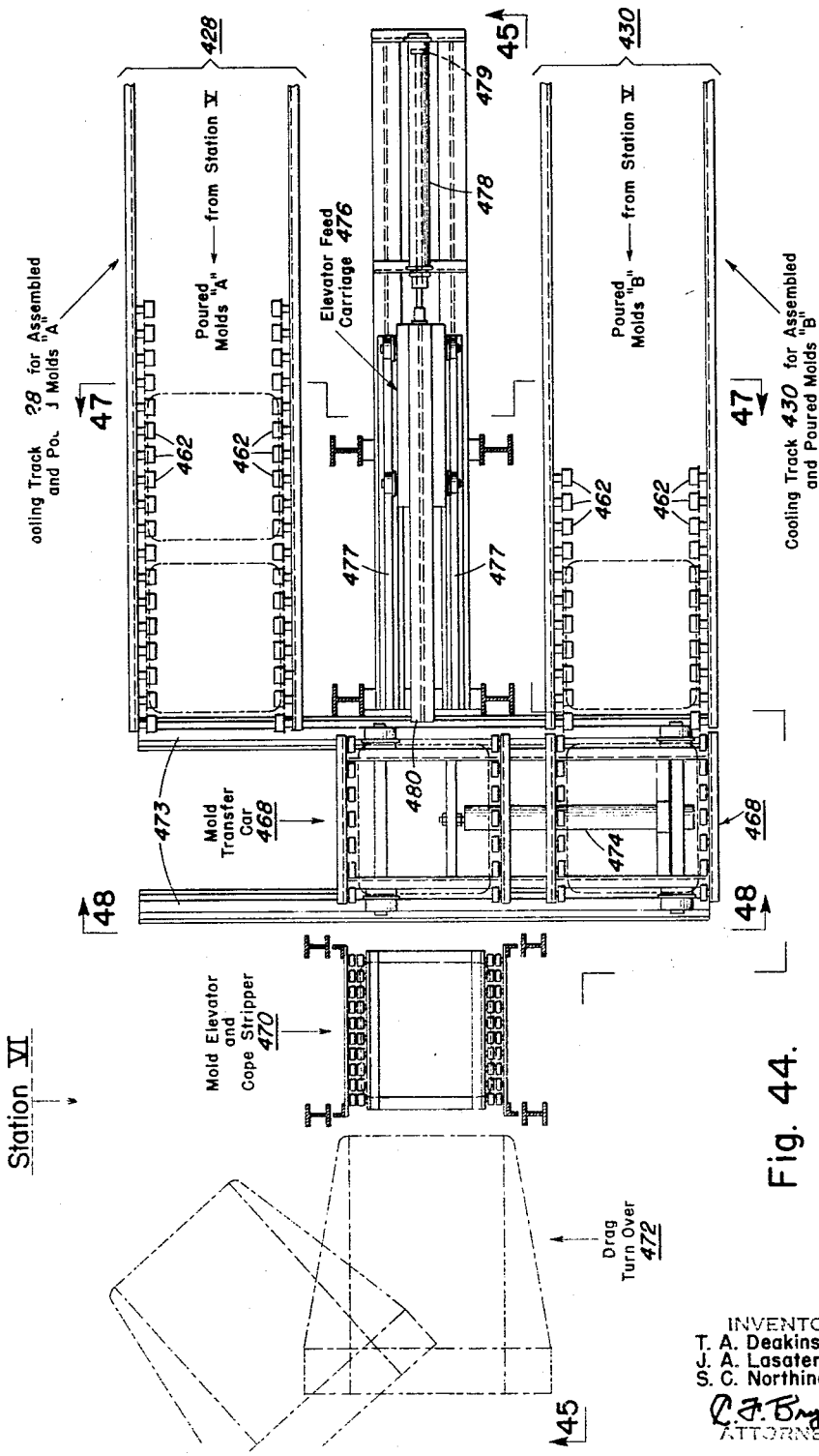

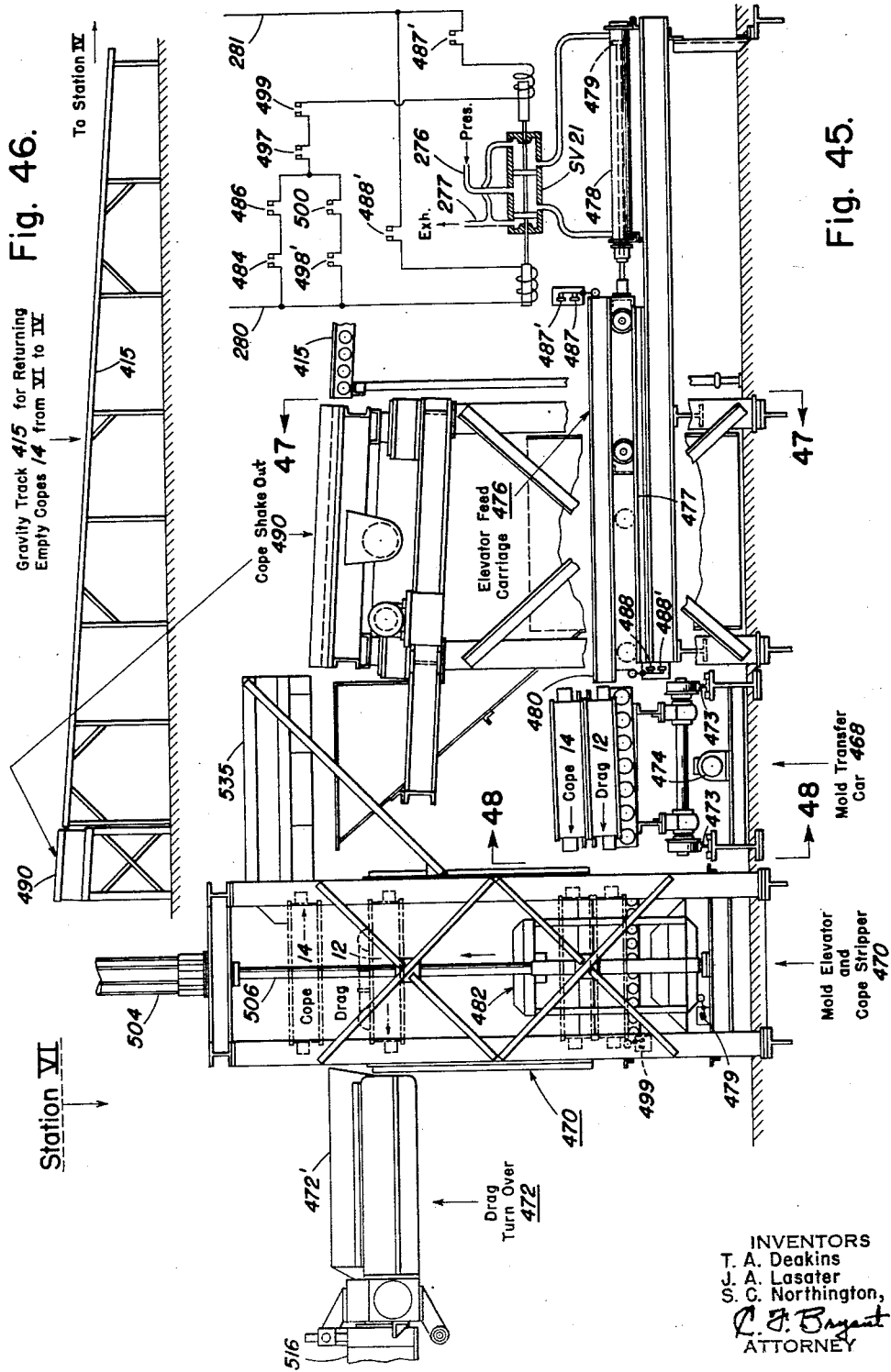

Oct. 18, 1960 T. A. DEAKINS ET AL 2,956,316
MECHANIZED FACILITIES FOR PRODUCING AND ASSEMBLING
FOUNDRY MOLDS OF ALTERNATELY DIFFERING TYPES
Filed April 28, 1958 29 Sheets-Sheet 24

INVENTORS
T. A. Deakins
J. A. Lasater
S. C. Northington, Jr

ATTORNEY

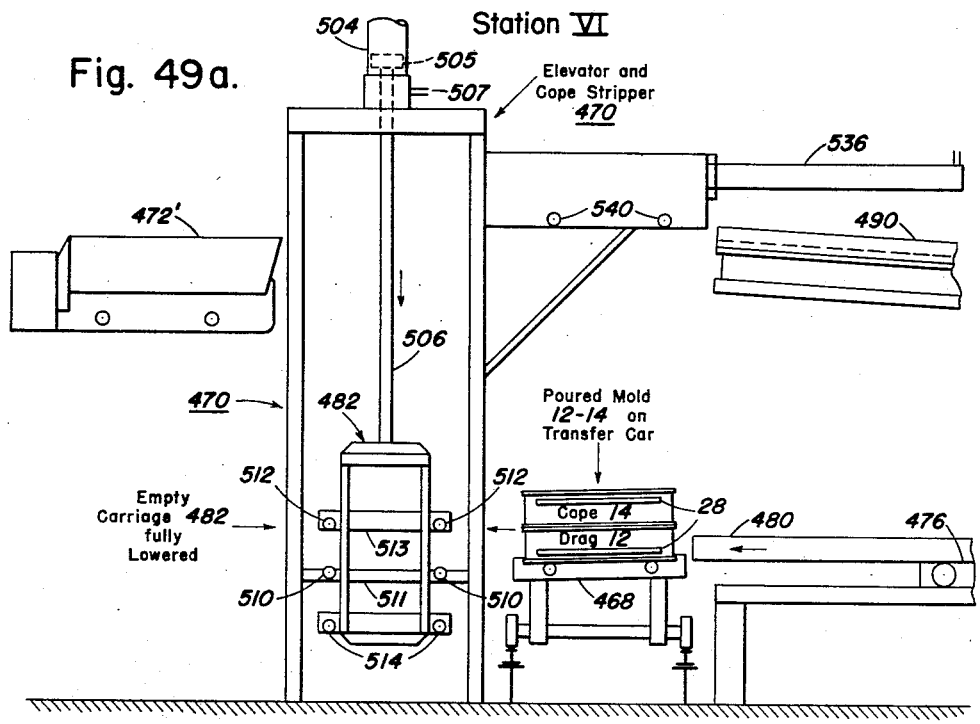
Fig. 49a.
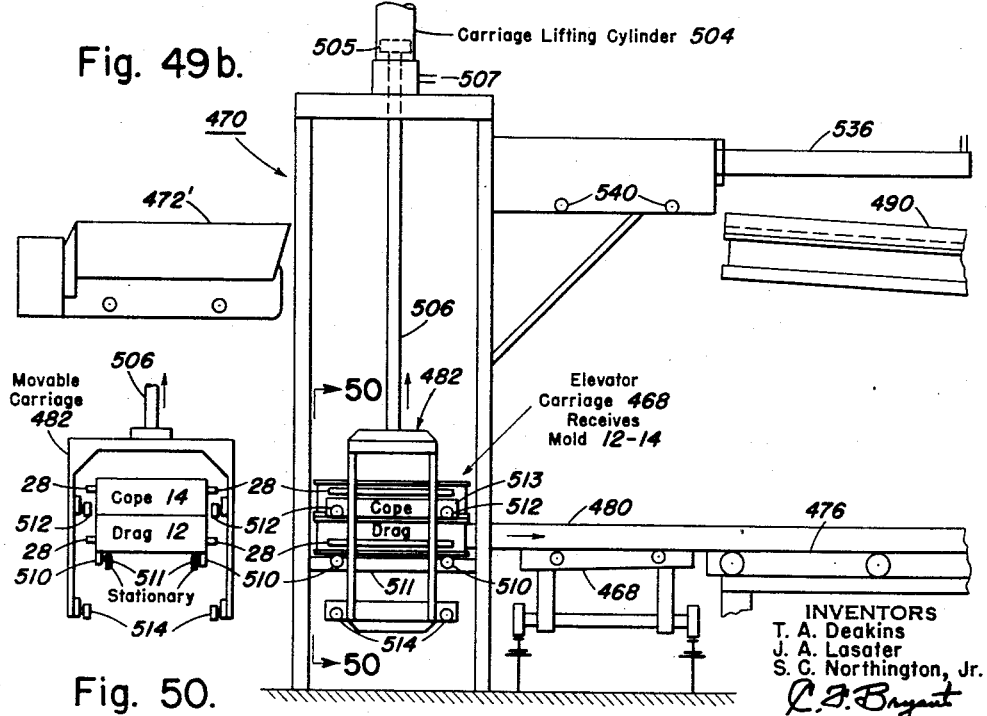
Fig. 49b.
Fig. 50.

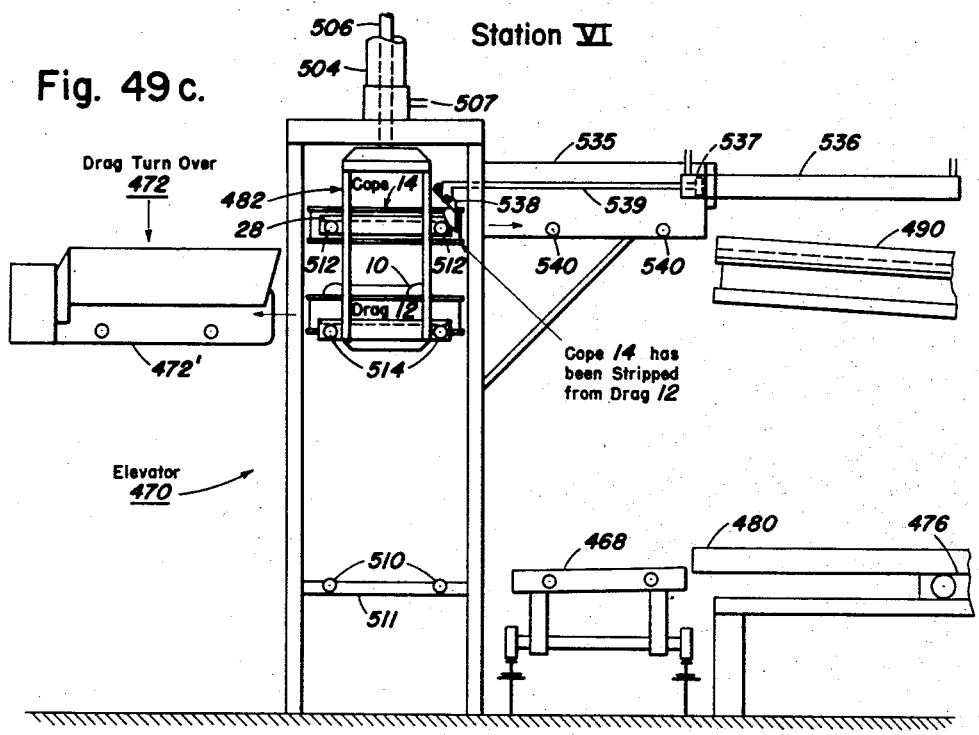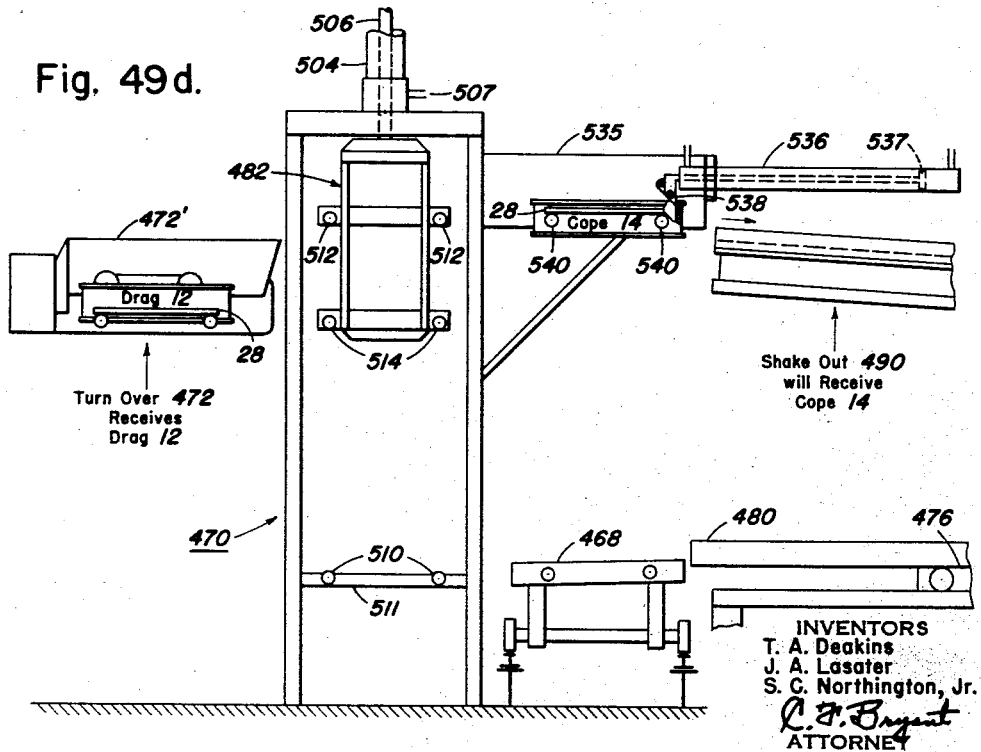

Oct. 18, 1960    T. A. DEAKINS ET AL    2,956,316
MECHANIZED FACILITIES FOR PRODUCING AND ASSEMBLING
FOUNDRY MOLDS OF ALTERNATELY DIFFERING TYPES
Filed April 28, 1958                 29 Sheets—Sheet 27

Drag Turn Over 472 at Station VI

INVENTORS
T. A. Deakins
J. A. Lasater
S. C. Northington, Jr.
ATTORNEY

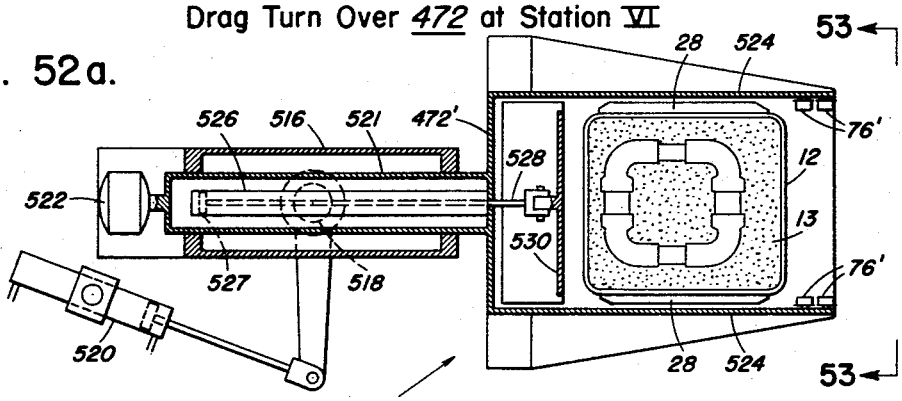
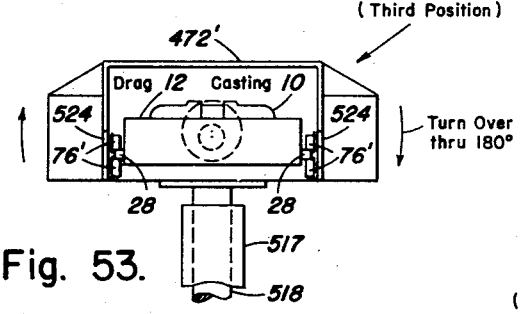
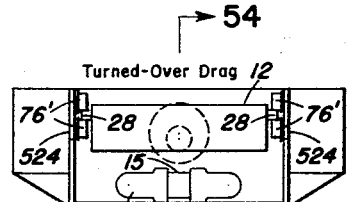
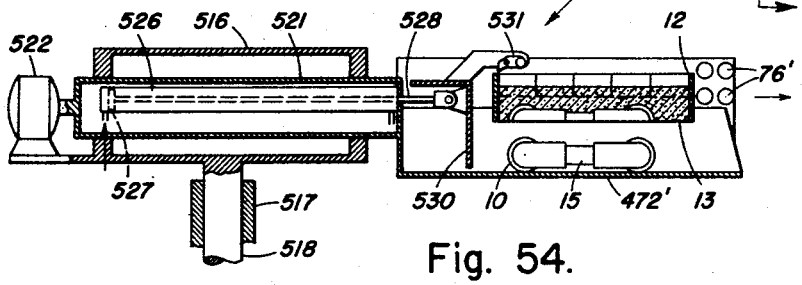
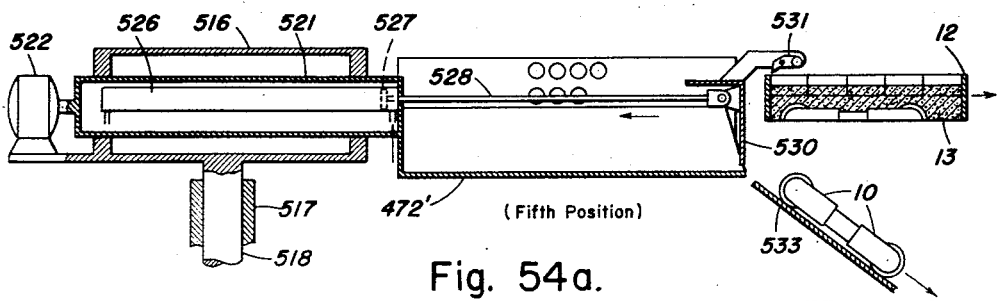

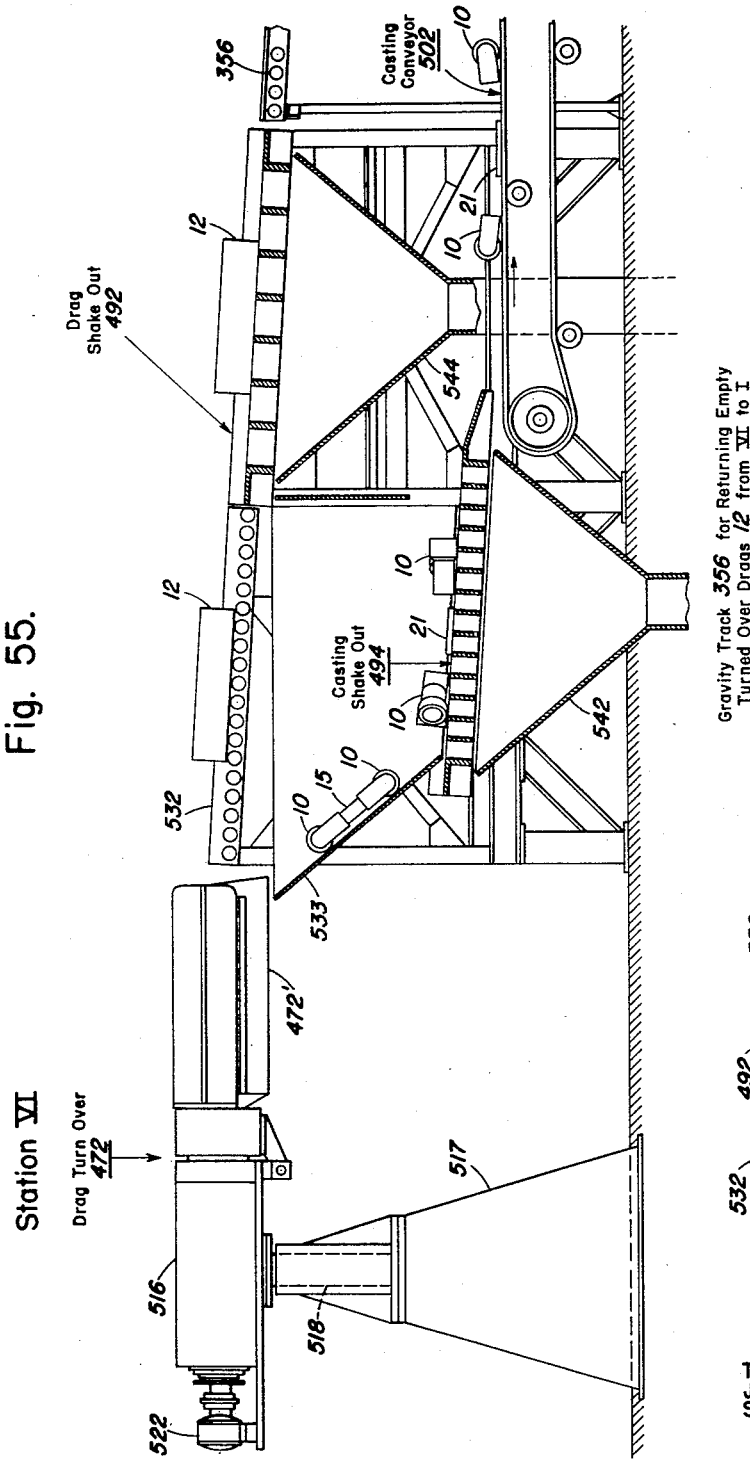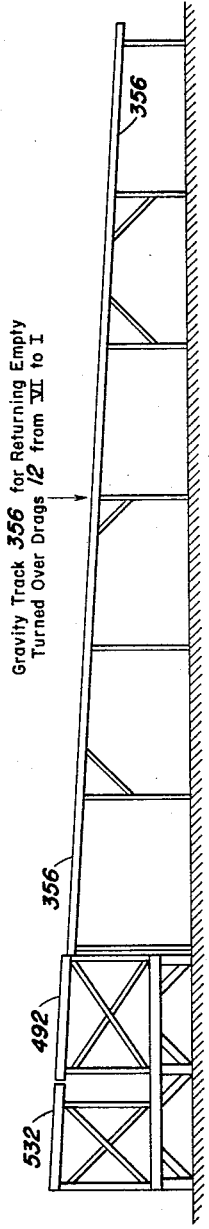

United States Patent Office 2,956,316
Patented Oct. 18, 1960

2,956,316

MECHANIZED FACILITIES FOR PRODUCING AND ASSEMBLING FOUNDRY MOLDS OF ALTERNATELY DIFFERING TYPES

Thomas A. Deakins, Chattanooga, Tenn., John A. Lasater, Tyler, Tex., and Samuel C. Northington, Jr., Lookout Mountain, Tenn., assignors to Combustion Engineering, Inc., New York, N.Y., a corporation of Delaware Filed Apr. 28, 1958, Ser. No. 731,426

5 Claims. (Cl. 22—20)

This invention relates to the assembly of foundry molds by mechanized means such as are disclosed by an earlier application Serial No. 200,899 which was filed December 15, 1950, now abandoned, in the names of Samuel C. Northington, Jr., and John A. Lasater and which on May 31, 1955 was replaced by a continuation application Serial No. 511,941 that was then filed for the same subject matter under title of "Apparatus and Method for Assembling Foundry Molds" and that issued on September 9, 1958 as Patent No. 2,850,775.

Broadly stated, the object of our invention is to increase the capacity and otherwise better the performance of a complete mold assembling installation of the aforesaid mechanized type.

A more specific object is to supplement such basic mechanized facilities by novelly cooperating apparatus that enables the facilities to produce and assemble molds which are formed from alternately differing patterns and which thus shape the poured metal into castings of alternately differing varieties.

Another object is to provide for the mechanized assembly of molds that are far larger and heavier than those which the mechanized apparatus of earlier application Serial 511,941 was designed to handle.

A further object is to improve the system layout of said earlier application Serial 511,941 by replacing the machine-encircling track thereof with other means which accomplish the same functions in an easier and better way.

Additional objects and advantages will become apparent as the disclosure and description hereof proceeds.

One illustrative form of apparatus provided by us for practicing this invention is disclosed by the accompanying drawings wherein:

Fig. 1 is a top plan view showing the multi-type mold improvements of our invention incorporated into a mold assembling installation organized in accordance with said Northington-Lasater continuation application Serial No. 511,941 to utilize a central indexing machine surrounded by five cooperating stations which supply the machine with sand charged cope flasks and drag flasks plus green sand cores and which receive therefrom assembled molds ready for pouring;

Fig. 2 represents a first or "A" type of casting which may be produced in one variety of mold that is assembled by the apparatus diagrammed in Fig. 1;

Fig. 3 illustrates a pattern plate for forming cavity impressions in the drag and cope sand of such an "A" type mold wherein four of the elbow fittings of Fig. 2 may be cast;

Fig. 4 is a section through the "A" type pattern plate of Fig. 3 taken on line 4—4 thereof;

Fig. 5 is an exploded view showing the components of the aforesaid "A" type mold for casting four of the quarter-bend elbows of Fig. 2;

Fig. 5a is a section on line a—a of Fig. 5 showing a reinforcing arbor incorporated into the green sand core;

Fig. 6 shows how the "A" type drag, core and cope appear after having been brought together to produce an assembled mold ready for pouring;

Fig. 7 represents a second or "B" type of casting which may be produced in another variety of mold that also is assembled by the apparatus diagrammed in Fig. 1;

Fig. 8 illustrates a pattern plate for forming cavity impressions in the drag and cope sand of such a "B" type mold wherein four of the Y-fittings of Fig. 7 may be cast;

Fig. 9 is a section through the "B" type pattern plate of Fig. 8 taken on line 9—9 thereof;

Fig. 10 is an exploded view showing the components of the aforesaid "B" type mold for casting four of the Y-fittings of Fig. 7;

Fig. 10b is a section on line b—b of Fig. 10 showing a reinforcing arbor incorporated into the green sand core;

Fig. 11 shows how the "B" type drag, core and cope appear after having been brought together to produce an assembled mold ready for pouring;

Fig. 12 is a top plan view of an "A" type core box which forms the cores 15A of Fig. 5 and carries them into the Fig. 1 assembling machine at Station II;

Figure 1:
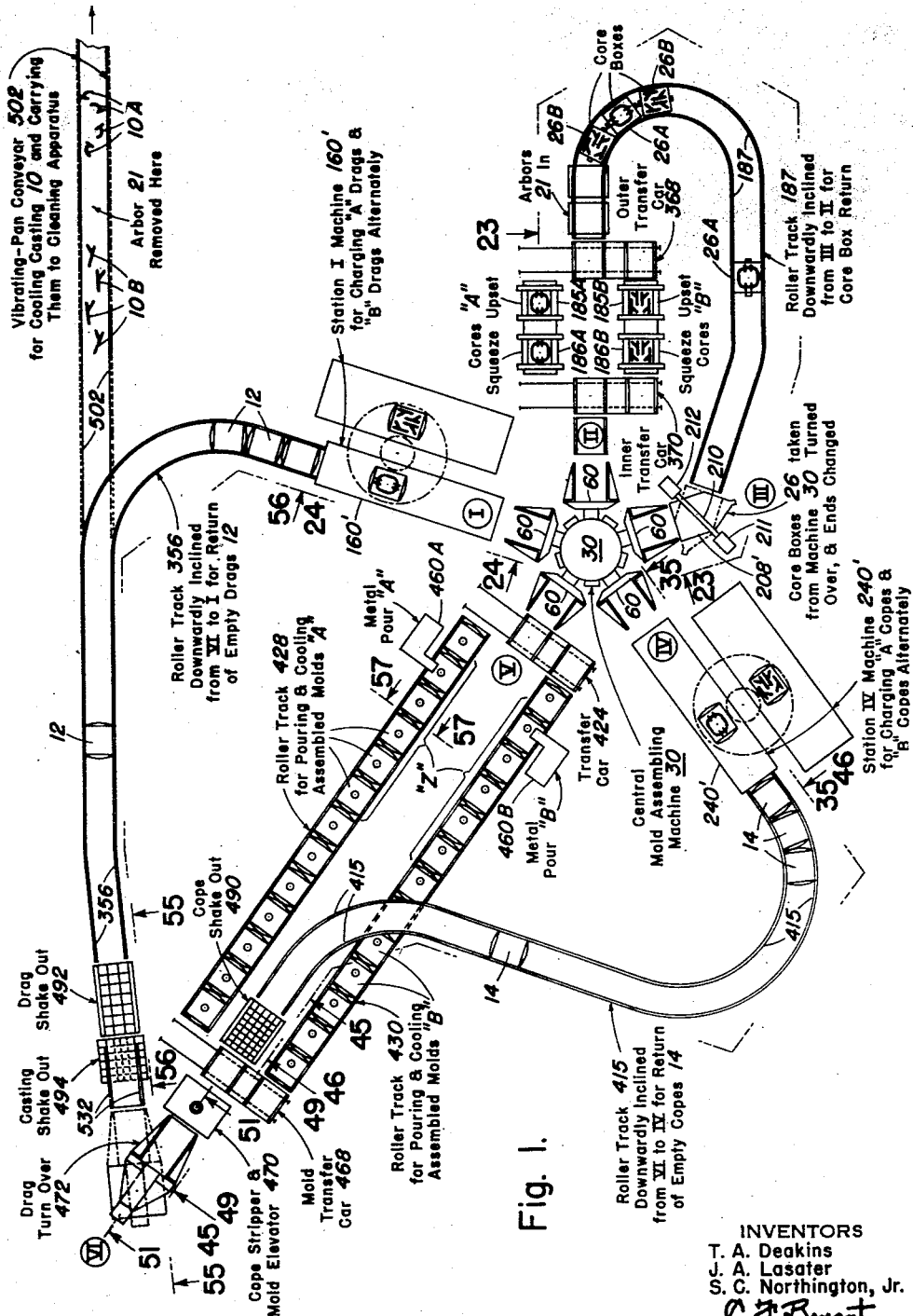
Figure 27:
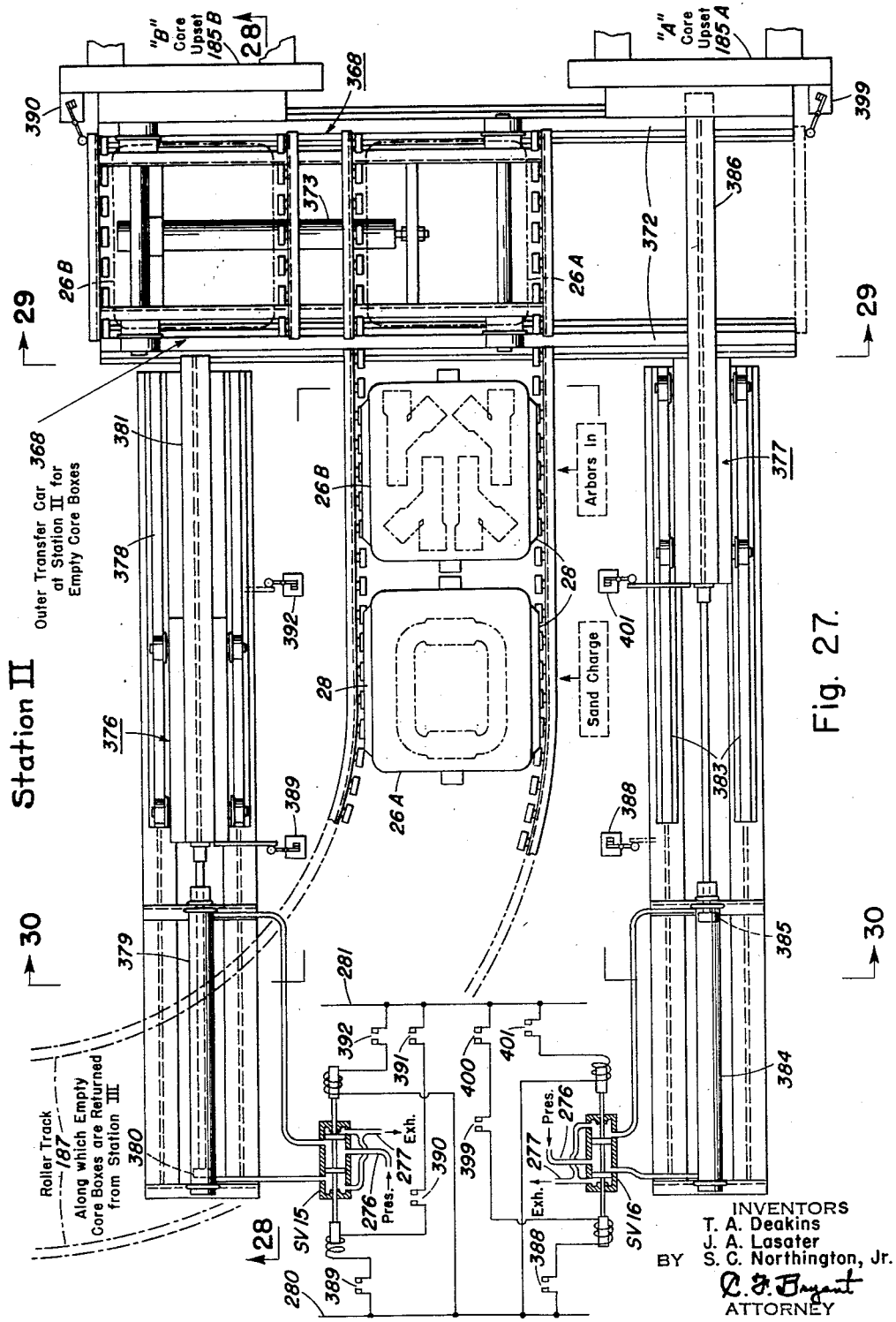
Figure 32:
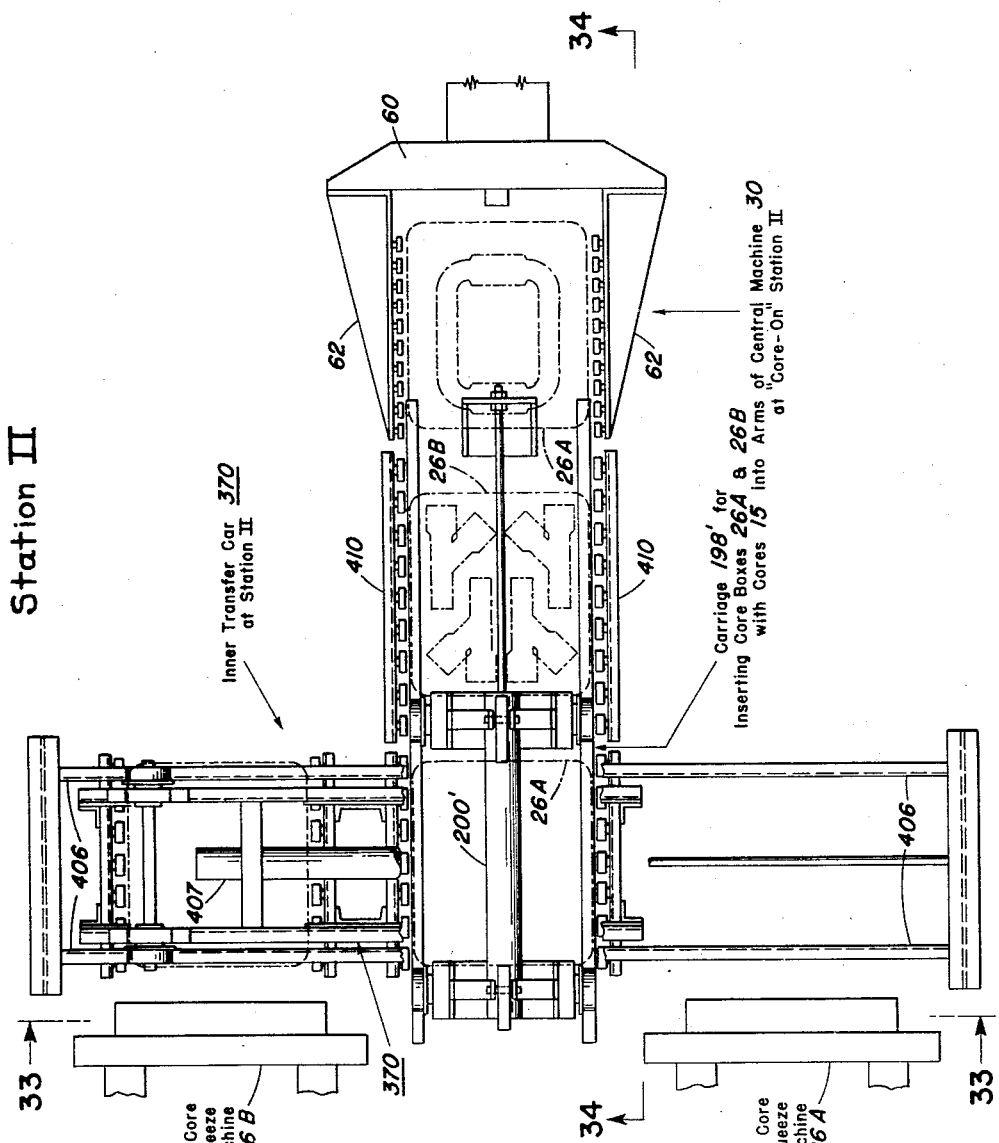
Figure 33:
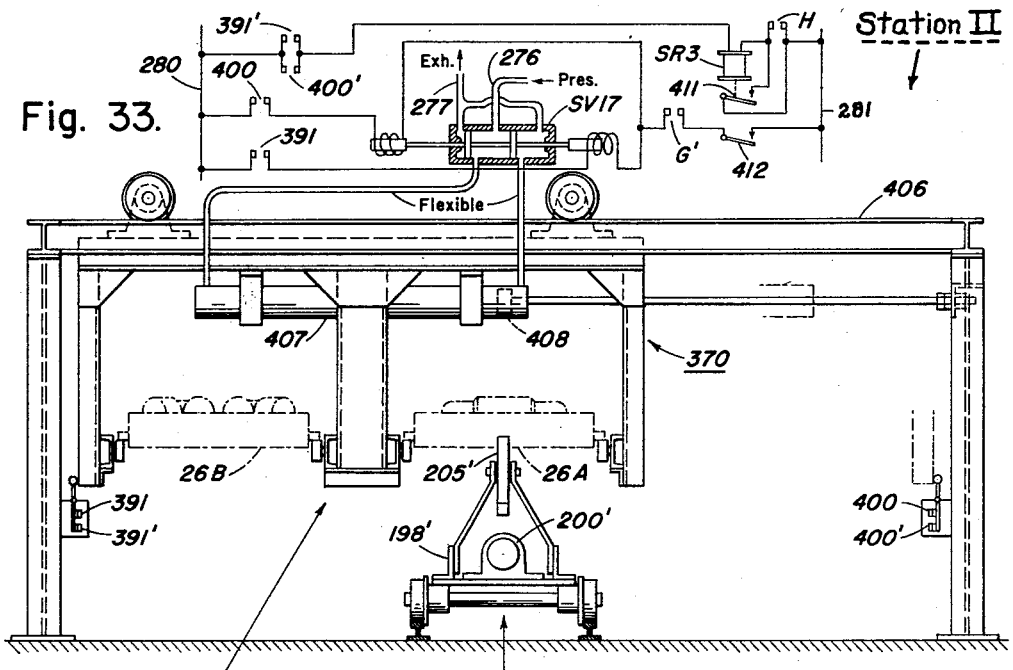
Figure 34:
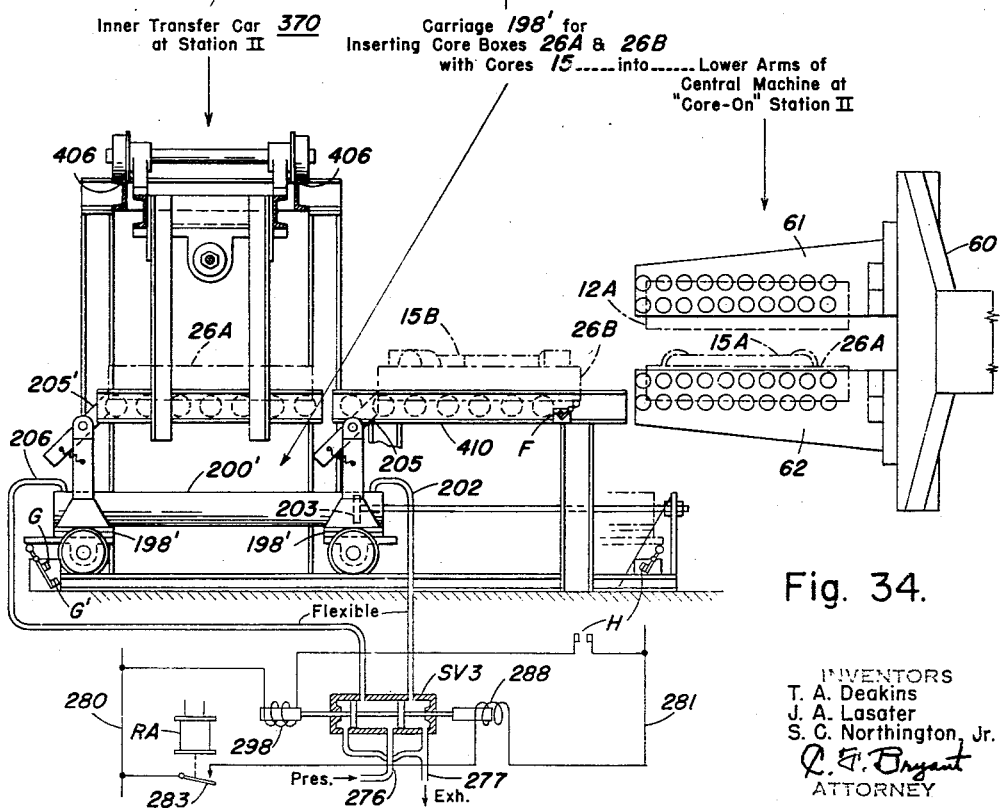
Figure 43A:
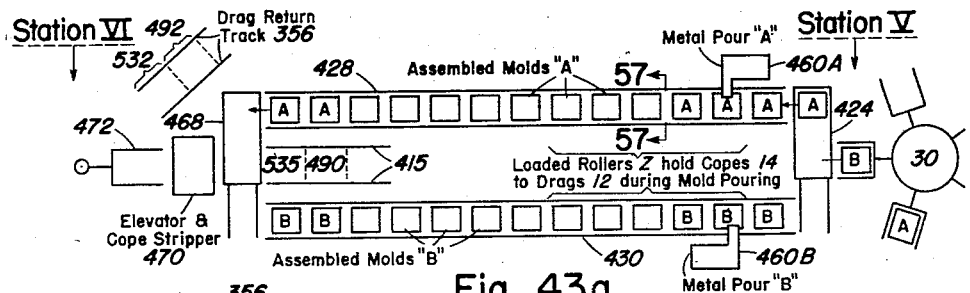
Figure 43B:
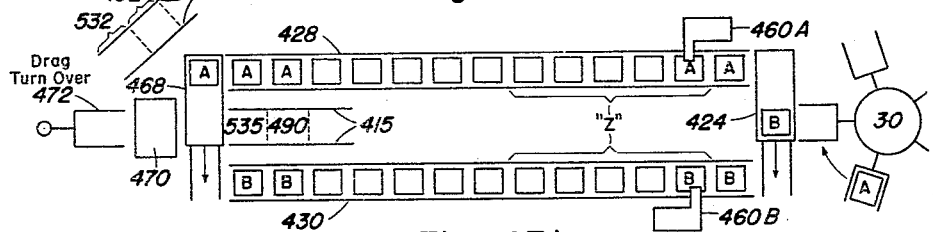
Figure 43C:
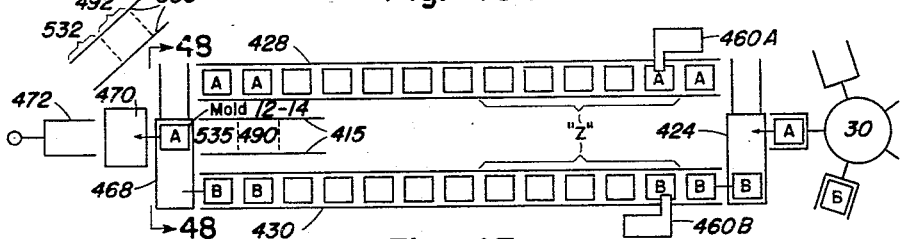
Figure 47:
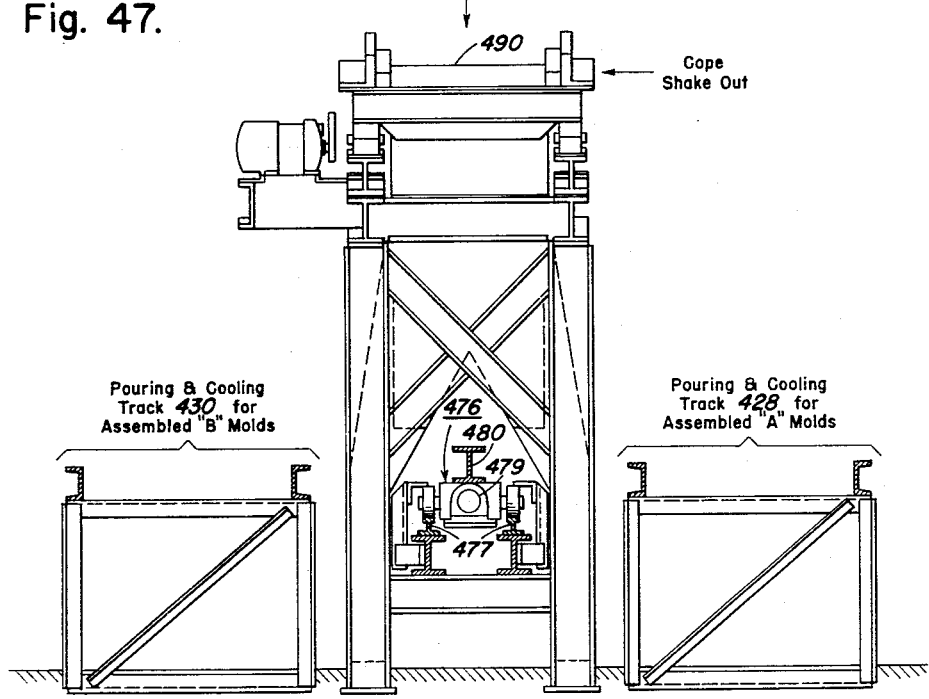
Figure 48:
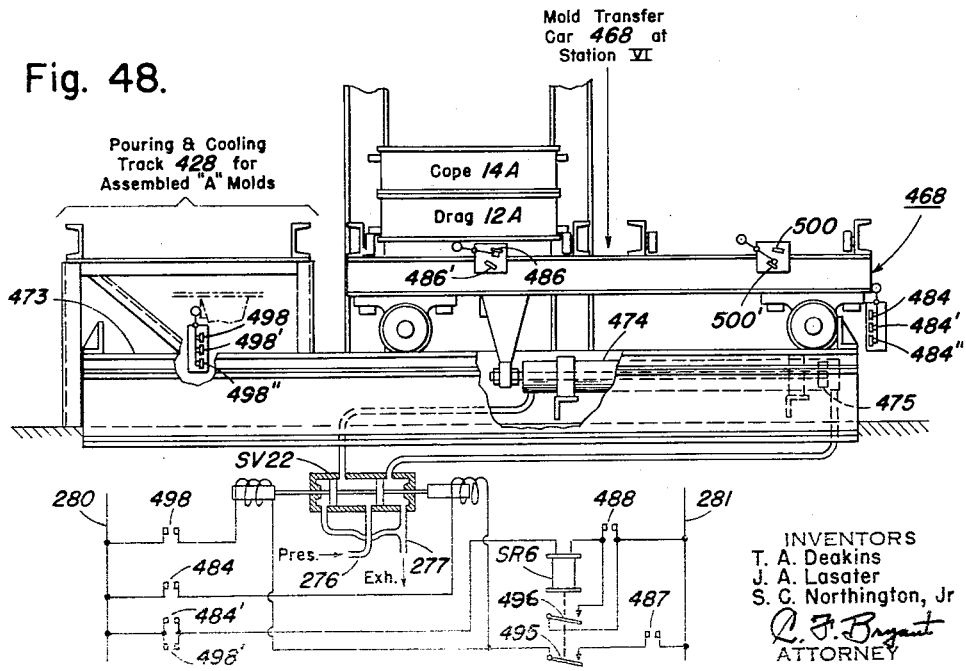
Figure 51:
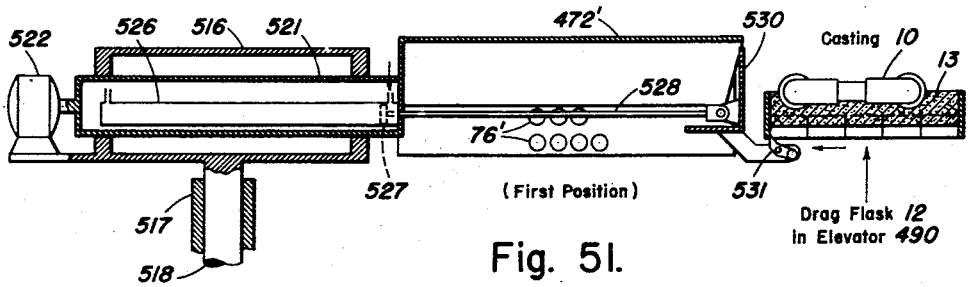
Figure 51A:
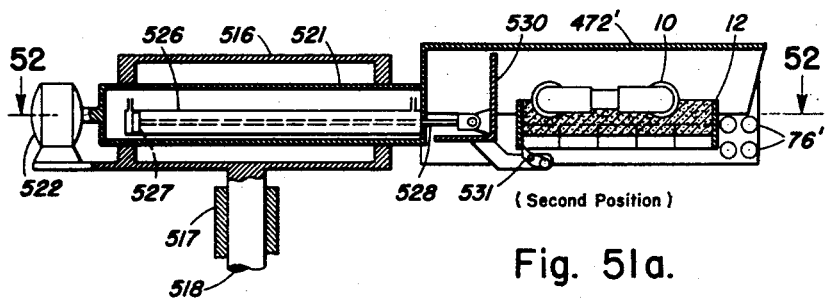

Figs. 13 and 14 are sections on lines 13—13 and 14—14 of Fig. 12 showing further details of this type "A" core box;

Fig. 15 is a top plan view of a "B" type core box which forms the cores 15B of Fig. 10 and carries them into the assembling machine of Fig. 1 also at Station II;

Figs. 16 and 17 are sections on lines 16—16 and 17—17 of Fig. 15 showing further details of this type "B" core box;

Fig. 18 is a top plan view showing the central mold assembling machine of Fig. 1 to enlarged scale and indicating the five sets of flask and core box receiving arms with which the machine is provided;

Fig. 18k is a section on line k—k of Figs. 18 and 24 showing how the side bars 28 of each inserted mold flask are engaged by upper and lower roller rows of the receiving machine arms;

Fig. 19 is a view in vertical section taken on line 19—19 of Fig. 18 which shows the upper portion of the Fig. 18 machine including the two motors that respectively move one set of the arms together and apart and that turn the arm-carrying head over during machine operation;

Fig. 20 is a view in vertical section taken on line 20—20 of Fig. 18 which shows the lower portion of the Fig. 18 machine including means for indexing the turret and for accurately stopping each indexing movement;

Fig. 20a represents the lower portion of this Fig. 18–19–20 mold assembling machine when same is equipped with the turret indexing cylinder 82 of earlier application Serial 511,941 plus the companion turret stop cylinder 92 so arranged that all turret indexing functions in the present machine can be governed by known control facilities such as said earlier application shows in its Fig. 59;

Fig. 21 is a view partly in section and partly in plan, on line 21—21 of Fig. 20a, showing further details of this known turret indexing cylinder and ratchet drive means;

Fig. 22 reproduces in top plan view the central assembling machine 30 of Figs. 1 and 18 and shows Station III thereof as being provided with the core box turn over apparatus 209—212 of earlier application Serial 511,941, which provision permits all functions of core box withdrawal and turn over at Station III hereof to be accomplished by known facilities such as said earlier application discloses in its Figs. 43–51 and 59;

Fig. 23 is a side view on line 23—23 of Fig. 1 showing how the gravity track 187 inclines downwardly from the Station III location of core box turn over to the Station II core-forming apparatus into which the empty core boxes are delivered by that track;

Fig. 24 is a simplified diagrammatic representation, taken from line 24—24 of Fig. 1, of the drag charging and arm-loading apparatus provided at Station I in the installation of Fig. 1;

Fig. 25 is a section on line 25—25 of Fig. 24 showing how each sand-charged drag rides on side rollers in approaching the assembling machine arms at Station I;

Fig. 26A is a simplified diagrammatic representation, taken from line 26—26 of Fig. 24, showing this drag charging apparatus with pattern-selector carriage in the active "A" position ready for the production of an "A" type drag;

Fig. 26B is a similar representation from line 26—26 showing the Fig. 24 drag charging apparatus with the pattern-selector carriage shifted to the active "B" position in readiness for producing a "B" type drag;

Fig. 27 is a top plan reproduction to enlarged scale of that portion of the Fig. 1 apparatus at Station II which receives empty core boxes from gravity track 187 and via a transfer car alternately passes them into a right line where "A" cores are formed and into a left line where "B" cores are formed;

Fig. 28 is a side elevation on line 28—28 of Fig. 27 showing the left ejector carriage and cylinder which pushes "B" core boxes out of the transfer car's left end and into the left line of core forming apparatus;

Fig. 29 is an elevation on line 29—29 of Fig. 27 showing the core-box transfer car and the hydraulic cylinder by which that car is moved back and forth between a left or "B" position and a right or "A" position;

Fig. 30 is an elevation on line 30—30 of Fig. 27 showing how the left and right ejector carriages of this Station II assemblage flank the two sides of gravity track 187 via which empty core boxes from Station III are delivered upon the transfer car;

Fig. 31 is a simplified diagrammatic representation of how the empty "A" and "B" core boxes from the Figs. 27-29 transfer car at Station II respectively are passed through right and left lines of core forming apparatus which duplicates the known equipment shown by Figs. 41-42 of earlier application Serial 511,941 and which functions to form "A" and "B" sand cores in the empty boxes of those right and left lines;

Fig. 32 represents the assembling machine end of the Fig. 31 assemblage in top plan view and indicates how the there shown second transfer car at Station II receives boxes with "A" and "B" cores therein and alternately aligns them for insertion into the central assembling machine;

Fig. 33 is an elevation on line 33—33 of Fig. 32 showing the aforesaid second transfer car at Station II together with the cylinder and control circuits by which that car is shifted back and forth between a left or "B" position and a right or "A" position;

Fig. 34 is a side elevation on line 34—34 of Fig. 32 showing the Station II carriage by which boxes with "A" and "B" cores therein are alternately inserted into arms of the central assembling machine as same successively come into alignment with this "Core-On" Station II;

Fig. 35 is a simplified diagrammatic representation taken from line 35—35 of Fig. 1, of the cope charging and arm loading apparatus provided at Station IV in the multi-type mold installation depicted by Fig. 1;

Fig. 36 is a section on line 36—36 of Fig. 35 showing how each sand-charged cope rides on side rollers in approaching the assembling machine arms at Station IV;

Fig. 37A is a simplified representation, taken from line 37—37 of Fig. 35, showing this cope charging apparatus with pattern-selector carriage in the active "A" position ready for the production of an "A" type cope;

Fig. 37B is a similar representation from line 37—37 showing the Fig. 35 cope charging apparatus with the pattern-selector carriage shifted to the active "B" position in readiness for producing a "B" type cope;

Figs. 38a through 38j are operation diagrams in top plan view indicating how the mold-take-off and transfer-car apparatus at Station V functions to deliver "A" and "B" type assembled molds from the Fig. 1 central machine 30 alternately into right and left lines where molten metal is poured into the "A" and "B" molds of those two lines;

Fig. 39 reproduces the Station V apparatus of Fig. 38 in enlarged top plan view and shows certain details of the represented mold transfer car and of the cooperating right and left ejector carriages by which "A" molds and "B" molds respectively are fed upon the right and left pouring and cooling tracks that extend from Station V to the associated Station VI of Fig. 1 where cope stripping and drag turn over take place;

Fig. 40 is a view, mostly in elevation but partly in section, from line 40—40 of Figs. 38a and 39 that shows the Station V mold transfer car and the hydraulic cylinder by which said car is moved back and forth between its left or "B" position and its right or "A" position;

Fig. 41 is a view in side elevation (also partly in section) from line 41—41 of Fig. 39 showing the Station V carriage and cylinder by which "A" and "B" molds as taken from the central assembling machine 30 are delivered upon the transfer car of Figs. 39–41 for alternate alignment by that car with the right "A" and the left "B" pouring and cooling conveyor tracks;

Fig. 42 is a side elevation on line 42—42 of Fig. 39 illustrating further features of the right ejector carriage and cylinder which pushes "A" molds out of the Station V transfer car's right end and upon the right or "A" pouring and cooling track of Figs. 1 and 39;

Figs. 43a through 43j are Station V—VI operation diagrams in simplified top plan view form indicating how "A" and "B" molds delivered at Station V upon the right and left pouring tracks move along those two tracks to Station VI, and further indicating how such "A" and "B" molds upon reaching Station VI go into an elevator which strips the copes therefrom for return to Station IV and then delivers the drags into turn over apparatus which empties the castings and sand therefrom preparatory to sending the empty drags back to Station I;

Fig. 44 shows the Station VI portion of Figs. 1 and 43 in enlarged top plan view (partly in section) and more clearly illustrates the exit track ends for the mold "A" and mold "B" cooling lines plus the transfer car upon which the poured molds are received from those track ends plus the elevator and cope stripper which receives those "A" and "B" molds from the transfer car plus the turn over apparatus into which the mold drags and their carried castings are received from that elevator;

Fig. 45 is a view in side elevation on line 45—45 of Figs. 1 and 44 further showing the central carriage and cylinder by which the poured molds as delivered at Station VI upon the aforementioned transfer car are pushed from the car into the adjoining elevator and cope stripper apparatus;

Fig. 46 is a side elevation on line 46—46 of Fig. 1 showing how the gravity track for return of empty cope flasks inclines downwardly from the Station VI cope shakeout to the Station IV cope charging apparatus into which that track delivers those empty flasks;

Fig. 47 is an elevation on line 47—47 of Figs 44–45, looking towards Station VI, which shows the raised cope shakeout in end view along with sectional representations of the lower central push out apparatus that is between the left or "B" mold cooling track and the right or "A" mold cooling track;

Fig. 48 is an elevation on line 48—48 of Figs. 43c and 44–45, looking away from Station VI, that shows further features of the Station VI mold transfer car and of the cylinder and control circuits by which that car is shifted back and forth between its "B" position (right in Figs. 44, 48 but left in Figs. 1, 47) and its "A" position (left in Figs. 44, 48 but right in Figs. 1, 47);

Figs. 49a through 49d are Station VI operation diagrams, in simplified side view from line 49—49 of Fig. 1, indicating how the Station VI elevator functions first to receive each poured mold from the adjacent transfer car, then to lift the cope away from the drag, next further to raise the stripped cope along with the drag now vertically spaced below the cope, thereafter to eject the drag with solidified castings into turn over mechanism, and finally to transfer the cope upon a shakeout device;

Fig. 50 is a section on line 50—50 of Fig. 49b showing the specially coordinated support elements that are operative to accomplish cope stripping during mold elevation;

Fig. 51 is a simplified vertical section on line 51—51 of Fig. 1 showing the Station VI drag turn over device in a first position ready to receive a drag flask with castings from the adjoining mold elevator;

Fig. 51a illustrates the Fig. 51 turn over device after elements thereof have moved to a second position and drawn the above mentioned drag flask from the elevator into the device.

Figure 57:
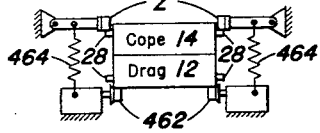
Figure 52:
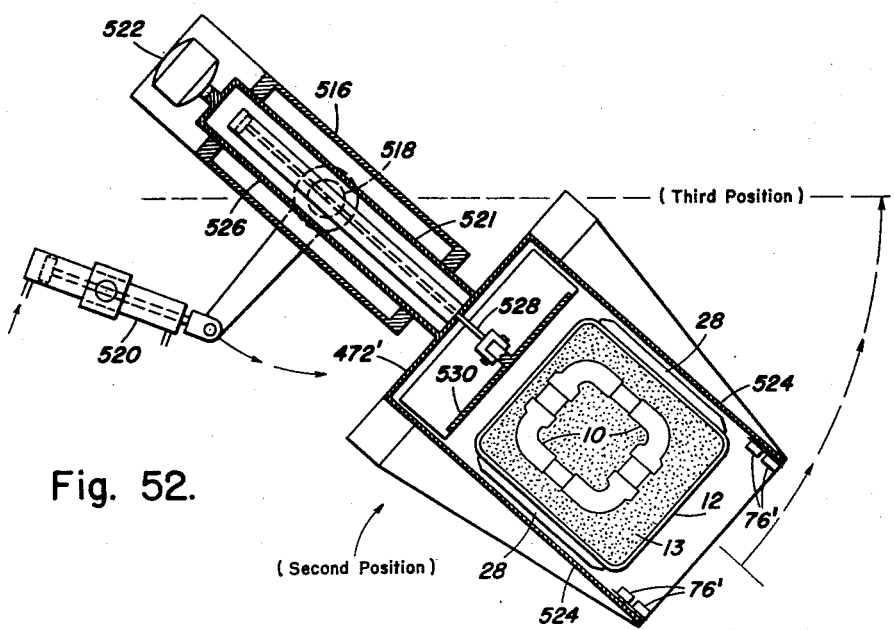

Fig. 52 is a horizontal section on line 52—52 of Fig. 51a providing another view of the turn over device when in said second position;

Fig. 52a is a similar view in horizontal section showing the device after it has been swung counterclockwise from said second position to the represented new third position (shown dotted by Figs. 1 and 52) which prepares the apparatus for later turn over of the drag;

Fig. 53 is a front elevation from line 53—53 of Fig. 52a providing another view of the turn over device when in said third position;

Fig. 53a is a similar view in front elevation showing the device after elements thereof have rotated through 180° into the represented fourth position wherein the contained drag flask has been turned completely over around a horizontal axis with resultant dropping therefrom of the castings and some of the sand;

Fig. 54 is a vertical section on line 54—54 of Fig. 53a providing another view of the turn over device when in said fourth position;

Fig. 54a is a similar view in vertical section showing the device after elements thereof have pushed the turn-over drag and its carried castings out of the device and towards the drag and casting shakeouts that are represented in Figs. 1 and 55;

Fig. 55 is a side elevation from line 55—55 of Fig. 1 that shows how the drag turn over device of the immediately preceding views is mounted upon a supporting pedestal, and that also illustrates further features of the associated casting and drag shakeouts and of the cooperating conveyor by which the finished castings are carried away from the Station VI apparatus;

Fig. 56 is a view in side elevation from line 56—56 of Fig. 1 showing how the gravity track for return of empty drag flask inclines downwardly from the Station VI drag shakeout to the Station I drag charging apparatus into which those empty flasks are delivered by that track; and Fig. 57 (on drawing sheet No. 20 with Figs. 43a–e) is a simplified view from line 57—57 of Figs. 1 and 43 schematically showing how the assembled molds on each of the pouring and cooling tracks 428 and 430 have their copes 14 held against their drags 12 by loaded rollers during and after pouring.

*Mold components to be prepared and assembled*

By these drawings our improved mechanized facilities for preparing and assembling foundry molds of alternately differeing varieties are illustratively shown as being applied to the production of soil pipefittings typified by the quarter bend elbow 10A of Fig. 2 and by the Y-fitting 10B of Fig. 7. As the description proceeds it will become apparent that these new multi-mold facilities of our invention may also be applied to the production of castings of sizes, characters (including solid as well as hollow formation) and shapes other than the two here disclosed, and that the represented elbow 10A and Y-fitting 10B thus have been chosen only to illustrate and not to limit the inherently wide application and scope by which our invention is characterized.

Production of castings such as 10A and 10B in static molds of conventional character requires preparation and assembly of the component parts that are represented in Fig. 5 for each "A" type mold and that are represented in Fig. 10 for each "B" type mold. Each of these two sets of mold parts includes a lower or "drag flask 12, an upper or "cope" flask 14, suitable "green" sand 13 or the like packed into both the drag and the cope for receiving cavity impressions 16 from the casting pattern 11 ("A" type shown by Figs. 3–4 and "B" type by Figs. 8–9), and a core 15 placed within the mold cavity to form the hollow interior of each casting 10.

For the 'A' type mold illustrated by Figs. 5–6, the casting pattern 11A of Figs. 3–4 and the cooperating core 15A as formed in core box 26A of Figs. 12–13–14 are both shaped to provide for simultaneous casting four of the quarter bend elbows 10A in each mold 12A—14A when assembled as shown in Fig. 6; for the "B" type mold illustrated by Figs. 10–11, the casting pattern 11B of Figs. 8–9 and the cooperating cores 15B as formed in core box 26B of Figs. 15–16–17 likewise are both shaped to provide for simultaneously casting four of the Y-fittings 10B in each mold 12B—14B when assembled as shown in Fig. 11; and the represented "green" sand cores 15A and 15B are shown as being provided with reinforcing arbors indicated at 21A and 21B in Figs. 5a and 10b.

Each of these "A" and "B" type molds can of course be organized to produce castings other than the 10A and 10B soil pipe fittings and in quantities either greater or less than the indicated four per mold.

After assembly of each mold 12A—14A and 12B—14B, the core 15 thereof rests in cavity 16 of the mold drag 12; the mold cope 14 has been lowered upon the drag where it is maintained in accurately aligned relationship by pins 17 upstanding from the drag ends over which are fitted mating brackets 18 attached to the cope ends; and there is provided within the mold interior an open cavity space (not shown here but indicated at 22 by Figs. 6–7 of earlier application Serial 511,941) into which space there flows molten metal when poured from a ladle (not shown) into the sprue opening 23A (Figs. 5–6) or 23B (Figs. 10–11) in the cope sand. Such poured metal flows downwardly through opening 23 and then horizontally through pasages 24 (Figs. 5 and 10) in the drag sand and thence into the aforementioned mold cavity space communicating with that passage.

*Present invention improves and extends the mold assembling system of earlier application Serial 511,941*

The aforementioned earlier Northington-Lasater application Serial No. 511,941 points out that preparation of each set of mold components, such as Figs. 5 and 10 hereof show, involves not only packing sand 13 or the like into the drag flask 12 and cope flask 14 but also accompanying manipulations of a core box required to form the core 15 and place it in the cavity of drag 12; that the drag flask 12 and cope flask 14 must each face down over its pattern half 11 when charged with sand 13 or the like, yet in the finally assembled mold the drag 12 is required to face up as Figs. 5–6 and 10–11 hereof show; that the lower core box half (designated at 26 in Figs. 12–13–14 and 15–16–17 hereof) must face up while the core 15 is being formed therein, yet roll over thereof along with drag 12 is necessary incident to transferring the core 15 from the box half; and that the sand charged cope 14 must thereafter be brought together with the core-carrying drag 12 and firmly held there against in order to provide a finished mold (Fig. 5 and Fig. 10 hereof) that is ready for pouring.

The earlier Northington-Lasater technique as taught by said prior and copending application Serial No. 511,941 provides for doing all of the foregoing in a highly successful manner wherein the preparation, manipulation and assembly operations are accomplished mechanically and more or less automatically with resultant increase in mold assembly speed and other practical benefits.

Our improvement invention as disclosed herein retains all of these earlier benefits and adds to them in the significant ways now to be explained.

*Central mold assembling machine 30 very similar to that of earlier application Serial 511,941*

Our inventive improvements accordingly are built around and serve to broaden the performance capabilities of a central mold assembling machine which Fig. 1 hereof represents at 30 and which Figs. 18-21 hereof show in certain further detail.

Such central machine 30 essentially duplicates the similarly designated machine of said earlier application Serial 511,941. To permit their handling by this central machine, each of our drag flasks 12A and 12B and each of our cope flasks 14A and 14B and each of our core box halves 26A and 26B is provided with the left and right support bars shown at 28 by Figs. 5-6, 10-11, 12-14, 15-17, 18-18k and various other drawing views hereof as extending outwardly from and being integrally attached to the flask and box side walls.

These so equipped mold parts 12A—12B, 14A—14B and 26A—26B preferably are made considerably larger than were the corresponding flasks and core boxes of the earlier application just referred to. Such increase in flask size enables more castings to be gotten from each assembled mold and correspondingly steps up the casting tonnage which the mold assembling installation is capable of producing.

In the particular installation upon which the drawings hereof are based, each assembled mold 12A—14A of Fig. 6 and 12B-14B of Fig. 11 weighs approximately 2000 pounds before pouring and about 2200 pounds after molten metal has been filled thereinto; and it has inside dimensions of 32 inches by 36 inches and is 18 inches tall (bottom of drag to top of cope). Weights and sizes of this magnitude rule out manual handling and make mechanized manipulation imperative.

In the illustrative installation referred to above, our central assembling machine 30 of Fig. 1 is correspondingly enlarged to handle the bigger drags 12A—12B and the bigger copes 14A—14B and the bigger core boxes 26A—26B which the preceding paragraphs describe. In this new machine 30 as represented by Figs. 18 through 22 hereof, the flask arms 61—62 extending outwardly from the five arm heads 60 of the rotatable turret 54 are dimensioned to receive and carry such enlarged drags 12A—12B and such enlarged copes 14A—14B and such enlarged core boxes 26A—26B via engaging the left and right side bars 28 thereof between top and bottom roller rows 76 on the inside arm faces. This engagement is indicated by Fig. 18k hereof and is the same as taught by earlier application Serial No. 511,941.

Each inserted drag flask and cope flask and core box is yieldably retained in its set of carrying arms by magnets 350 against which the metal end of the inserted flask or box abuts in the way shown at the top of Fig. 18. Such magnetic retaining means 350 are disclosed more fully and are claimed by copending application Serial No. 741,538 entitled "Flask Hold-In and Related Facilities for Mold Assembling Machine" which was filed by us on June 12, 1958. They take the place of and do the same thing (but in a better way as the roller-spring elements 79-80 plus side bar notches 29 of the aforementioned earlier application Serial 511,941.

*Central assembling machine 30 operates same as in earlier application Serial 511,941*

The arm spacing motor 64 and the roll-over motor 66 with which each of the five arm heads 60 of our new machine 30 is equipped perform exactly the same functions as do the similarly identified motors of earlier application Serial 511,941. To simplify later explanation it accordingly will be assumed that these two motors 64 and 66 are supplied with hydraulic fluid in the way which said application Serial 511,941 indicates in its Figs. 57-58 and are controlled in the way which that earlier application indicates in its Figs. 33-37 and that they thus operate in precisely the same manner as said earlier application teaches.

Moreover, the turret 54 of our represented central machine 30 is indexed around its vertical shaft 56 in a way that advances the five arm heads 60 and their arm sets 61—62 from station to station in successive increments of 72°, again in the manner which application Serial No. 511,941 teaches. Indexing of said turret may be accomplished by any suitable means, such as via the motor 82' shown by Fig. 20 as driving into a speed reducer 352 whose output pinion 353 meshes with a large gear 354 directly coupled to the turret 54 through the hollow turret shaft 56.

Other equivalent means for doing the same thing are shown by Figs. 20a and 21 as utilizing a turret indexing cylinder 82 which through pawl 85 drives into ratchet wheel 86 carried by turret shaft extension 56'. Such drive members 82—85 exactly duplicate the correspondingly identified elements of earlier application Serial 511,941. To simplify explanation it will be assumed that these turret indexing means are controlled and operate in precisely the same manner as those earlier corresponding devices; also that they are supplemented by the turret stop cylinder 92 which actuates the Fig. 21a stop block 95' (with respect to the five stop lugs 98' that respectively are beneath and advance with the five turret arm heads 60) in the same cooperative way as application Serial 511,941 discloses in its Figs. 11, 13 and 59 and otherwise teaches.

The central mold assembling machine 30 of the present application will accordingly have its flask arms indexed around the five stations I—II—III—IV—V of Figs. 1 and 22 and will in other respects operate in the known manner which said earlier application teaches and which Figs. 36a through 36e thereof clearly explain.

Such identity of functioning embraces the core box withdrawal and turnover operations which take place at Station III in our new system. In Fig. 22 the Station III turn over elements 208—212 from Fig. 1 hereof have been redrawn in the way which application Serial 511,941 represents generally in its Fig. 1 and in greater detail in its Figs. 43 through 50 and 59. These are the full equivalent of the more compact apparatus (for handling heavier core boxes) herein represented by Fig. 1 for Station III; and to simplify later explanation of our new organization it will be assumed that such prior design of Fig. 22 is utilized at Station III in our present system.

*Our provisions for assembling multi-type molds give greater flexibility of casting production*

The mold assembling system of the aforementioned earlier application Serial 511,941 is adapted to process molds of only one type at any particular time and that system thus cannot simultaneously assemble molds of alternately differing varieties. This limitation imposes a hardship in situations where castings of many different types must be produced in order to meet diversity demands which are wide and frequently unpredictable. The production of soil pipe fittings constitutes one situation of this character; and it was to satisfy a practical need arising out of such fittings production that the here disclosed inventive improvements were originated and perfected.

These inventive improvements will now be explained on the highly simplified basis of providing for the simultaneous preparation and assembly of the "A" type and the "B" type molds that already have been described by reference to Figs. 2 through 17 hereof.

In Fig. 1 there is diagrammed one form of uniquely organized and coordinated apparatus which we have evolved and demonstrated to be suitable for doing the above in a successful way. Such Fig. 1 organization is broadly unique in that it replaces the encircling mold car track 32 of earlier application Serial 511,941 by other and better apparatus which not only accomplishes the same functions in an easier and superior way but for the first time also makes possible the multi-type-mold operation now accomplished by us.

To achieve this alternate assembling of molds of the "A" and "B" types we provide Station I of Fig. 1 with special facilities which produce drags 12A and 12B alternately and which feed them into the Station I arms of the central machine 30; we similarly provide Station II with unique facilities that produce sand cores 15A and 15B alternately and feed them into the machine arms at Station II in proper synchronism with the 12A and 12B drags there arriving from Station I; we return to core forming Station II the empty core boxes 26A and 26B that are withdrawn from the machine at Station III; we provide Station IV with special facilities which produce copes 14A and 14B alternately and which feed them into the machine arms at Station IV in proper synchronism with the paired-off drags and cores 12A—15A and 12B—15B there arriving from Station III; we provide Station V with unique facilities which withdraw the assembled molds 12A—14A and 12B—14B from the machine and feed them into right and left lines for pouring and cooling; we provide the exit ends of those two lines with an entirely new Station VI and equip it with novel cope stripping and drag turn over means that are operative upon the poured molds there received; and at this new Station VI we further provide means for delivering the finished castings upon a conveyor and for returning the empty drags to Station I and the empty copes to Station IV.

*Drag-charging and pattern-selector and drag-loading apparatus at Station I*

At the "Drag-On" Station I of our new multi-type mold assembling system we provide the apparatus which Fig. 1 indicates generally at 160' in top plan view and which Fig. 24 (as a side elevation on line 24—24 of Fig. 1) plus Figs. 25–26 further represent in a schematic form that has been highly simplified in order to explain more clearly how this apparatus operates.

From Fig. 1 it will be seen that this apparatus 160' communicates with a track 356 which delivers the empty inverted drag flasks 12 to Station I, and also communicates with the arms 61—62 (see Fig. 24) that are carried by the there-registering turret head 60 of the central mold assembling machine 30. The related Figs. 24–26 illustrate how these empty flasks 12 upon reaching said Station I apparatus are charged with sand 13 from chute 39 alternately over the Figs. 3–4 pattern 11A and over the Figs. 8–9 pattern 11B with resultant formation first of an "A" type drag 12A (Figs. 5–6), next of a "B" type drag 12B (Figs. 10–11), then of an "A" type drag 12A, and so on; also how these "A" and "B" type drags as so alternately produced are fed into the upper empty arms 61 of machine 30 by being pushed along side bar support rollers corresponding to 162 of Fig. 25.

Looking first at Fig. 24, we have there reproduced the corresponding Station I equipment which earlier application Serial 511,941 shows in its Fig. 38. To that prior Fig. 38 apparatus we have added a transverse carriage 358 (also see Figs. 26A–26B) upon raisable supports 165' and 165" of which are mounted the 11A pattern plate 360' (also see Figs. 3–4) and the 11B pattern plate 361 (also see Figs. 8–9). By a hydraulic cylinder 359 this pattern-shift carriage 358 is moved alternately first into the active "A" position of Figs. 24 and 26A, next into the active "B" position of Fig. 26B, then back to the active "A" position, and so on.

Said carriage cylinder 359 is operated by pressure fluid supplied thereto through a valve shown at SV13 in Fig. 26A as communicating with the fluid supply line 276 and with the exhaust line 277 of earlier application Serial 511,941. Control circuits for the left and right windings of this valve SV13 are illustrated in Fig. 26A as being energized from the supply conductors 280 and 281 of earlier application Serial 511,941 and as including forward and rear limit switches 362 and 363 for this new pattern shift carriage 358 plus the forward limit switch C for the drag push-in carriage 168 as reproduced in Fig. 24 hereof from that earlier application.

The basic drag-charging apparatus of Fig. 24 operates in the same way as said earlier application Serial 511,941 explains in describing its Fig. 38 drawing view; and detailed description of such basic operation will therefore not be repeated here. Instead it will suffice to observe that each empty and inverted drag flask 12 delivered by return track 356 (Figs. 1 and 56) to Station I enters the Fig. 24 apparatus at the left horizontal position 1 at elevation (*b*); then moves to horizontal position 2 where one or the other of pattern plates 360 and 361 is raised beneath the flask into contact with its lower rim and where sand from chute 39 is filled into the flask over the pattern (11A or 11B) on that raised plate and further where the squeezer head 166 compacts the sand into the inverted flask frame over the pattern; and thereafter moves into horizontal position 3 directly over the carriage 168, where it is ready for insertion into the upper arms 61 of the assembling machine head 60 which is in register with Station I.

This drag-inserting carriage 168 and its actuating cylinder 171 duplicate the correspondingly identified devices of earlier application Serial No. 511,941; and they function in the same manner. Relay RA, reproduced in Fig. 24 hereof from Fig. 59 of said earlier application, at the proper time picks up contact 283 to energize the right winding 297 of valve SV2; this flows pressure fluid from line 276 into the left port 175 of cylinder 171, which fluid drives piston 173 forward thus advancing carriage 168 whose latch 179 now moves the sand charged drag 12 into the arm-engaged position represented by Fig. 18*k*. Magnets 350 of Figs. 18 and 19 thereupon hold the drag 12 in these upper machine arms 61 during subsequent indexing thereof to Station II (Figs. 1, 18, 22) then on to Station III accompanied by roll-over of the arm head and drag.

Following advancement of each sand-charged drag 12 from position *b*3 to position *b*4 of Fig. 24, the carriage 168 is automatically returned by cylinder 171 to position *b*3. Such return is initiated by limit switch C which at the end of each forward carriage movement energizes the left winding 287 of valve SV2 thus causing the valve to admit pressure fluid into cylinder port 176 and drive piston 173 to the left.

The Station I apparatus of Fig. 24 is now ready for receiving another drag flask 12 from location *b*1, for charging it at locations *b*2 and *a*2 with sand which receives the impression of whichever of the two patterns 11A or 11B is therebeneath, and for moving the thus produced "A" drag 12A or "B" drag 12B on to location *b*3 where carriage 168 functions as above described to enter it into the upper arms 61 of the next head 60 which machine 30 brings into register with Station I.

By action of the associated pattern-shift carriage 358, every other drag flask 12 passing through the Fig. 24 apparatus receives cavity impressions from the "A" pattern 11A (Fig. 26A) while each intervening drag flask receives cavity impressions from the "B" pattern 11B (Fig. 26B). This comes about from operation of control circuits for valve SV13 such as Fig. 26A illustrates in simplified schematic form.

With this Station I apparatus in the condition which Figs. 24 and 26A show, carriage 358 is withdrawn to the left bringing the pattern 11A on support pedestal 165' beneath the empty drag flask in horizontal position 2. Another drag flask 12 in horizontal position 3 has previously been charged with sand; and when this other drag is pushed into the central machine arms 61 by carriage 163 (Fig. 24), limit switch C closes (as earlier described) thus completing for the left winding of valve SV13 a Fig. 26A energizing circuit wherein the now-closed left limit switch 363 (for carriage 358) is included. By shifting the SV13 elements to the left, this admits pressure fluid into the left end of cylinder 359 with resultant movement of piston 364 and carriage 358 to the right and into the position of Fig. 26B.

Pattern 11B thus now is in the active cavity-forming position; wherefore the next empty drag flask 12 to reach horizontal position 2 of Fig. 24 will have sand from chute 39 charged thereinto over said pattern 11B with resultant production of a type "B" drag 12B. Subsequent movement of such drag 12B into the Fig. 24 horizontal position 3 is accompanied by the forward operation of drag push-in carriage 171; and at the end of the forward stroke by said carriage limit switch C again closes, this time completing for the right winding of valve SV13 an energizing circuit wherein the now closed right limit switch 362 for carriage 358 is included (see Fig. 26A). By shifting the SV13 elements to the right, this admits fluid pressure to the right end of cylinder 359 with resultant return of piston 364 and carriage 358 to the left and back into the starting position of Fig. 26A.

The cycle described above continues to repeat itself, with the earlier-stated result that the Station I apparatus here disclosed functions to produce and insert into the central machine 30 sand-charged drags which alternately are of the "A" type 12A and of the "B" type 12B.

Relative to this "Drag-On" apparatus at Station I it further is to be pointed out that in advancing from the preceeding "Mold-Off" Station V to this Station I, the arms 61—62 on each of the five turret heads 60 (Figs. 1, 18–19, 22) of the central assembling machine 30 are spread apart by their spacing motor 64 (Fig. 19) and they thus arrive at Station I in such spaced-apart condition and also with both arms 61 and 62 being empty. This is shown by Fig. 19 hereof and likewise by Fig. 36a of earlier application Serial 511,941, the left portion of which earlier Fig. 36a further indicates that in later going from Station I on to Station II these arms 61 and 62 neither close nor roll over.

Fig. 37 of said earlier application still further indicates that in later advancing from Station II to Station III these arms 61—62 on each turret head 60 are rolled over by their motor 66 (see Fig. 19 hereof) with the turning thereof being in alternate directions upon successive rotations of the machine turret 54 (see Fig. 18 hereof). This means that these arms 61—62 on each head 60 will reach Station I first with 61 on top and 62 on the bottom as shown by Fig. 24 hereof, then with 62 on top and 61 on the bottom as shown at Station V by Fig. 41 hereof, next with 61 again on top and 62 again on the bottom, and so on.

*Core-box-routing and core-forming and arm-loading apparatus at Station II*

At the "Core-On" Station II of our new multi-type mold assembling system we provide the apparatus which Fig. 1 indicates generally at 185—186 in top plan view and which Figs. 27 through 34 further represent in a schematic form that has been highly simplified in order more clearly to explain how this apparatus operates.

From Figs. 1 and 31 it will be seen that this Station II apparatus makes use of a first or "A" set of core upset and squeeze machines 185A—186A (shown at the right of the Fig. 31 diagram) plus a second or "B" set of similar core upset and squeeze machines 185B—186B (shown at the left of the Fig. 31 diagram), together with an outer transfer car 368 which receives empty core boxes 26 from the gravity return track 187 and an inner transfer car 370 via which "A" and "B" type sand cores formed in those boxes are alternately fed into the lower arms 62 on the central machine turret heads 60 that come into registry with Station II.

Each of the "A" and "B" sets of core upset and squeeze machines 185—186 of our Fig. 31 diagram are reproductions in simplified perspective view form of the corresponding Station II equipment which earlier application Serial 511,941 shows in its Fig. 41 as machines 185 and 186 that include supports 192 and 196 plus other associated elements. Each set of our Fig. 31 core forming machines 185A—186A and 185B—186B thus operate in the same basic way as said earlier application explains in describing its Fig. 41 drawing view; and detailed explanation of such basic operation will therefore not be repeated here.

Instead it will suffice to ovserve that each empty and up-facing "A" type core box half 26A (see Figs. 12–14 hereof) when passed through the right machines 185A—186A of Fig. 31 cooperates with a matching upper and down-facing "A" type core box half (not represented here) plus other machine elements in forming in such lower box half 26A a set of the "A" type green sand cores 15A of Fig. 5, which so formed cores 15A rest in and face up from said core box 26A; also that each empty and up-facing "B" type core box half 26B (see Figs. 15–17 hereof) when passed through the left machines 185B—186B of Fig. 31 cooperates with a matching upper and down-facing "B" type core box half (not represented here) plus other machine elements in forming in such lower core box half 26B a set of the "B" type green sand cores 15B of Fig. 10, which so formed cores 15B rest in and face up from said core box 26B. In this condition, each such set of cores 15A and 15B is ready for insertion with its carrying core box (26A and 26B) into the lower arms 62 (or 61) of the assembling machine head 60 coming into register with Station II.

Such insertion at Station II is accomplished by the Fig. 34 carirage 198' and actuating cylinder 200' which substantially duplicate the correspondingly identified devices of earlier application Serial 511,941, and they function in essentially the same manner. Relay RA, reproduced in Fig. 34 hereof from Fig. 59 of said earlier application, at the proper time picks up contact 283 to energize the right winding 288 of valve SV3; this flows pressure fluid from line 276 into the right port 202 of cylinder 200', which fluid drives piston 203 forward carrying with it carriage 198' whose forward latch 205 now moves the formed core 15 in its carrying box 26 into the arm-engaged position depicted at the extreme right of each of Figs. 31, 32 and 34.

Magnets 350 (Figs. 18–19) thereupon hold the inserted core box 26 in these lower machine arms 62 (or 61) during subsequent indexing thereof to Station III (Figs. 1, 18, 33), which indexing is accompanied by a bringing of these lower arms 62 together with the upper drag-carrying arms 61 on the same head 60 and by rollover of this entire head assemblage.

Coincident with the core box insertion just described a rear latch 205' on carriage 198' pulled from the Station II inner transfer car 370 another core-carrying box 26, then moving it into position immediately adjacent the machine arms 61—62 where the forward latch 205 can engage it when the carriage 198' later is withdrawn from beneath those machine arms.

Such withdrawal is initiated by forward limit switch H for carirage 198' (Fig. 34) which at the end of each advance carriage movement energizes the left winding 298 of valve SV3 thus causing the valve to admit pressure fluid into the left port 206 to drive cylinder 200' and carriage 198' to the left and back into the rear position which Fig. 34 shows. Said Station II carriage 198' is now ready to repeat the core-box-with-core inserting cycle described immediately above.

By action of the associated multi-core-producing apparatus which we have newly added to Station II, the core-carrying core boxes 26 successively brought to this carriage 198' by the inner transfer car 370 are alternately of the "A" and "B" types 26A and 26B with the cores carried therein alternately being of the corresponding "A" and "B" types 15A and 15B.

Empty up-facing core boxes 26A and 26B as taken from the central machine arms at Station III (in a way more fully explained later herein) are delivered by the gravity track 187 of Figs. 1, 22–23, 27 to the Station II outer transfer car 368 of Figs. 27, 28–29, 31. Every other one of these core boxes is of the "A" types 26A with the intervening boxes being of the "B" type 26B; and these boxes thus line up on the exit end of track 187 in the alternate fashion which Fig. 27 indicates. In that Fig. 27 the captions "Sand Charge" and "Arbors In" designate the general location of an operator who places small quantities of sand into each open cavity of these empty core boxes and then lays upon such sand the reinforcing arbors which Figs. 5a and 10b show at 21.

These up-facing core boxes 26A and 26B of Fig. 27, having thus been prepared, are successively permitted by said operator to advance upon whichever end of the outer transfer car 368 is at the time both empty and in alignment with the aforesaid track 187. From Figs. 27–28–29 it will be seen that this outer transfer car 368 at Station II rides upon and above a pair of transverse rails 372; that it is moved back and forth therealong by hydraulic cylinder 373 and piston 374 between a left or "B" position and a right or "A" position; and that such movement is governed by a valve SV14 plus the associated control circiuts which Fig. 29 represents.

Cooperating with this outer transfer car 368 are the left and right ejector carriages designated 376 and 377 in each of Figs. 27, 28 and 30. From these drawing views it will be seen that said left carriage 376 is advanced and withdrawn along rails 378 by a cylinder 379 and piston 380, similarly to move the attached bar 381 by which "B" core boxes 26B are pushed from the left end of the outer transfer car 368; also that said right carriage 377 is advanced and withdrawn along rails 383 by a cylinder 384 and piston 385, similarly to move the attached bar 386 by which "A" core boxes 26A are pushed from the right end of the same outer transfer car 368.

Serving to govern the aforesaid movement by the left or "B" core box ejector carriage 376 and by the right or "A" core box ejector carriage 377 are the valves SV15 and SV16 plus associated control circuits which Fig. 27 represents in illustrative schematic form. These Fig. 27 control circuits cooperate with the valve SV14 control circuits that Fig. 29 shows (also in illustrative schematic form) for the associated outer transfer car 368 at Station II. In both diagrams the electrical supply conductors 280—281 plus the fluid pressure and exhaust lines 276—277 are reproduced from Fig. 59 of earlier application Serial No. 511,941.

These core box routing control facilities of our Station II Figs. 27 and 29 cause the outer transfer car 368 and the left and right ejector carriages 376 and 377 to operate as indicated below. With the outer transfer car 368 in the left position of Figs. 27 and 29 and carrying a core box 26B in its left end, the right or "A" ejector carriage 377 shown as advanced has previously returned to its rear position, thus closing its rear limit switch 388

The left or "B" ejector carriage 376 now moves forwardly. This results from energization of the left winding of valve SV15 over the Fig. 27 circuit that includes rear limit switch 389 for carriage 376 plus left limit switch 390 for outer transfer car 368 plus a left limit switch 391 for the inner transfer car 370 (Fig. 33) at this Station II. The accompanying shift in SV15 elements to the left flows pressure fluid into the rear port of left ejector cylinder 379 and moves carriage 376 and bar 381 forwardly thereby pushing (see Fig. 28) core box 26B out of the left end of transfer car 368 (Fig. 27) and into the left core upset machine 185B of Fig. 31.

Said left ejector carriage 376 thereupon returns to the rear position of Fig. 27. Such return is initiated by closure of that ejector's forward limit switch 392 with accompanying direct energization of the valve SV15 right winding and resultant flow of pressure fluid into the forward end of cylinder 379 ahead of piston 380. In closing as above said switch 392 also picks up a first stick relay SR1 of Fig. 29 over a circuit that further includes left limit switches 393 (Fig. 29) of outer transfer car 368: and said relay SR1 now locks itself in over its own contact 395.

At this point the outer transfer car 368 at Station II is shifted from the left or "B" position of Figs. 27 and 29 to the right or "A" position. This is initiated by the above return of left ejector 376 to the rear and its accompanying re-closure of rear limit switch 389 (Fig. 27), which energizes the valve SV14 left winding (Fig. 29) over picked up contact 396 of relay SR1; and this utilization of stick relay SR1 permits the Station II outer transfer car 368 to be moved away from its "B" position (left in Figs. 27–28) only after the left ejector carriage 376 has completed the cycle of forward and return movement by which the Fig. 27 core box 26B earlier pushed was out of transfer car 368's left end and into the "B" core upset machine 185B.

Valve SV14 now moves its elements to the left with resultant flow into the left end of cylinder 373 of pressure fluid which drives piston 374 and transfer car 368 to the right. An empty core box shown at 26A in Fig. 27 previously had advanced from central track 187 into the right end of transfer car 368 while that car still was in the left or "B" position; and in moving as above into the right or "A" position the car 368 now carries such core box 26A into alignment with the right or "A" core upset machine 185A of Fig. 31.

Upon reaching such right position, said outer transfer car 368 closes its right limit switch 398 (Fig. 29), and initiates forward movement by the right or "A" ejector carriage 377. Such advance movement by the "A" ejector results from energization of the left winding of valve SV16 over the Fig. 27 circuit that includes rear limit switch 388 for carriage 377 plus right limit 399 (Fig. 27) for outer transfer car 368 plus a right limit switch 400 for the inner transfer car 370 (Fig. 33) at this Station II. The accompanying shift in SV16 elements to the left flows pressure fluid into the rear port of right ejector cylinder 384 to move carriage 377 and bar 386 forwardly and thereby push core box 26A out of the right end of transfer car 368 (Fig. 27) and into the right core upset machine 185A of Fig. 31.

Said right ejector carriage 377 thereupon returns to the rear position of Fig. 27. Such return is initiated by closure of that ejector's forward limit switch 401 with accompanying direct energization of the valve SV16 right winding and resultant flow of pressure fluid into the forward end of cylinder 384 ahead of piston 385. In closing as above, said switch 401 also picks up a second stick relay SR2 of Fig. 29 over a circuit that further includes right limit switch 398 (Fig. 29) of outer transfer car 368; and said relay SR2 now locks itself in over its own contact 402.

At this point the Station II outer transfer car 368 is returned from the foregoing right or "A" position back into the starting or left "B" position of Figs. 27 and 29. Such return is initiated by the above rearward withdrawal of right ejector 377 and its accompanying closure of rear limit switch 388 (Fig. 27). This closure energizes the valve SV14 right winding (Fig. 29) over the Fig. 29 circuit that includes picked up contact 403 of relay SR2; and this utilization of stick relay SR2 permits the Station II outer transfer car 368 to be moved away from its "A" position (right in Figs. 27–28) only after the right ejector 377 carriage has completed the cycle of forward and return movement by which the Fig. 27 core box 26A earlier was pushed out of transfer car 368 right end and into the "A" core upset machine 185A. Valve SV14 now shifts to the right with resultant flow into the right end of cylinder 373 of pressure fluid which drives piston 374 and transfer car 368 to the left.

Another empty core box 26B previously had advanced from the Fig. 27 track 187 into the left end of transfer car 368 while still in the right or "A" position; and in moving as above into the left "B" or starting position the car 368 now carries such core box 26B into alignment with the right or "B" core upset machine 185B of Fig. 31.

The cycle described above continues to repeat itself with the earlier stated result that here disclosed "outer transfer car" apparatus at Station II functions to deliver the empty "A" and "B" core boxes 26A and 26B as alternately received from track 187 (Fig. 27) respectively into the right "A" core upset machine 185A of Fig. 31 and into the left "B" core upset machine 185B of Fig. 31.

In then advancing through the right machines 185A–186A of Fig. 31 each so delivered "A" core box 26A has formed in the upfacing cavities thereof the type "A" cores 15A of Fig. 5, which cores 15A are carried by the box during its subsequent passage into the right end of inner transfer car 370 and later movement from that car into the lower central machine arms 62 (or 61) at Station II; and in similarly advancing through the left machines 185B–186B of Fig. 31 each so delivered "B" core box 26B likewise has formed in the upfacing cavities thereof a set of the type "B" cores 15B of Fig. 10, which cores 15B are carried by the box during its subsequent passage into the left end of inner transfer car 370 and later movement from that car into receiving arms 62 of the assembling machine 30 at Station II.

Said inner transfer car 370 at Station II is organized as Figs. 32–33–34 show. From these drawing views it will be seen that this inner transfer car rides upon and is suspended below a pair of transverse rails 406; that it is moved back and forth therealong by hydraulic cylinder 407 and piston 408 between a left or "B" position and a right or "A" position; and that such movement is governed by a valve SV17 plus associated control circuits which Fig. 33 represents in illustrative schematic form.

Cooperating with this inner transfer car 370 is the earlier described central carriage 198' by which the "A" and "B" type core boxes 26A and 26B with cores 15A and 15B carried therein are alternately withdrawn from that car and inserted into the lower arms 62 which the central assembling machine 30 successively brings into register with Station II. Said core box inserting carriage 198' and its actuating cylinder 200' are, as already pointed out, broadly similar to the correspondingly identified devices of earlier application Serial 511,941; but they differ therefrom in being organized to take "A" and "B" type core bores 26A and 26B with their carried cores 15A and 15B alternately from our new inner transfer car 370 and then to insert those "A" and "B" type boxes alternately into the registering central machine arms 62 at Station II.

In achieving the foregoing, said inner transfer car 370, while in the left or "B" position of Figs. 32–33, first receives a type "B" core box 26B (with cores 15B) into its left end from the left core-squeeze machine 186B of Fig. 31; the car with this "B" box then moves to the right or "A" position where a type "A" core box 26A (with cores 15A) is received into the right car end from the right core-squeeze machine 186A of Fig. 31, with the first or "B" box 26B at the same time being withdrawn by central carriage 198' from the left car end for insertion into the central machine arms 62 at Station II; the car with said "A" box thereupon returns to the left "B" starting position where another type "B" box 26B (with cores 15B) is received into the left car end, with the above "A" box 26A now being withdrawn from the right car end and inserted into the central machine; and the complete cycle just described thereafter continues to repeat itself.

Control facilities suitable for producing the above operation are illustrated in Fig. 33; and they cooperate with the associated control means of Fig. 34 (likewise shown in illustrative schematic form) as will now be explained. To begin such explanation it will be assumed that the inner transfer car 370 occupies the left position of Figs. 32–33 and carries a "B" core box 26B in its left end and an "A" core box 26A in its right end; that the Station II core box inserting carriage 198' of Fig. 34 occupies the withdrawn position shown, with a "B" core box 26B being on the stationary approach track 410 ahead of forward latch 205; and that an empty set of central machine arms 62 has just arrived at Station II.

Said carriage 198' now moves forwardly. This results from energization of the right winding 288 of valve SV3 over the Fig. 34 circuit that includes contact 283 of relay RA, previously described as forming a part of the master system control circuit which earlier application Serial 511,941 shows in its Fig. 59. The accompanying shift in SV3 elements to the right flows pressure fluid into port 202 of cylinder 200' (ahead of stationary piston 203) and imparts the stated forward movement to carriage 198'. The forward latch 205 of this carriage now transfers the core box 26B (with cores 15B) from track 410 into the empty arms 62 (see preceding paragraph) of the central machine 30, while the rear carriage latch 205' at the same time pulls the core box 26A (with cores 15A) out of carriage 370's right end and upon track 410.

Said core box inserting carriage 198' thereupon returns to the withdrawn rear position of Fig. 34. Such return, as previously pointed out, is initiated by closure of that carriage's forward limit switch H with accompanying direct energization (Fig. 34) of the valve SV3 left winding 298 and resultant flow of pressure fluid into port 206 of cylinder 200' to the rear of stationary piston 203. This carriage withdrawal brings front latch 205 behind the new core box 26A now on stationary track 410, and also brings rear latch 205' behind the inner transfer car 370.

In closing as above said forward limit switch H also picks up a stick relay SR3 of Fig. 33 over a circuit that further includes a now-closed left limit switch 391' for the inner transfer car 370; and said relay SR3 now locks itself in over its own contact 411. The below-explained utilization of a companion contact 412 on this stick relay SR3 permits the Station II inner transfer car 370 to be moved out of its left or "B" position and out of its right or "A" position only after the Fig. 34 core box feed carriage 198' has gone through a cycle of forward and return movement.

At this point said inner transfer car 370 is shifted from the left or "B" position of Figs. 32–33 to the right or "A" position. This is initiated by the above return of core box insert carriage 198' to the rear and its accompanying reclosure of rear limit switch G' (Fig. 34), which by energizing the valve SV17 right winding over now-closed limit switch 391 (left for car 370) and picked up contact 412 of relay SR3, moves the valve elements to the right with resultant flow into the right end of cylinder 407 (to the right of stationary piston 408) of pressure fluid which drives the cylinder and car 370 to the right. Upon reaching such right or "A" position, said inner transfer car 370 closes its right limit switch 400—400' (Fig. 33); while before that happened the prior opening of left limit switch 391—391' had deenergized stick relay SR3 and opened contacts 411—412.

In this right or "A" position, the now empty right end of transfer car 370 has delivered thereupon from the right core-squeezing machine 186A of Fig. 31 an "A" core box 26A with cores 15A therein. Such delivery is accomplished in any suitable way, either manually (as by an operator at the 186A machine location) or automatically (by mechanical means not shown).

With car 370 in this right or "A" position, the "B" core box 26B already in the left car end has been brought directly over the Station II carriage 198' of Figs. 33–34 where it is in alignment with the central track 410 (Figs. 32, 34) leading to the arms 62 of assembling machine 30. Here the inner transfer car 370 remains until said machine 30 indexes the first set of arms 62 away from Station II (and on to Station III) and brings another arm head 60 with empty arms 62 into register with Station II.

At the proper time, after the above happens, the Fig. 34 relay RA (as part of the master assembling system control) again closes contact 283 to cause carriage 198' once more to move forwardly. Front latch 205 now pushes the earlier mentioned "A" core box 26A from track 410 into said new set of empty machine arms 62, while rear latch 205' now pulls the aforesaid "B" core box 26B out of car 370's left end and upon the track 410. These actions are followed by closure of forward limit switch H and resultant return of carriage 198' to the rear position of Fig. 34.

In so closing, switch H picks up stick relay SR3 over a Fig. 33 circuit which also includes left limit switch 400' for inner transfer car 370. Once more that relay holds itself in over its own contact 411, while the second contact 412 thereof also is kept closed. In thereafter reaching its fully withdrawn position of Fig. 34, the aforesaid carriage 198' recloses rear limit switch G', and this causes inner transfer car 370 to be returned from the "A" or right position back into the "B" or left position which Figs. 32–33 show.

Such return of car 370 to its left position "B" follows energization of the left winding of valve SV17 over a Fig. 33 circuit which includes the SR3 contact 412 plus the rear limit switch G' plus the left limit switch 400 for car 370. This shifts the SV17 elements to the left with resultant flow into the left end of cylinder 407 of pressure fluid which drives that cylinder and the transfer car 370 to the left of stationary piston 408. Relay SR3 was de-energized and dropped out by the opening of left limit switch 400' at the start of such car movement.

With said inner transfer car 370 thus returned to its original left or "B" position, its now-empty left end has delivered thereinto from the left core squeeze machine 186B another "B" core box 26B with cores 15B, while the "A" core box 26A with cores 15A now is aligned with the central track 410 which leads to the assembling machine arms 62 at Station II.

The operation cycle described above continues to repeat itself, with the earlier stated result that the here disclosed "Inner Transfer Car" apparatus at Station II functions to take "A" core boxes 26A with their cores 15A and "B" core boxes 26B with their cores 15B alternately from the right end the left core squeeze machines 186A and 186B of Fig. 32, and thereafter insert them into the lower arms 62 of the assembling machine 30 in the same alternate "A" and "B" order.

Relative to this "Core-On" apparatus at Station II it further is to be pointed out that in advancing from he preceding "Drag-On" Sation I to this Station II, the arms 61—62 on each of the five turret heads 60 (Figs. 1, 18–19, 22) of the central assembling machine 30 continue in the same spread-apart condition with which they left said Station I after having received a sand-charged drag of the "A" type 12A or of the "B" type 12B in the upper arms (designated 61 by the present drawings) of the set. This is is shown by Figs. 24 and 34 hereof and also by Fig. 36a of earlier application Serial 511,941, the left portion of which earlier Fig. 36 represents the arms upon arrival at Station II with the carried drag 12 in their upper set.

The sand-charged drags 12 so delivered to Station II by said upper arms (illsutratively designated 61 by the drawings hereof) of the machine turret heads 60 are alternately of the "A" type 12A and of the "B" type 12B; and our Station II apparatus as described by the foregoing paragraphs is so synchronized with associated operating actions by the central assembling machine 30 and by our Station I apparatus that each turret head 60 arriving at II with an "A" drag 12A in its upper arms receives an "A" type core box 26A with cores 15A in its empty lower arms (illustratively designated 62 by the drawings hereof), and that each head 60 arriving at II with a "B" drag 12B in its upper arms similarly has a "B" type core box 26B with cores 15B inserted into its lower arms.

*Arm-unloading and core box turn-over apparatus at station III*

At the "Core-Box-Off" Station III of our new multi-type mold assembling system we provide the core-box-withdrawal and turn-over apparatus indicated generally in Figs. 1 and 23 as utilizing a turn over table 208' that is carried on a shaft 210 to which hydraulic motors 211—212 impart forward and return turn-over movements at proper times. This Station III apparatus, as previously pointed out, is the full equivalent of the corresponding box-unloading and turn-over elements which Figs. 1, 43–50 and 59 of earlier application Serial 511,941 represent and which Fig. 22 hereof reproduces in top plan view that duplicates the Fig. 1 showing by said earlier application.

Comparison of this Fig. 22 representation of said earlier design with the Fig. 1 showing of our later design will further confirm how fundamental the similarity is. Our presently preferred turn over table 208' of Fig. 1 consists, in effect, of the prior table 208 of Fig. 22 remounted upon turn over shaft 210 in a way which brings that shaft closer to the table's own center of gravity; and the result is that the empty core boxes 26A and 26B as drawn into this remounted table 208' from the central machine arms 62 at Station III are rotatively turned over within the table around shaft 210 in a way that calls for less lifting and dropping of the core box while being turned over and placed upon the gravity track 187.

This remounted turn over table 208' of Figs. 1 and 23 hereof functions in exactly the same way and accomplishes precisely the same things as the prior corresponding apparatus which Fig. 22 hereof reproduces at 208—212 from earlier application Serial 511,941. In the operation explanation now to follow it accordingly will be assumed, in the interests of brevity and simplification, that Station III of our present system does utilize such prior and full equivalent apparatus as represented generally by Fig. 22 hereof and as shown in greater detail by Figs. 43–50 and 59 of said earlier application.

In going from "Core-On" Station II to the "Core-Box-Off" Station III here being described, each "A" core box 26A with its cores 15A and each "B" core box 26B with its cores 15B initially is carried by the lower assembling machine arms 62 (or 61) (see Fig. 34 hereof) spacedly below the mating drag flask 12A or 12B in the upper arms 61 (or 62) of the same machine head 60 (indicated by right Figs. 36b of earlier application Serial 511,941); in thereafter advancing from Station II towards Station III these upper and lower arms 61—62 of this turret head 60 first close together bringing the box-carried core 15A or 15B into the pattern cavities 16 (see Figs. 5 and 10 hereof) of the mating drag 12A or 12B thereabove, while the entire arm head assemblage 60—61—62 next is rolled over by machine 30 through 180° to bring the arms 62 with their therein-carried core box 26A or 26B above the arms 61 with their therein-carried mating drag 12A or 12B so that the cores 15A or 15B now rest in said pattern cavities 16 of such rolled over drag (this indicated by left Fig. 36b of earlier application 511,941); and upon arrival at Station III the aforesaid machine arms 62 and 61 further have been spread apart (indicated by right Fig. 36c of earlier application 511,941) with an accompanying lifting by arms 62 of the rolled over core box 26A or 26B away from and fully free of the mating drag 12A or 12B (plus its cores 15A or 15B) in the machine arms 61 still beneath the core box.

Each rolled over and now-empty core box 26A and 26B so delivered to Station III is automatically withdrawn from these machine arms 62 into the earlier mentioned turn-over table 208 of Fig. 22. Such withdrawal into table 208 is accomplished by known means here assumed to be the same as earlier application Serial 511,941 shows in its Figs. 43–50 and 59 and describes in its specification; wherefore each so withdrawn core box now has the position relative to the machine arms 62 which Figs. 36c of said earlier application indicates via the right dotted outline 26.

Following each such withdrawal, the Fig. 22 motors 211—212 rotate table 208 from the full line position immediately adjacent machine arms 62 up and over the shaft 210 and then down therearound into the dotted-line position immediately adjacent the entrance end of gravity return track 187; and in Fig. 23 hereof a corresponding turn over movement by table 208' is schematically indicated by the dotted half-circle line 26' drawn above and around the table shaft 210.

Upon reaching this turn-over position in register with gravity return track 187 (again see dotted outline Fig. 22), the Station III turn-over table 208 pushes the empty core box 26A or 26B out of the table and on to the entrance end of that track. Such box ejection from the table is accomplished by known means here assumed to the same as earlier application Serial 511,941 shows in its Figs. 43–50 and 59 and describes in its specification; and following such ejection motors 211—212 reversely rotate the table 208 up and over shaft 210 and back into the starting position adjacent to and in register with the machine arms 62.

This completes the cycle of core box withdrawal and turn over and ejection and places the Station III apparatus in condition for receiving and turning over another empty core box 26A or 26B. Each such turn over action is of course accompanied by the same interchange of core box ends as earlier application Serial 511,941 discloses and teaches.

Since the sets of turret head arms 62 successively brought by assembling machine 30 into register with our "Core-On" Station II have "A" core boxes 26A and "B" core boxes 26B alternately loaded thereinto, it follows that the empty and rolled over core boxes which those same arms later deliver to Station III likewise will alternately be of the "A" type 26A and of the "B" type 26B; and it accordingly further follows that in still later transferring these same boxes upon the entrance end of our return track 187, the withdrawal and turnover apparatus 208—212 described above will similarly accomplish such transfer in the same alternate "A" and "B" order.

Each such core box 26A and 26B thus placed upon this roller-type return track 187 at Station III now advances theredown under the action of gravity from the higher starting elevation at Station III (see Fig. 23) to the lower exit elevation at Station II (see Figs. 27 and 23). In approaching the Station II outer transfer car 368 of Figs. 27 and 30–31, these empty and turned over core boxes 26A and 26B (with up-facing cavities) from Station III thus line themselves up along the delivery portion of said return track 187 in alternate "A" and "B" sequence which is discussed above and which our Figs. 27 and 31 show.

*Cope-charging and pattern selector and drag-loading apparatus at Station IV*

At the "Cope-On" Station IV of our new multi-type mold assembling system we provide the apparatus which Fig. 1 indicates generally at 240' in top plan view and which Fig. 35 (as a side elevation on line 35—35 of Fig. 1) plus Figs. 36–37 further represent in a a schematic form that has been highly simplified in order to explain more clearly how this apparatus operates.

From Fig. 1 it will be seen that this apparatus 240' communicates with a track 415 which delivers the empty cope flasks 14 to Station IV, and also communicates with the arms 61—62 (see Figs. 24) that are carried by the there-registering turret head 60 of the central mold assembling machine 30. The related Figs. 36–37 illustrate how these empty flasks 14 upon reaching said Station IV apparatus are charged with sand 13 from chute 41 alternately over the Figs. 3–4 pattern 11A and over the Figs. 8–9 pattern 11B with resultant formation first of an "A" type cope 14A (Figs. 5–6), next of a "B" type cope 14B (Figs. 10–11), then of an "A" type cope 14A, and so on; also how these "A" and "B" type copes as so alternately produced are fed at Station IV into the now-upper empty arms 62 of machine 30 by being pushed along side bar support rollers corresponding to 242 of Fig. 36.

Looking first at Fig. 35, we have there reproduced the corresponding Station IV equipment which earlier application Serial 511,941 shows in its Fig. 52. To that prior Fig. 52 apparatus we have added a transverse carriage 416 upon raisable supports 244' and 244" of which are mounted the 11A pattern plate 360 (also see Figs. 3–4) and the 11B pattern plate 361 (also see Figs. 8–9). By a hydraulic cylinder 418 this pattern-shift carriage 416 is moved alternately first into the active "A" position of Figs. 35 and 37A, next into the active "B" position of Fig. 37B, then back to the active "A" position, and so on.

Said carriage cylinder 418 is operated by pressure fluid supplied thereto through a valve shown at SV18' in Fig. 37A as communicating with the fluid supply line 276 and with the exhaust line 277 of earlier application Serial 511,941. Control circuits for the left and right windings of this valve SV18' are illustrated in Fig. 37A as being energized from the supply conductors 280 and 281 of earlier application Serial 511,941 and as including forward and rear limit switches 420 and 421 for this new pattern shift carriage 416 plus the forward limit switch K for the cope push-in carriage 247 as reproduced in Fig. 35 hereof from that earlier application.

The basic cope-charging apparatus of Fig. 35 operates in the same way as said earlier application 511,941 explains in describing its Fig. 52 drawing view; and detailed description of such basic operation will therefore not be repeated here. Instead it will suffice to observe that each empty cope flask 14 delivered by return track 415 (Figs. 1 and 46) to Station IV enters the Fig. 35 apparatus at the left horizontal position 1 at elevation (b); then moves to the horizontal position 2 where one or the other of pattern plates 360 and 361 is raised beneath the flask into contact with its lower rim and where sand from chute 41 is filled into the flask over the pattern (11A or 11B) on that raised plate and further where the squeezer head 245 compacts the sand into the flask frame over the pattern; and thereafter moves into horizontal position 3 directly over the carriage 247, where it is ready for insertion into the upper arms 62 of the assembling machine head 60 which is in register with Station IV.

This cope-inserting carriage 247 and its actuating cylinder 250 duplicate the correspondingly identified devices of earlier application Serial 511,941; and they function in the same manner. Relay RA, reproduced in Fig. 35 hereof from Fig. 59 of said earlier application, at the proper time picks up contact 283 to energize the right winding 289 of valve SV4; this flows pressure fluid from line 276 into the left port 254 of cylinder 250, which fluid drives piston 252 forwardly thus advancing carriage 247 whose latch 257 now moves the sand charged cope 14 into the arm-engaged position 4 of Fig. 35. Magnets 350 of Figs. 18 and 19 thereupon hold the cope 14 in these upper machine arms 62 during subsequent indexing thereof to Station V (Figs. 1, 18, 22).

Following advancement of each sand-charged cope 14 from position b3 to position b4 of Figs. 35, the carriage 247 is automatically returned by cylinder 250 to position b3. Such return is initiated by limit switch K which at the end of each forward carriage movement energizes the left winding 299 of valve SV4 thus causing the valve to admit pressure fluid into cylinder port 255 and drive piston 252 to the left.

The Station IV apparatus of Fig. 35 is now ready for receiving another cope flask 14 from location b1, for charging it at locations b2 and a2 with sand which receives the impression of whichever of the two patterns 11A or 11B is therebeneath, and for moving the thus produced "A" cope 14A or "B" cope 14B on to location b3 where carriage 247 functions as above described to enter it into the upper arms 62 (or 61) of the next head 60 which machine 30 brings from Station III into register with Station IV.

By action of the associated pattern-shift carriage 416, every other cope flask 14 passing through the Fig. 35 apparatus receives cavity impressions from the "A" pattern 11A (Fig. 37A) while each intervening cope flask receives cavity impressions from the "B" pattern 11B (Fig. 37B). This comes about from operation of control circuits for valve SV18' such as Fig. 37A illustrates in simplified schematic form.

With this Station IV apparatus in the condition which Figs. 35 and 37A show, carriage 416 is withdrawn to the left bringing the pattern 11A on support pedestal 244' beneath the empty cope flask in horizontal position 2. Another cope flask 14 in horizontal position 3 has previously been charged with sand; and when this other cope is pushed into the central machine arms 62 by carriage 247 (Fig. 35), limit switch K closes (as earlier described) thus completing for the left winding of valve SV18' a Fig. 37A energizing circuit wherein the now-closed left limit switch 421 (for carriage 416) is included. By shifting the SV18' elements to the left, this admits pressure fluid into the left end of cylinder 418 with resultant movement of piston 422 and carriage 416 to the right and into the position of Fig. 37B.

Pattern 11B thus now is in the active cavity-forming position; wherefore the next empty cope flask 14 to reach position 2 of Fig. 35 will have sand from chute 41 charged thereinto over said pattern 11B with resultant production of a type "B" cope 14B. Subsequent movement of such cope 14B into the Fig. 35 horizontal position 3 is accompanied by the forward operation of cope push-in carriage 247; and at the end of the forward stroke by said carriage limit switch K again closes, this time completing for the right winding of valve SV18' an energizing circuit wherein the now closed right limit switch 420 for carriage 416 is included (see Fig. 37A). By shifting the SV18' elements to the right, this admits pressure fluid into the right end of cylinder 418 with resultant return of piston 422 and carriage 416 to the left and back into the starting position of Figs. 37A and 35.

The cycle described above continues to repeat itself, with the earlier stated result that the Station IV apparatus here disclosed functions to produce and insert into the central machine 30 sand-charged copes which alternately are of the "A" type 14A and of the "B" type 14B.

Relative to this "Cope-On" apparatus at Station IV it further is to be pointed out that in going from the preceding "Core-Box-Off" Station III to this Station IV, each "A" type drag 12A with its upfacing cores 15A and each "B" type drag 12B with its upfacing cores 15B continues to be carried by the now-lower assembling machine arms 61 spacedly below the now-upper empty machine arms 62 (indicated by left Fig. 36c of earlier application Serial 511,941). It accordingly is into sets of these empty upper arms 62 (or 61) as successively brought by machine 30 to Station IV the copes 14A and 14B produced as described above are alternately inserted (indicated by right Fig. 36d of earlier application 511,941) by this Station IV apparatus.

These insertions of the "A" and "B" copes 14A and 14B at Station IV are so synchronized with other operating actions by the central assembling machine 30 that each turret head 60 arriving at IV with an "A" type drag 12A (plus cores 15A) in its now-lower arms 61 receives an "A" type cope 14A in its empty upper arms 62, and that each head 60 arriving at IV with a "B" type drag 12B (plus cores 15B) in its lower arms 61 similarly has a "B" type cope 14B inserted into its upper arms 62.

In thereafter advancing from this "Cope-On" Station IV to the following "Mold-Off" Station V, each so loaded set of these machine arms 62 and 61 are closed together by machine 30 (as earlier application Serial 511,-941 describes). Such closing actions bring each "A" cope 14A down upon the mating "A" drag 12A (with cores 15A) therebeneath to produce an "A" type assembled mold 12A—14A, and they similarly bring each "B" type cope 14B down upon the mating "B" drag 12B (with cores 15B) therebeneath to produce a "B" type assembled mold 12B—14B. It is in this closed condition (indicated by left Fig. 36d plus right Fig. 36e of earlier application Serial 511,941) that the arm sets 62—61 of central machine 30 arrive at the aforesaid "Mold-Off" Station V.

*Mold take-off apparatus for unloading machine arms at Station V and routing molds into "A" and "B" pouring lines*

At the "Mold-Off" Station II of our new multi-type mold assembling system we provide the apparatus which Fig. 1 indicates generally as including a mold transfer car 424 and which Figs. 38 through 42 further represent in a schematic form that has been highly simplified in order more clearly to explain how this apparatus operates.

This Station V equipment functions to take assembled molds both of the "A" type 12A—14A and of the "B" type 12B—14B from the registering arms 61—62 of central machine 30; to route each of the received "A" molds into a first pouring and cooling line 428 (shown at right of Fig. 38); and to route each of the received "B" molds into a second pouring and cooling 430 (shown at left of Fig. 38). As represented by Figs. 39 through 42, said equipment utilizes the aforementioned mold transfer car 424 (also shown by Figs. 1 and 38) plus a central take off carriage 262' interposed between machine arms 62—61 and the car 424 plus a right carriage 427 for feeding "A" molds from car 424 into the "A" pouring and cooling line 428 plus a left carriage 429 for feeding "B" molds from car 424 into the "B" pouring and cooling line 430.

The aforementioned mold take-off carriage 262' of Figs. 39 and 41 hereof is generally similar to the Station V carriage 262 which earlier application Serial 511,-941 shows in its Fig. 54; and, as in that earlier application, the actuating cylinder 263' therefor receives pressure fluid from line 276 via the hydraulic valve SV5 governed by control circuits which utilize master system relay RA and supply conductors 280—281 reproduced in Fig. 41 hereof from Fig. 59 of said earlier application. In this Fig. 41 organization the energizing circuit for the left winding 290 of valve SV5 additionally includes left and right limit switches 432' and 433' for the mold transfer car 424, which inclusion permits an assembled mold to be withdrawn from central machine 30 only when said car 424 is fully in its left or "B" position or fully in its right or "A" position.

Each assembled mold 12—14 so withdrawn by carriage 262' at Station V (Fig. 41) is passed over a short length of intervening track 435 into whichever end of said transfer car 424 is at the time both empty and in alignment with said track 435 and with the registering machine arms 61—62. From Figs. 39–42 it will be seen that this mold transfer car 424 rides upon and is suspended below a pair of transverse rails 426; that it is moved back and forth therealong by hydraulic cylinder 438 and piston 437 between a left or "B" position and a right or "A" position; and that such movement is governed by a valve SV20 plus the associated control circuits which Fig. 41 represents in illustrative schematic form.

Cooperating with this mold transfer car 424 at Station V are the aforementioned right and left carriages 427 and 429 which respectively feed assembled "A" molds from the right car end upon the right or "A" pouring and cooling track 428 and feed assembled "B" molds from the left car end upon the left or "A" pouring and cooling track 430. From Figs. 39–42 it will be seen that said right or "A" feed carriage 429 is advanced and withdrawn along rails 440 by a cylinder 441 and piston 442, similarly to move the upstanding bar 443 by which "A" molds are pushed from the right end of transfer car 424; also that said left or "B" feed carriage 429 is advanced and withdrawn along rails 444 by a cylinder 445 and piston 446, similarly to move the upstanding bar 447 by which "B" molds are pushed from the left end of the same Station V transfer car 424.

Serving to govern the aforesaid movements by the right or "A" mold feed carriage 427 and by the left or "B" mold feed carriage 429 are the valves SV19 and SV18 plus the associated control circuits which Fig. 39 represents in illustrative schematic form. These Fig. 39 control circuits cooperate with the valve SV20 control circuits that Fig. 40 shows (likewise in illustrative schematic form) for the associated mold transfer car 424 at Station V. In all three diagrams the electrical supply conductors 280—281 plus the fluid pressure and exhaust lines 276—277 are reproduced from Fig. 59 of earlier application Serial 511,941.

These assembled-mold routing facilities of Figs. 39 and 41 cause our Station V transfer car 424 and the left "B" and right "A" mold feed carriages 429 and 427 to operate as diagrammed by Figs. 38a through 38j and as described below. In beginning such description it will be assumed that the two pouring and cooling tracks 428 (for "A" molds) and 430 (for "B" molds) both are empty and that the transfer car 424 initially occupies the left or "B" position of Figs. 38a, 39 and 41.

An assembled "A" mold 12A—14A now is delivered to Station V by the central machine 30 (Fig. 38a). This occurs while the take-off carriage 263' of Fig. 41 is in the fully withdrawn or right position (opposite to the left or arm-inserted position which Figs. 41 and 39 show) wherein the latch 272' and its carrying member are fully outside of the machine arms 61—62 as they arrive at Station V. Following such arrival master control relay RA closes contact 283 and energizes the left winding 290 of valve SV5 over the Fig. 41 circuit that also includes the now-closed left limit switch 432' for mold transfer car 424. This shifts the SV5 elements to the left.

The resultant flow of pressure fluid into the right port 269 of the Fig. 41 cylinder 263' moves carriage 262' to the represented left position, bringing latch 272' behind the assembled "A" mold 12A—14A in machine arms 61—62. Limit switch O thereupon closes and by energizing the right winding 300 of valve SV5 returns carriage 262' back to the right (Figs. 41 and 39), thereby pulling said "A" mold out of arms 61—62 and into the empty right end of the Station V transfer car 424. This stage of the cycle is shown by Fig. 38b.

Fig. 38c indicates what happens next. There the central machine 30 has indexed all five of its turret heads 60 through 72° to bring a "B" assembled mold 12B—14B to Station V, while the transfer car 424 has shifted to the right or "A" position wherein the aforementioned "A" mold in its right end is aligned with the "A" pouring and cooling track 428. This transfer car shift was initiated by arrival of the "A" mold upon the right end of car 424. Such arrival closed a switch shown by Figs. 41 and 39 at M' with accompanying energization of the SV20 right winding over the Fig. 40 circuit that also includes a transfer car switch 449' (Fig. 40) which is closed when the left or "B" end of car 424 is vacant. The resultant shift in SV20 elements to the right flowed pressure fluid into the right end of cylinder 438 (to the right of stationary piston 437) and moved said cylinder and transfer car 424 into the right or "A" position of Fig. 38c.

Further Station V actions as indicated by Fig. 38d now follow. These include a feeding of the Fig. 38c mold "A" from the right end of car 424 upon the "A" pouring and cooling track 428, and withdrawal of the Fig. 38c mold "B" from the machine 30 arms for delivery upon the empty left end of said transfer car 424. Such "B" mold withdrawal and delivery are initiated by master control relay RA (Fig. 41) and are accomplished in the same ways as already described relative to the "A" mold of Figs. 38a and 38b.

Said feeding of the Fig. 38c mold "A" upon the "A" pouring and cooling track 428 from the right end of transfer car 424 is accomplished by the Station V carriage 427 under the control of the Fig. 39 valve SV19. Such feeding is initiated by the arrival of the transfer car 424 in the right or "A" position of Fig. 38c, which arrival closes the car's right limit switch 433 and completes for the right SV19 winding the Fig. 39 circuit that further includes carriage 427's rear limit switch 452 plus a manual switch 550 later to be explained plus the Fig. 40 switch 450 that closed when the "A" mold of Fig. 39b first came into car 424's right end. The resultant shift of SV19 elements to the right flows pressure fluid into the forward end of cylinder 441 (ahead of stationary piston 442) thus driving that cylinder and carriage 427 forwardly and causing bar 443 to push the Fig. 38c mold "A" from car 424 and onto track 428 as shown by Fig. 38d.

Right carriage 427 now is automatically returned to the rear position of Fig. 39 by closure of its forward limit switch 454. This energizes the left SV19 winding over the Fig. 39 circuit wherein switch 454 is included. The accompanying left shift of SV19 elements flows pressure fluid into the rear of cylinder 441 (behind stationary piston 442) and drives that cylinder and carriage 427 back into the rear withdrawn position of Figs. 39 and 42.

Fig. 38e indicates what happens next. There the central machine 30 has brought another assembled "A" mold to Station V, and the transfer car 424 has been shifted back into its left or "B" position. Such transfer car shift was set in action by the rearward return of "A" feed carriage 427 (after moving the Fig. 38c mold "A" upon pouring track 428, as Fig. 38d shows) following the earlier arrival of the Fig. 38c assembled mold "B" upon the left end of transfer car 424, as represented by Fig. 38d. Such arrival closed switch M' (Fig. 40) so that said right carriage 427 in later closing rear limit switch 452' completes the Fig. 40 energizing circuit for the left winding of valve SV20. This flows pressure fluid into the left end of cylinder 438 (to the left of stationary piston 437) with resultant driving of that cylinder and the transfer car 424 from the right or "A" position back into the original left or "B" position of Figs. 38e, 39, 40.

Still further Station V actions as indicated by Fig. 38f now follow. These include a feeding of the Fig. 38e mold "B" from the left end of car 424 upon the "B"

pouring and cooling track 430, and withdrawal of the Fig. 38e mold "A" from the machine 30 arms for delivery upon the empty right end of transfer car 424. Such mold "A" withdrawal and delivery are initiated by master control relay RA (Fig. 41) and are accomplished in the same way as already described relative to the "A" mold of Figs. 38a and 38b.

Said feeding of the Fig. 38e mold "B" upon the "B" pouring and cooling track 430 from the left end of transfer car 424 is accomplished by the Station V carriage 429 under the control of the Fig. 39 valve SV18. Such feeding is initiated by arrival of the transfer car 424 in the left or "B" position of Fig. 38e, which arrival closes the cars left limit switch 432 (Fig. 40) and completes for the right SV18 winding the Fig. 39 circuit that further includes carriage 429's rear limit switch 456 plus a manual switch 551 later to be explained plus the Fig. 40 switch 449 that closed when the "B" mold of Fig. 38d first came into car 424's left end. The resultant shift of SV18 elements to the right flows pressure fluid into the forward end of cylinder 445 (ahead of stationary piston 446) thus driving that cylinder and carriage 429 forwardly and causing bar 447 to push the Fig. 38e mold "B" from car 424 and onto track 430 as shown by Fig. 38f.

Carriage 429 now is automatically returned to the rear position by closure of its forward limit switch 457. This energizes the left SV18 winding over the Fig. 39 circuit wherein switch 457 is included. The accompanying left shift of SV19 elements flows pressure fluid into the rear of cylinder 445 (behind stationary piston 446) and drives that cylinder and carriage 429 back into the rear withdrawn position.

Fig. 39g indicates what happens next. There the central machine 30 has brought another assembled "B" mold to Station V, and the transfer car 424 once more has been shifted into its right or "A" position. Such transfer car shift was set in action by the rearward return of "B" feed carriage 429 (after moving the Fig. 38e mold "B" upon pouring track 430, as Fig. 36f shows) following the earlier arrival of the Fig. 38f assembled mold "A" upon the right end of car 424 as represented by Fig. 38f. Such arrival closed switch M' (Fig. 40) so that said left carriage 429 in later closing rear limit switch 456' completes the Fig. 40 energizing circuit for the right winding of valve SV20. This flows pressure fluid into the right end of cylinder 438 (to the right of stationary piston 437) with resultant driving of that cylinder and the transfer car 424 from the left or "B" position (of Figs. 38e, 39, 40) into the right or "A" position.

The foregoing cycle of our Station V apparatus in alternately withdrawing assembled "A" and "B" molds from machine 30 and in feeding them via the transfer car 424 upon the "A" pouring track 428 and upon the "B" pouring track 430 continues to repeat itself, as Figs. 38h–38i–38j further indicate, as long as said central assembling machine 30 continues to deliver these assembled "A" and "B" molds to Station V. As a result, the right or "A" pouring and cooling track 428 ultimately becomes fully filled with assembled "A" molds 12A—14A and the left or "B" pouring and cooling track 430 likewise becomes fully filled with assembled "B" molds 12B—14B. Such fully filled condition of these two "A" and "B" tracks 428 and 430 is illustrated by Figs. 43a—43j.

Once said assembled "A" molds 12A—14A do so completely fill the "A" pouring and cooling track 428 and once said assembled "B" molds 12B—14B do so completely fill the "B" pouring and cooling track 430, the previously closed switches 550 and 551 in the Fig. 39 control circuits for mold feed valves SV19 and SV18 at Station V can be opened. Such opening of manual switch 550 inserts into the SV19 right winding circuit the two switches for a Station VI mold transfer car 468 (more fully described later) which Fig. 48 shows at 498" and 486'; and such opening of manual switch 551 at Station V similarly inserts into the SV18 right winding circuit the two other switches for the same mold transfer car 468 at Station VI which Fig. 48 shows at 484" and 500'.

The mentioned Station VI switches 498" and 486' now both must be closed before the Fig. 39 right winding of said "A" mold feed valve SV19 can be energized. This means that the Station V carriage 427 now can be advanced to feed another "A" mold upon the entrance end of track 428 only when the mold transfer car 468 at Station VI occupies its "A" track position (left in Fig. 48) wherein the Fig. 48 limit switch 498" is closed, and further only when the "A" end of that car 468 (left in Fig. 48) also is vacant with accompanying closure of the car switch 486'. Such interlock arrangement requires that the transfer car 468 at Station VI must be ready to receive another "A" mold from the exit end of the cooling and pouring track 428 before an additional "A" mold can be fed upon the entrance end of that track at Station V.

The other two mentioned Station VI switches 484", and 500' now likewise both must be closed before the Fig. 39 right winding of said "B" mold feed valve SV18 can be energized. This means that the Station V carriage 429 now can be advanced to feed another "B" mold upon the entrance end of track 430 only when the mold transfer car 468 at Station VI occupies its "B" track position (right in Fig. 48) wherein the Fig. 48 limit switch 484" is closed, and further only when the "B" end of that car (right in Fig. 48) also is vacant with accompanying closure of the car switch 500'. Such interlock arrangement requires that the transfer car 468 at Station VI must be ready to receive another "B" mold from the exit end of the cooling and pouring track 430 before an additional "B" mold can be fed upon the entrance end of that track at Station V.

*Pouring and cope-to-drag securing and cooling of assembled "A" and "B" molds on tracks 428 and 430*

Each assembled "A" mold 12A—14A which is fed from Station V upon the right or "A" pouring and cooling track 428 of Figs. 1, 38–39 and 43 advances into register with apparatus 460A by which molten metal is poured into the sprue opening 23A (see Figs. 5–6) thereof; likewise each assembled "B" mold 12B—14B which is fed from Station V upon the companion left or "B" pouring and cooling track 430 similarly advances into register with apparatus 460B by which molten metal is poured into the sprue opening 23B (Figs. 10–11) thereof. This pouring of itself may be accomplished in known conventional manner.

Incorporated in our system are novel means which function to hold the cope 14 of each mold that is in said "A" line 428 and the cope 14 of each mold that is in said "B" line 430 firmly against the mold drag 12 therebeneath. Simplified representations of these new holding means appear at "Z" in each of Figs. 1, 43a–43j and 57 hereof; such means are disclosed more fully and are claimed by copending application Serial No. 740,792 entitled "Cope-to-Drag Clamping Facilities for Mold Assembling Installation" which was filed by us on June 9, 1958 and they take the place of and do the same thing (but in a better way) as the conventional mold end clamps which earlier application Serial 511,941 shows at 19 in its Figs. 4–5.

These new cope-to-drag securing means will best be understood from an inspection of Fig. 57 (on same drawing sheet as Figs. 43a–43e.) Fig. 57 indicates how the drag 12 of each assembled mold on the "A" track 428 and on the "B" track 430 rides on side rollers 462 either beneath the mold bottom as represented or engaging the drag side bars 28; and it further shows left and right rows of our new top side rollers Z bearing down upon the side bars 28 of the mold cope 14 under the pressure of suitable loading means here illustratively represented in the form of tension springs 464.

These springs 464 can of course be replaced by left and right hydraulic cylinders (not shown herein) organized in the way which our copending application Serial 740,792 further teaches. In either case the downward force which rollers Z apply to cope 14 (via side bars 28) holds the cope against the drag 12 therebeneath with sufficient firmness that each "A" mold so held together on the right track 428 can satisfactorily receive molten metal from pouring device 460A, and that each "B" mold so held together on the left track 430 can satisfactorily receive molten metal from pouring device 460B.

In the illustrative installation here represented these left and right rows of Fig. 57 rollers Z are provided along the "A" track 428 and also along the "B" track 430 throughout the length span which each of Figs. 1 and 43a–43j designates as "Z." With this arrangement each "A" mold and each "B" mold has its cope 14 and drag 12 held together by the "roller-Z" loading force while pouring of the molten metal actually is taking place, and also thereafter while the poured mold is being advanced through four succeeding positions along its cooling track (428 or 430); but each of these molds is freed of such loading force as it more closely approaches the exit track end at our new cope-stripping and drag turn over Station VI.

Upon later arrival at said Station VI the cope 14 of each of these "A" and "B" molds thus no longer is secured to its associated drag 12 and hence may freely be lifted therefrom without the need of the "unfastening" operation that is required when using mold end clamps of the conventional type which earlier application Serial 511,941 shows at 19 in its Figs. 4–5.

Our aforementioned "A" and "B" pouring and cooling tracks 428 and 430 of Figs. 1, 38 and related views are sufficiently long as to permit the castings 10A in each of the "A" molds poured at 460A and the casting 10B in each of the "B" molds poured at 460B fully to solidify and reasonably cool before the molds reach the Station VI apparatus at the track exit ends; and in the installation here illustrated each of these tracks accommodates the thirteen assembled molds which are shown thereon.

Pushing of the molds in each of these "A" and "B" lines along the two roller tracks 428 and 430 is accomplished via force applied at Station V by the right feed carriage 427 (Figs. 39–40, 42) in the case of the "A" line 428 and by the left feed carriage 429 (Figs. 39–40) in the case of the "B" line 430. Such pushing force is transmitted from mold to mold in each line through abutting contact of drag end portions shown at 466 in Figs. 5–6 and 10–11. These end bumper parts 466 on the drags 12 project lengthwise slightly beyond the corresponding end parts of the mating copes 14 which are assembled upon the drags; and this relationship assures that the mold pushing force referred to above all will be transmitted through the bottom drags 12 with none of it being applied to the top copes 14 when resting upon those drags in the way which Figs. 5–6 and 10–11 show.

*Transfer car 468 at Station VI for routing assembled molds "A" and "B" into Station VI elevator and cope stripper*

At the new Station VI of our multi-type mold assembling system we provide the apparatus which Fig. 1 indicates generally as including a mold transfer car 468 plus a cope stripper and mold elevator 470 plus a drag turn over 472 and which Figs. 44 through 56 further represent in both structural and schematic form somewhat simplified at points in order more clearly to explain how this apparatus operates.

Attention first will be directed to the mold transfer car 468 plus the associated elevator feed carriage 478 at this Station VI. From Figs. 44–48 it will be seen that said car 468 rides upon and above a pair of rails 473 which transversely span the exit ends of the "A" and "B" mold pouring and cooling tracks 428 and 430; that this car is moved back and forth along those rails by hydraulic cylinder 474 and piston 475 between a first or "B" position (right in Figs. 44 and 48) and a second or "A" position (left in Figs. 44 and 48); and that such movement is governed by a valve SV22 plus the associated control circuits which Fig. 48 represents.

Cooperating with this mold transfer car 468 at Station VI is the aforementioned central carriage 476 by which assembled "A" molds 12A–-14A and assembled "B" molds 12B–-14B are fed from this car 468 into the mold elevator and cope stripper 470 earlier referred to as adjoining the car. From Figs. 44–45 and 47 it will be seen that this elevator feed carriage 476 is advanced and withdrawn along rails 477 by a cylinder 478 and piston 479, similarly to move the carriage ejector bar 480 by which "A" molds are pushed into elevator 470 from the Fig. 48 left end of transfer car 468 and by which "B" molds are pushed into the same elevator from the Fig. 48 right end of said car.

Serving to govern the aforesaid movements by this elevator feed carriage 476 is the valve SV21 plus the associated control circuits which Fig. 45 represents in illustrative schematic form. These Fig. 45 control circuits cooperate with the valve SV22 control circuits that Fig. 48 shows (likewise in illustrative schematic form) for the associated mold transfer car 468 at Station VI; and in both diagrams the electrical supply conductors 280–-281 plus the fluid pressure and exhaust lines 276–-277 are reproduced from Fig. 59 of earlier application Serial 511,941.

By these transfer car 468 and carriage 476 facilities of Figs. 44–48 the assembled "A" and "B" molds arriving at Station VI via tracks 428 and 430 are fed into the cope stripper and mold elevator 470 in the manner now to be described. To simplify such description it will here be assumed that upon each delivery thereinto of a mold 12A–-14A and of a mold 12B–-14B, the carriage 482 of said elevator 470 promptly takes such mold upwardly (and disposes of its components in the manner which a later portion of this specification describes) and then returns to the lowered position of Fig. 45 in full and undelayed readiness to receive another assembled and poured mold 12–-14 from the transfer car 468.

Said operation description will start with the Station VI transfer car 468 in the right or "B" position of Figs. 44 and 48 and with the right or "B" end thereof empty, as those drawing views show, but with the opposite or "A" end thereof carrying a poured "A" mold, as Figs. 43c and 48 both indicate; also with the elevator feed carriage 476 withdrawn into the rear position of Figs. 44–45.

Figure 43D:
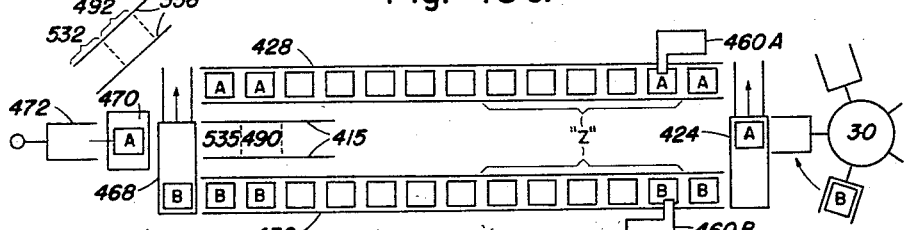

There now take place the actions which Fig. 43d diagrams. These include feeding of the aforesaid "A" mold into the elevator 470 from the left end of transfer car 468, and entry into the right end of that car of a poured "B" mold from the exit end of cooling track 430. Such entry results from an earlier-described pushing at Station V of another "B" mold upon the entrance end of said track 430, with resultant advancement of the leading "B" mold at Station VI upon car 468's right end.

The above Fig. 43d "A" mold feeding into elevator 470 is effected by the Station VI carriage 476, which now moves forwardly. This results from energization of the right winding of valve SV21 over the Fig. 45 circuit that includes a right limit switch 484 (Fig. 48) for transfer car 468 plus a left-end-occupied switch 486 (Fig. 48) for the same car plus a rear limit switch 487′ (Fig. 45) for this carriage 476 plus carriage-down and carriage-vacant switches 497 and 499 for the mold elevator 470. The resultant shift in SV21 elements to the right flows into the rear of cylinder 478 pressure fluid which drives piston 479 and carriage 476 forwardly, causing bar 480 to push the poured "A" mold from the left end (Figs. 44 and 48)

of car 468 and into the carriage 482 (Fig. 45) of the elevator 470.

Said feed carriage 476 thereupon returns to the withdrawn rear position of Figs. 44–45, due to closure of the carriage's forward limit switch 488' which by energizing the SV21 left winding (Fig. 45) admits into the front end of cylinder 478 pressure fluid which drives piston 479 and carriage 476 to the rear. In the meantime, elevator 470 has lifted the mold "A" of Fig. 43d as earlier received in its carriage 482 (Fig. 49b), stripped the cope 14 therefrom (Fig. 49c) for ejection upon return track 415 via shakeout 490 (Fig. 49d), ejected the drag 12 with solidified castings 10 into turnover device 472 (Figs. 49c and 49d), and then returned the now-empty carriage 482 (Fig. 49a) to its lowered starting position of Fig. 45.

Figure 43E:
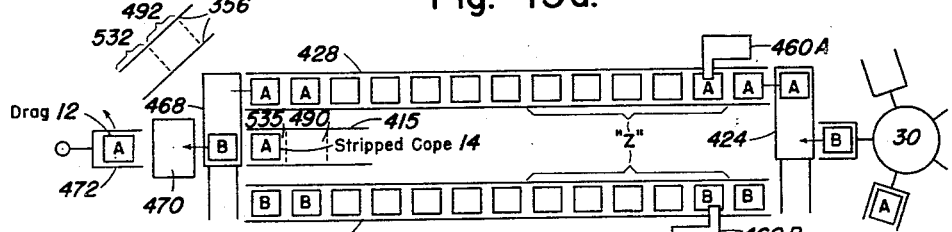

Fig. 43e indicates that next to take place at Station VI is a shift by mold transfer car 468 from the right "B" position of Fig. 48 to the opposite or "A" position of Fig. 43e. Such right-to-left shift is initiated by feed carriage 476's rear limit switch 487 which closed after the Fig. 43c mold "A" was fed into elevator 470; and it results from energization of the valve SV22 right winding over the Fig. 48 circuit that includes said switch 487 plus contact 495 of a stick relay SR6 plus the "B"-end limit switch 484 (right Fig. 48) for car 468. Said stick relay SR6 was earlier picked up by feed carriage 476's forward limit switch 488 (Fig. 45) over the Fig. 48 circuit that further includes a second "B"-end limit switch 484' for car 486; it then locked itself in over a second contact 496 with resultant holding of its first contact 495 closed; and by these actions relay SR6 permits the Station VI transfer car 468 to be moved out of its "B" position (right in Fig. 48) only after the Station VI mold feed carriage 476 has completed the cycle of forward and return movement by which the Fig. 43c mold "A" earlier was inserted into elevator 470.

Energization of the SV22 right winding as above shifts the SV22 elements (Fig. 48) to the right and flows into the right end of cylinder 474 pressure fluid which drives piston 475 and transfer car 468 from the "B" or right position of Fig. 48 to the opposite or "A" position of Fig. 43e. Car limit switch 484' opened at the start of such movement to release contacts 495—496 of stick relay SR6 (Fig. 48). In this new "A" position of Fig. 43e, the Station VI transfer car 468 has brought its carried mold "B" (of Fig. 43d) into central alignment with elevator 470, and also has brought the empty "A" car end into alignment with the "A" pouring and cooling track 428.

Figure 43F:
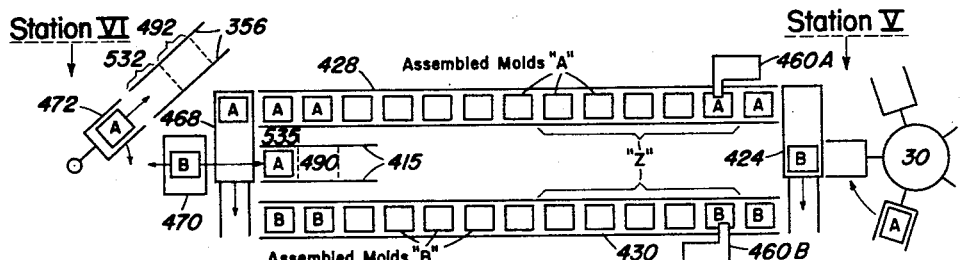

Next to take place at Station VI are the actions diagrammed by Fig. 43f. These include feeding of the aforementioned "B" mold from the right end of transfer car 468 into the elevator 470, and entry into the left end of that car of another poured "A" mold from the exit end of cooling track 428. Such entry results from an earlier-described pushing at Station V of another "A" mold upon the entrance end of said track 428, with resultant advancement of the leading "A" mold at Station VI upon car 468's left end.

The just mentioned feeding of the Fig. 43e mold "B" into elevator 470 is meanwhile accomplished by the central carriage 476, which now moves forwardly. This results from energization of the right winding of valve SV21 over the Fig. 45 circuit that includes a left limit switch 498' (Fig. 48) for transfer car 468 plus a right-end-occupied switch 500 (Fig. 48) for the same car plus the rear limit switch 487' (Fig. 45) for this carriage 476 plus carriage-down and carriage-vacant switches 497 and 499 for the mold elevator 470. By again shifting to the right, the SV21 elements once more admit into the rear of cylinder 478 pressure fluid which drives carriage 476 and bar 480 forwardly thus pushing the Fig. 43e mold "B" from the right end (Figs. 44 and 48) of car 468 and into the elevator. Upon completing such mold insertion, carriage 476 again returns (under control of forward limit switch 488') to its withdrawn position of Fig. 45.

In the meantime elevator 470 has lifted the mold "B" of Fig. 43f as earlier received in its carriage 482 (Fig. 49b), stripped the cope 14 therefrom (Fig. 49c) for ejection upon return track 415 via shakeout 490 (Fig. 49d), ejected the drag 12 with solidified castings 15 into turnover device 472 (Figs. 49c and 49d), and then returned the now-empty carriage 482 (Fig. 49a) to its lower starting position of Fig. 45.

Figure 43G:
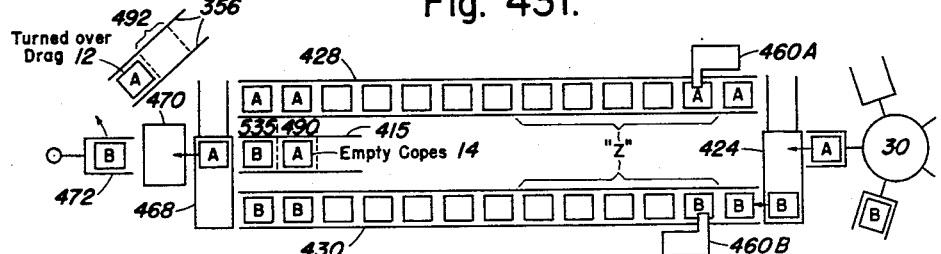

Fig. 43g indicates that next to take place at Station VI is a shift by mold transfer car 468 from the left "A" position of Fig. 43f to the opposite or "B" position of Figs. 43g and 44. Such left-to-right shift is initiated by feed carriage 476's rear limit switch 487 which closed after the Fig. 43e mold "B" was fed into elevator 470; and it results from energization of the valve SV22 left winding over the Fig. 48 circuit that includes said switch 487 plus contact 495 of stick relay SR6 plus the "A"-end limit switch 498 (left, Fig. 48) for car 468.

Said stick relay SR6 was earlier picked up by feed carriage 476's forward limit switch 488 (Fig. 45) over the Fig. 48 circuit that further includes a second "A"-end limit switch 498' for car 486. As before, it then locked itself in over contact 496 and thus held its contact 495 closed; and likewise as before, these actions by relay SR6 permit the Station VI transfer car 468 to be moved out of its "A" position (left in Fig. 48) only after the Station VI mold feed carriage 476 has completed the cycle of forward and return movement by which the Fig. 43e mold "B" earlier was inserted into elevator 470.

Energization of the SV22 left winding as above shifts the SV22 elements (Fig. 48) to the left and flows into the left end of the Fig. 48 cylinder 474 pressure fluid which drives piston 475 and transfer car 468 from the "A" position of Fig. 43f back into the opposite or "B" position of Figs. 43g and 48. Car limit switch 498' opened at the start of such movement to release contacts 495—496 of stick relay SR6 (Fig. 48).

In this new "B" position of Fig. 43g, the Station VI transfer car 468 has brought its carried mold "A" (of Fig. 43f) into central alignment with elevator 470, and also has brought the empty "B" car end (right in Fig. 48) into alignment with the "B" pouring and cooling track 430.

Figure 43H:
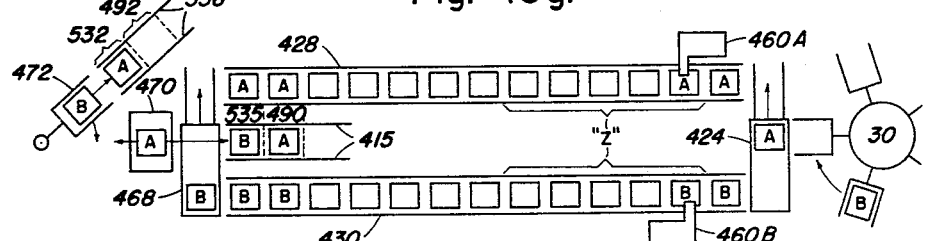

There next follow at Station VI the actions which Fig. 43h diagrams. These include feeding of the aforementioned "A" mold from the left end of transfer car 468 into the elevator 470, a lifting and other processing by elevator 470 of that Fig. 43g mold "A" as received by the mold carriage 482, and entry into the right end of transfer car 468 of another poured "B" mold from the exit end of track 430. Such entry results from an earlier-described pushing at Station V of another assembled "B" mold upon the entrance end of said track 430, with resultant advancement of the leading "B" mold at Station VI upon car 468's right end.

The above mentioned "A" mold feeding into elevator 470 from transfer car 468's left end is meanwhile accomplished by the central carriage 476 in the same way as already described for the previous similar feeding of the earlier "A mold that Fig. 43c shows on the car 468 and that Fig. 43d shows in the elevator 470; and the above mentioned lifting and other processing by elevator 470 of this Fig. 43g–43h mold "A" as last received in the elevator carriage 482 likewise is accomplished in the same way as already described in explaining the earlier similar actions by elevator 470.

Figure 43I:
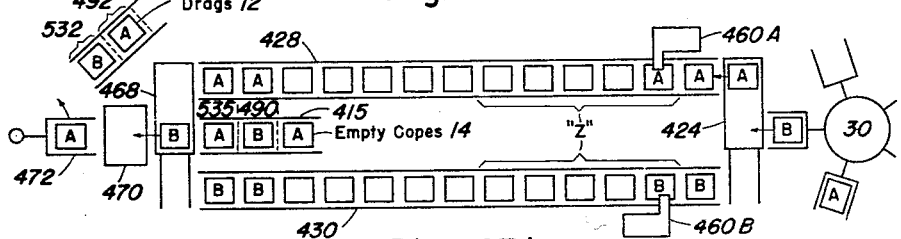
Figure 43J:
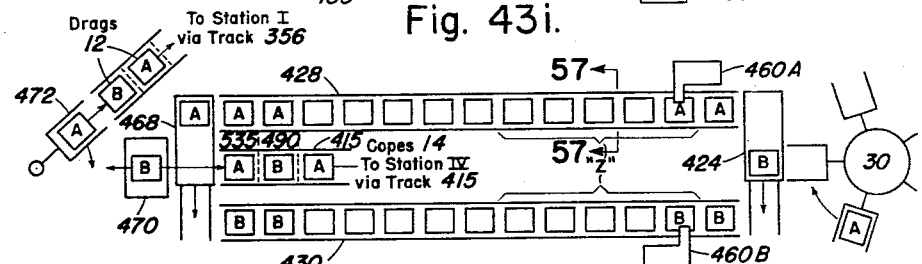

In continuing to operate as per Figs. 43i, 43j, etc., our mold transfer car and feed carriage 476 at Station VI repeat the various actions described above and thereby continue to supply the elevator 470 with more poured "A" molds from track 428 alternated with more poured "B" molds from track 430; and said elevator 470 likewise continues stripping the copes 14 from these additional molds and transferring those copes upon return track 415 in the successive way which Figs. 43*i* and 43*j* indicate, and also continues delivering the drags 12 (with castings 10) of these additional "A" and "B" molds into associated drag turn over apparatus 472 at Station VI.

Our earlier-described control of these operation actions is such that the carriage 482 of mold elevator 470 must be both down (to close the Fig. 45 switch 497) and vacant (accompanied by closure of the Fig. 45 switch 499) before the Station VI carriage 476 can be advanced (via energization of the right SV21 winding over the Fig. 45 circuit that includes said switches 497 and 499) to feed another mold 12A—14A or 12B—14B from the transfer car 468 into said elevator carriage 482.

*Mold elevator and cope stripper 470 and cooperating drag turn over 472 at Station VI*

Further attention will now be given to the elevator 470 and drag turn over 472 portions of our new Station VI equipment. These devices 470 and 472 as shown in top plan view by Fig. 1 already have been referred to generally in our description of Figs. 43–44–45; simplified representations of additional features thereof appear in Figs. 49 through 55; and this elevator and cope stripper 47 and drag turn over 472 apparatus is disclosed even more fully and is claimed by a copending application Serial No. 742,324 entitled "Cope Stripping and Drag Turn Over Facilities for Mold Assembling Installation" which was filed by us on June 16, 1958.

Said mold elevator and cope stripper 470 is illustrated by Figs. 49*a*–49*d* hereof in a schematic form that has been simplified in order more clearly to explain how this apparatus operates; and said cooperating drag turn over 472 at Station VI likewise is illustrated by Figs. 51–55 hereof in a similar schematic form that also has been simplified for the purpose of more clearly explaining the mode of operation.

Looking first at the elevator and cope stripper 470, the carriage 482 thereof as shown by Figs. 45 and 49 is at proper times lifted upwardly by cylinder 504 via piston 505 and rod 506 upon admission of pressure fluid into the cylinder's lower port 507. Such admission elevates car 482 from the bottom position of Figs. 45 and 49*a*–49*b* to the top position of Figs. 49*c*–49*d*; and the carriage 482 is thereafter lowered at proper times by removing supply of pressure fluid from port 507 (via a hydraulic valve not here shown) and connecting that port with an exhaust line.

Each poured mold 12—14 that is fed (as earlier described herein) into the lowered carriage 482 by the pusher bar 480, as shown by Figs. 45 and 49*a*–49*b*, has its drag flask 12 initially supported on rollers 510 which are mounted on left and right stationary cross bars 511 forming part of elevator 470's frame structure. This is clearly shown by Fig. 50. The carriage 482 is thereupon raised (as described above), following withdrawal of feeder bar 480; and early during this carriage elevation, cope stripping rollers 512 mounted on carriage members 513 (as Figs. 49*b*–50 show) engage the cope side bars 28 and thus lift the cope 14 away from drag 12 while the drag still rests on stationary rollers 510.

Such lifting or stripping action continues until a third set of left and right rollers 514 provided on the carriage near its bottom (see Fig. 50) rise up into engagement with the drag side bars 28. At this point the cope 14 rides in the carriage substantially above the drag 12 therebeneath, with such spacing being as shown by Fig. 49*c*. Said same vertical spacing between cope and drag is maintained while the carriage 482 continues to rise; and it continues until and after the carriage has reached its top position of Fig. 49*c*.

Cooperative actions on the part of the drag turn over apparatus come into the picture at this stage of the Station VI cope stripping and mold lifting cycle. Said turn over device 472 comprises a base pedestal shown at 517 in Fig. 55 upon the top of which there is supported the head represented at 516 in Figs. 45, 51–51*a*, 52–52*a*, 53–53*a*, 54–54*a*, 55 as being swingable around the vertical mounting shaft 518 between the two positions respectively diagrammed by Figs. 52 and 52*a*; and swinging movement from one to the other of these two positions (also shown in full lines and dotted by Fig. 1 at Station VI) is at proper times imparted to the head 516 by the hydraulic cylinder 520 of Figs. 52–52*a*.

Extending from the right end of this head 516 and supported therein for rotation about the horizontal axis of member 521 is the turn over assemblage designated 472′ in each of Figs. 45, 49, 51–51*a*, 52–52*a*, 53–53*a*, 54–54*a* and 55. The mentioned rotation takes place through a turn over range of 180° which is traversed by assemblage 472′ in going from the drag-upright position of Fig. 53 to the drag-turned-over position of Fig. 53*a*; and such turn-over rotation (and return) is at proper times imparted to assemblage 472′ through member 521 by a hydraulic motor shown at 522 in each of Figs. 51–55.

The assemblage 472′ utilizes left and right side arms 524 along the opposed inner faces of which are disposed top and bottom rows or rollers 76′ positioned to accommodate therebetween the left and right side bars 28 of each drag flask 12 that is drawn into the assemblage from elevator 470 (Fig. 49) in the manner which Fig. 51 indicates. Such indrawing of a drag 12 as well as later ejection thereof, is at proper times accomplished by a hydraulic cylinder 526 whose piston 527 connects via rod 528 with an ejector plate 530 and a draw-in latch 531; and both of these members 530—531 thus can be moved by cylinder 526 back and forth through casing 472′ between a first or extended position of Fig. 51 and a second or indrawn position of Fig. 51*a*.

Starting with the Station VI elevator 470 in the condition of Fig. 49*c* wherein the carriage 482 is at the elevator top carrying a stripped cope 14 on upper rollers 512 and a mold drag 12 (with castings 10) on its lower rollers 514, the turn over assemblage 472′ in the full-line position of Fig. 1 extends the latch 531 of Fig. 51 engaging it behind the inner rim of said drag flask 12 in the way which Fig. 51 shows. Cylinder 526 then draws said latch 531 and the drag 12 to the right into the Fig. 51*a* position wherein said drag 12 has been taken out of the elevator 470 and entered into the 472′ assemblage casing as Figs. 51*a* and 52 both show. Here the drag side bars 28 are engaged by the left and right sets of supporting rollers 76′ (as Fig. 53 indicates) on side arms 524.

The assemblage 472′ next is swung by cylinder 520 around vertical mounting shaft 518 from the Fig. 52 position in register with elevator 470 (shown full line by Fig. 1) to the Fig. 52*a* "third" position (shown dotted by Fig. 1) that is in register with the Figs. 1 and 55 track 532 which inclines downwardly from Station VI to the drag shake out 492 that leads to the entrance end of the empty-drag return track 356. Motor 522 now rotates the assemblage through 180° into the Figs. 53*a*–54 "fourth" position wherein the drag 12 has been completely turned over and is in that "turned over" condition supported within casing 472′ via side bars 28 and rollers 76′, as Fig. 53*a* shows.

The solidified castings 10 now drop out of the turned-over drag flask 12 and are retained by the casing 472′, as Figs. 53*a*–54 show. Part of the sand 13 (Figs. 5–6 and 10–11) as earlier packed into the flask at Station I may also fall out at this point, even though Figs. 53*a*, 54–54*a* hereof do not so indicate; moreover, the castings 10 here may at least partially break away from their associated sand core 15.

Cylinder 526 next advances push out plate 530 from the indrawn position of Fig. 54 to the extended position of Fig. 54*a*; and by this action the castings 10 plus any loose sand 13—15 plus the turned over drag flask 12 are pushed from the casing 472'. Such pushing enters said drag 12 upon the rollers of the Fig. 55 track 532 which leads to the drag shakeout (Figs. 55 and 1), and it sends the castings 10 and loose sand down the inclined plate 533 of Fig. 55 and upon the casting shakeout 494.

Following such completion of the drag turn over and processing cycle, our apparatus 472 of Fig. 54a withdraws plate 530 and latch 531 back into casing 472', rotates this assemblage 472' around horizontal member 521 from the turned over position of Fig. 53a back into the unturned over position of Fig. 53, shifts the assemblage around the vertical mounting shaft 518 (for head 516) from the track 532 registering position of Fig. 52a (shown dotted in Fig. 1) back into the elevator 470 registering position of 52 (shown full line in Fig. 1). This reconditions said apparatus 472 for withdrawing another mold drag 12 (with castings 10) from the rollers 514 (Fig. 49c) of our Station VI elevator 470 and subjecting it to a processing cycle which exactly duplicates the one described by the foregoing paragraphs.

Meanwhile, the stripped cope 14 which Fig. 49c shows as being carried in the top of Station VI elevator on the upper rollers 512 of the raised carriage 482 is withdrawn therefrom into a frame 535 here shown as being attached to the side of elevator 470 and as leading to the cope shake out 490 that comunicates with the empty cope return track 415 of Figs. 1 and 45–46. This withdrawal may be effected by any suitable means, such as those which the Fig. 49 views illustratively show in the form of a cylinder 536 with piston rod 539 on the end of which a latch 538 is carried.

This cope-withdrawing cylinder 536 here shown on the right or cope-shakeout side of elevator 470 can if desired be positioned on the opposite or left elevator side (above drag turn over 472) and arranged to push the stripped copes 14 out of the elevator carriage 482 instead of pulling them out as here diagrammed. When the here represented latch 538 is projected into the elevator 470 as Fig. 49c shows, it hooks over the inside of cope 14's end wall; and as the piston 537 of cylinder 536 then is moved to the right (by hydraulic pressure fluid) it pulls the latch and the stripped cope 14 out of the elevator carriage 482 and upon receiving rollers 540 in frame 535. These rollers 54 support the withdrawn cope via its side bars 28.

Such transfer of the stripped cope 14 of Fig. 49c from elevator 470 into frame 535 having been accomplished, this cylinder 536 remains in the withdrawn condition of Fig. 49d until the elevator carriage 482 as later lowered to the Fig. 49a position has received another poured mold 12—14 (Fig. 49b) from the Station VI transfer car 468 (Fig. 45) and has elevated that new mold into the Fig. 49c position with accompanying stripping of the cope 14 thereof from the drag 12 and castings 10 thereof. When this happens cylinder 536 once more advances latch 538 into the elevator top and then withdraws that newly stripped cope 14 into the frame 535.

Such new cope pushes the first cope 14 out of said frame and upon the cope shake out 490 of Figs. 1, 45 and 49. Said shake out thereupon functions in conventional manner to remove the sand 13 from the received cope flask 14; and at the same time it advances that now-empty cope flask 14 down the slope of the vibrating shake-out grating (see Figs. 45–46) and upon the similarly sloping roller track 415 (see Figs. 1 and 46) via which the flask is returned by gravity to the "Cope-On" Station IV of the central assembling machine 30.

In the soil pipe foundry installation upon which the drawings hereof are based, our Station VI mold elevator and cope stripper 470 and our cooperating drag turn over apparatus 472 perform the above-explained operations in an automatic manner under the governing actions of suitable control means. Such control means for elevator 470 and for turn over 472 are not illustrated here, but they are disclosed and claimed by our earlier mentioned copending application Serial No. 742,324 entitled "Cope Stripping and Drag Turn Over Facilities for Mold Assembling Installation."

These cope stripping and drag turn over operations at Station VI results in the actions which Figs. 43a through 43j diagram in their left portions. Starting with these Station VI devices 470 and 472 both empty (Figs. 43a–43b–43c), the first assembled and poured "A" mold 12A—14A that is fed into the bottom of elevator 470 as per Fig. 43d is lifted by the elevator carriage 482 with the described stripping of the cope 14A from the drag 12A and castings 10A; and this is followed by the described transfer of that stripped cope 14A from the raised carriage into the frame 535 (Figs. 43e, 45, 49d) at the right thereof, and by the described pulling of the drag 12A with casting 10A out of the elevator and into the drag turn over 472 (Figs. 43e, 45, 49d) at the left thereof.

At this point the elevator carriage 482 returns to the lowered position of Fig. 49a, in readiness to receive a second assembled mold 12—14 (which will be of the "B" type) from the Station VI transfer car 468. Meanwhile, the cooperating apparatus 472 turns the aforementioned first "A" mold drag 12A over and otherwise processes it as already described by reference to Figs. 51–54a. The castings 10A thus emptied from the drag now go upon the Fig. 55 shakeout 494 and are thereafter taken away from Station VI by conveyor 502 (Figs. 1 and 55), while the turned over drag flask 12 from this first mold 12A—14A is ejected upon track 532 (Figs. 43g, 55) from which it advances over drag shakeout 492 and thence on to track 356 for return to Station I. Having accomplished the above, the turn over apparatus 472 gets ready to receive the drag 12 (with castings 10) from the second cope-stripped mold which carriage 482 later brings to the top of elevator 470.

Said second assembled and poured mold is of the "B" type 12B—14B and next is fed into the lowered elevator carriage 482 as per Fig. 43d. It is processed exactly as explained above for the first-received "A" mold 12A—14A. After being lifted to the elevator top, the stripped cope 14B of this second mold is ejected from elevator 470 to the right and into frame 535 (Fig. 43); and such "B" cope 14 ejection pushes the first cope flask 14A out of that frame 535 and upon the cope shakeout 490 (Fig. 43g) over which that second cope 14 passes onto track 415 by which it is returned to Station IV. At the same time the "B" drag 12B (with castings 10B) from the aforesaid second stripped mold 12B—14B is taken from the left of elevator 470 into drag turn over 472. It thereupon empties the castings 10B upon shakeout 494 (Fig. 55) for picking up by conveyor 502 and sends this second turned over drag flask 12 down track 532 and then over shakeout 492 to the drag return track 356. Having accomplished the foregoing, the drag turn over 472 and mold elevator 470 get ready to receive and handle the third mold 12—14 in their now-explained processing series.

It is of the "A" type 12A—14A, and is fed into the lowered elevator carriage 482 as Fig. 43h shows. The components of this third mold are thereupon processed in exactly the same way as were those of the second mold ("B" type) and those of the first mold ("A" type). Succeeding molds (fourth, fifth, sixth, etc.) fed into the elevator 470 at Station VI in alternate "B" and "A" order are in turn subjected to precisely the same treatment.

*Finished castings 10 taken away from Station VI by conveyor 502*

Earlier description of our Station VI apparatus has pointed out how the solidified castings 10 with sand cores 15 from each of the mold drags 12 passed through and acted upon by the turn over device 472 come out of that apparatus to slide down the inclined plate 533 which directs them upon the casting shakeout shown at 494 in Figs. 1 and 55.

Said shakeout 494 functions in conventional manner to free these castings 10 of the sand 13 which is adhering to them when they arrive upon the shakeout from Station VI, as well as of the sand that makes up the cores 15 for these castings; moreover, in passing along roller track 532 above and over this same shakeout 494 the turned over drag flasks 12 out of which these castings 10 were dropped also may let some of their sand go down through the spaces between the track 532 rollers and thence upon the shakeout. All such sand brought to this shakeout 494 falls through the vibrating grating thereof and down into a hopper 542 for delivery upon a suitable sand conveyor (not shown) which takes it back into a central system of sand conditioning and supply (also not represented).

The castings 10 and core-reinforcing arbors 21 (see Figs. 5a and 10b) thus freed of and separated from their sand now advance down the inclined surface of said vibrating shakeout 494 and thence upon the earlier mentioned casting conveyor 502. This conveyor 502 may be of any suitable type such as Fig. 1 designates as "vibrating pan" or such as Fig. 55 represents in the form of a continuously moving belt. That Fig. 55 showing has been chosen to simplify illustration; for in the soil pipe foundry installation previously mentioned the vibrating-pan form of this castings conveyor 502 which Fig. 1 shows is extended to the left (beneath the drag-return track 356 thereabove) to the discharge edge of the Fig. 55 shakeout 494.

By this conveyor 502 these finished castings 10 and the arbors 21 from the cores thereof are carried away from Station VI (to the right in Figs. 1 and 55). Said arbors 21 are removed from conveyor 502 at the point so marked in Fig. 1, and are taken to the Station II end of core-box-return track 187 where they are placed in the passing empty core boxes 26A and 26B (as explained in the earlier description of our Station II) at the Fig. 1 point marked "Arbors 21 In."

Conveyor 502 continues to carry the finished castings 10 past said Fig. 1 arbor-removal point and delivers those castings into suitable cleaning apparatus (not shown) which is beyond the extreme right of Fig. 1 and through which those castings pass in preparation for shipment.

In going through and being acted upon by our Station VI apparatus, each drag 12A of an "A" type mold 12A—14A yields the four solidified castings 10A (again see Fig. 2) which Fig. 1 shows at the top extreme right, while each drag 12B of a "B" type mold 12B—14B similarly yields the four solidified castings 10B (again see Fig. 7) which Fig. 1 also shows on conveyor 502 closer to Station VI. Since the assembled and poured molds from Station V are fed into said Station VI apparatus in the alternate "A" and "B" order earlier explained by reference to Figs. 43a–43j, the sets of finished castings 10A and 10B from the turned over drags 12A and 12B thus also are delivered in the same alternate "A" and "B" sequence upon our castings conveyor 502; and they there thus line themselves up in the alternate "A" and "B" groups which Fig. 1 represents.

*Return of empty drag flasks 12 to Station I and return of empty cope flasks 14 to Station IV*

Each drag flask 12 (from an "A" type mold and from a "B" type mold) which passes from turn over apparatus 472 over the track 532 of Figs. 1 and 55 and thence upon the drag shakeout 492 as earlier described, is while upon that shakeout freed of all remaining sand therein. That shakeout 492 functions in conventional manner, and the so removed sand falls through the shakeout's vibrating grating down into a hopper 544 (Fig. 55) for delivery upon the aforementioned sand conveyor (not shown) by which such sand from the turned over drag flasks is taken back into the aforesaid central system of sand conditioning and supply. The flasks 12 while being thus freed of their sand advance down the inclined surface (Figs. 55–66) of said vibrating shakeout 492 and thence upon the drag return track 356.

From Figs. 43a–43j it further has been seen how the turned over drags 12 as delivered by apparatus 472 upon this drag shakeout 492 come from assembled and poured molds which alternately are of the "A" type 12A—14A and of the "B" type 12B—14B. However, the empty flasks 12 from which these "A" and "B" type drags are made up by the sand charging apparatus at our "Drag-On" Station I are in pre-charged empty condition exactly the same for the two types of drags and molds "A" and "B"; wherefore when these drag flasks from said "A" and "B" molds later are turned over at Station VI and emptied of their castings and sand they at that point lose all identification with the "A" and "B" type molds from which they came. All empty drag flasks 12 leaving the drag shakeout 492 at Station VI are therefore identical.

In thereafter advancing down the gravity track 356 of Figs. 1 and 55–56 and in entering the drag-charging apparatus 160' thereat (Figs. 1 and 24–26), each and every one of these empty and identical flasks 12 is therefore equally suitable for being incorporated either into a "A" type drag 12A or into a "B" type drag 12B; and it accordingly becomes unnecessary to synchronize the return of these empty flasks 12 to Station I with the sequence in which "A" and "B" type drags alternately are produced therefrom by our Figs. 24–26 apparatus at that station.

A similar situation exists with respect to the empty cope flasks 14 which are returned from Station VI to Station IV via the gravity track 415 of Figs. 1 and 45–46; for in their fully empty condition all of these cope flasks 14 likewise are identical. The stripped copes 14 taken from the top of our Station VI elevator 470 into frame 535 (Figs. 45 and 49) come from poured and assembled molds which alternately are of the "A" type 12A—14A and of the "B" type 12B—14B and hence carry sand-cavity impressions of the alternate "A" and "B" varieties when arriving upon the cope shakeout 490 from frame 535.

However, once these empty cope flasks 14 have had the sand removed therefrom and are advanced by shakeout 490 upon the return track 415, they have lost all previous identification with the "A" and "B" type molds from which they were stripped in our Station VI elevator 470; wherefore all empty cope flasks 14 that leave the Fig. 45 shakeout 490 are exactly the same.

Hence in arriving at Station VI via return track 415 and entering the cope-charging apparatus 240' thereat (Figs. 1 and 35–37), each and every one of these identical and empty flasks 14 is equally suitable for being made up either into an "A" type cope 14A or into a "B" type cope 14B; and it thus becomes unnecessary to synchronize the return of these empty flasks 14 to Station IV with the sequence in which "A" and "B" type copes alternately are produced by our Figs. 35–37 apparatus at that station.

The gravity track 415 of Fig. 45 by which said cope return is effected is shown by that drawing view to have a downward slope from Station VI to Station IV which while relatively gentle still is sufficient to assure that each cope flask 14 entered thereupon from the shakeout 490 will advance down the track rollers (not here shown) at a moderate speed which is however fast enough to prevent accidental stoppage before the empty flask has arrived at Station IV. Similar characteristics likewise are had by the gravity track 356 of Fig. 56 which returns the empty drag flasks 12 from Station VI to Station I; and also by the gravity track 187 of Fig. 23 which returns the empty core boxes 26 from Station III to Station II.

Operation of our complete system of multi-type mold production and assembly

The mode of operation for our complete system of multi-type mold production and assembly as here disclosed will have become apparent from the foregoing detailed description of the various components comprised thereby when considered with the explanatory captions which appear in the view of Fig. 1.

Each time that the apparatus at all of our five Stations I—II—III—IV—V around the central machine 30 has fully performed its intended function, the interlock circuits which earlier application Serial 511,941 shows along the right of its Fig. 59 control diagram so register that fact by energizing the left winding 294 of valve SV1 (reproduced in Fig. 21 hereof) over contact 284 of the earlier Fig. 59 relay RB. Said relay RB holds this contact 284 picked up and permits the winding 284 energization just stated due to RB relay energization over the earlier Fig. 59 limit switch B (reproduced as B' in Fig. 21 hereof) which the turret indexing cylinder 82 of the earlier Figs. 11–12 and 59 (reproduced as 82 in Figs. 20a and 21 hereof) keeps closed as long as piston 90 of that cylinder is withdrawn (as represented) in readiness to produce another 72° indexing movement by the central machine turret 54.

Such 72° indexing movement now is imparted to the central machine turret 54 by the above stated energization of the SV1 left winding represented at 294 by Fig. 21 hereof and by Fig. 59 of earlier application 511,941. This admits pressure fluid from line 276 into indexing cylinder 92 behind piston 90 (cylinder left end in Fig. 21 hereof), and by advancing pawl 85 causes ratchet wheel 86 to index turret 54 as stated. At the start of such indexing, the stop cylinder shown at 92 by Figs. 20 and 20a hereof holds block 95' (corresponding to element 95 of earlier application Figs. 11 and 13) out of the path of the stop lug 98' for the turret arm head 60 initially blocked thereby; but during the new indexing movement cylinder 92 returns said block 95' to its represented blocking position, and in this way limits rotative travel by the turret to 72°.

At the end of such rotative travel, the indexing cylinder 82 closes its forward limit switch A (reproduced as A' in Fig. 21 hereof) and picks up thereover the master system relay shown at RA by Fig. 59 of earlier application 511,941 and by Figs. 24 (Station I), 34 (Station II), 35 (Station IV) and 42 (Station V) hereof. In now closing contact 283 (Fig. 59 earlier application 511,941), this relay RA brings the apparatus at each Stations I, II, III, IV and V into action. Such activation produces the earlier described insertions into the turret head 60 arms 61—62 newly arriving at Stations I and II and IV respectively of another sand-charged drag 12 and of another matching core 15 in core box 26 and of another matching sand-charged cope 14; and it simultaneously produces the earlier described withdrawals from the turret head 60 arms 61—62 newly arriving at Stations III and V respectively of another empty core box 26 and of another assembled mold 12—14.

Another result of the above pick up by RA relay contact 283 is to return turret indexing cylinder 82 to the withdrawn position represented by Fig. 21 hereof and by Fig. 59 of earlier application Serial 511,941. Such return results from energization of the valve SV21 right winding 286 over the earlier Fig. 59 circuit shown as including timer 321; and it flows pressure fluid from line 276 into the forward end of cylinder 82 with accompanying return of piston 90 and ratchet 85 to the rear. Such return reopens limit switch A, and recloses switch B'.

Having thus accomplished the foregoing five sets of "Station" actions, our new apparatus at each of these five Stations I through V around the central assembling machine 30 gets ready to perform its intended function again. Such repeated performance takes place at the later time when all five sets of this station apparatus once more are in full readiness to do this; said full readiness condition then is once more registered by the master system interlock circuits, previously mentioned as being shown by earlier application Serial No. 511,941 along the right of its Fig. 59 control diagram; and by the accompanying pick up of the master system relay RB (earlier application Fig. 59) such new readiness registration produces another 72° indexing by the five arm heads 60 on the central machine turret 54.

Each arm set 61—62 now newly arriving at the five Stations I through V around central machine 30 is acted upon by the apparatus at that station in the same manner as outlined above, except that the "type" of drag and core and core box and drag assembled mold respectively handled at these five stations now changes; i.e., if at a given station the type was "A" before it now is "B"; and if "B" before it now is "A." Upon later third turret indexing, the mold component and mold "type" again changes back to what it was for the first indexing, and so on.

The details of what goes on at each of our individual Stations I—II—III—IV—V incident to the above, and also at our new Station VI, have been fully explained by earlier portions of this specification; and further comment on such earlier explanations for our six individual stations is therefore unnecessary here.

Instead it will suffice to observe that the multi-type mold assembling technique and facilities herein disclosed are capable of an inherently wide and diversified application, and that the specific mold assembling functions herein explained therefor are accordingly to be interpreted in an illustrative rather than in a restrictive sense.

Our inventive improvements as here shown and described are therefore extensive in their application and hence are not to be limited to the specific form here disclosed by way of illustration.

What we claim is:

1. In a foundry installation, the combination of a machine from which assembled "A" type and "B" type molds are discharged in alternate "A" and "B" sequence, first and second pouring and cooling tracks extending away from said machine in laterally spaced and generally parallel relation, means for feeding each said discharged "A" mold upon the entrance end of said first track with accompanying pushing of other "A" molds thereahead along that track towards its exit end, means for feeding each said discharged "B" mold upon the entrance end of said second track with accompanying pushing of other "B" molds thereahead along that track towards its exit end, an elevator organized to have "A" and "B" molds from the exit ends of said first and second tracks inserted thereinto, a transfer car intermediate said elevator and the aforesaid track exit ends there disposed for movement back and forth between those two laterally spaced exit ends and being adapted to receive an "A" mold from said first track when in register therewith and similarly to receive a "B" mold from said second track when in register therewith, and actuating means for said transfer car operable in a way causing the car to bring each so received "A" mold into insertable relation with said elevator and likewise to bring each so received "B" mold into similar insertable relation with that elevator.

2. In a mold assembling installation, first and second pouring and cooling tracks laterally spaced from and generally parallel to each other, means at the entrance end of said first track for feeding assembled "A" type molds successively upon that track with accompanying pushing of other "A" molds thereahead on the track along said track towards the exit end thereof, means at the entrance end of said second track for feeding assembled "B" type molds successively upon that track with accompanying pushing of other "B" molds thereahead on the track along said track towards the exit end thereof, apparatus at the said exit ends of those first and second tracks there arranged to have "A" and "B" molds from those two tracks inserted thereinto, a transfer car intermediate said apparatus and the aforesaid track exit ends there disposed for movement back and forth between those two laterally spaced exit ends and being adapted to receive an "A" mold from said first track when in register therewith and similarly to receive a "B" mold from said second track when in register therewith, actuating means for said transfer car operable in a way causing the car to bring each so received "A" mold into insertable relation with said apparatus and likewise to bring each so received "B" mold into similar insertable relation with that apparatus, a first interlocking circuit organized to permit said "A" mold feeding means at the entrance end of said first track to be activated only when the aforementioned transfer car is in positional register with the said exit end of that first track and has thereon an empty space for receiving another "A" mold, and a second interlocking circuit organized to permit said "B" mold feeding means at the entrance end of said second track to be activated only when said transfer car is in positional register with the said exit end of that second track and has thereon an empty space for receiving another "B" mold.

3. In a mold assembling installation, first and second pouring and cooling tracks laterally spaced one from the other, means for advancing assembled and poured "A" type molds along said first track towards the exit end thereof, means for advancing assembled and poured "B" type molds along said second track towards the exit end thereof, apparatus at the said exit ends of those first and second tracks into which the "A" and "B" molds from those track exit ends can be inserted, a transfer car intermediate said apparatus and the aforesaid track ends there disposed for movement back and forth between those two laterally spaced exit ends and being adapted to receive an "A" mold from said first track when in register therewith and similarly to receive a "B" mold from said second track when in register therewith, actuating means for said transfer car operable in a way causing the car to bring each so received "A" mold into positional register with said apparatus and likewise to bring each so received "B" mold into similar positional register with that apparatus, and feed means for acting upon each of the "A" and "B" molds which said transfer car thus positionally registers with said apparatus, said feed means being effective to remove each so positioned mold from the car and to insert it into said apparatus.

4. In an installation comprising a mold assembling machine into which drag flasks charged with sand by apparatus at a low elevation are successively introduced at one station and rolled over in the machine and into which sand-charged cope flasks are successively introduced at another station and brought together with the rolled over drags to form assembled molds and from which machine those assembled molds are successively withdrawn at a further station, the combination of means communicating with said further station for receiving said assembled molds as there withdrawn and for pouring molten metal into each such received mold, a mold elevator functioning to receive each of the said poured molds and to separate the cope and drag flasks thereof and to lift those separated flasks to a raised elevation that is higher than said low-elevation drag charging apparatus at said one station, drag turnover apparatus organized to receive each separated drag flask from said elevator and to empty the castings therefrom incident to turnover movement imparted thereto, a drag shakeout also at said raised elevation which receives each emptied drag flask from said turnover apparatus, and a track inclining downwardly from said high elevation drag shakeout to said low elevation drag charging apparatus and serving to return each empty drag flask from the shakeout to that apparatus under the action of gravity.

5. In an installation comprising a mold assembling machine into which sand-charged drag flasks are successively introduced at one station and rolled over in the machine and into which cope flasks charged with sand by apparatus at a low elevation are successively introduced at another station and brought together with the rolled over drags to form assembled molds and from which machine those assembled molds are successively withdrawn at a further station, the combination of means communicating with said further station for receiving said assembled molds as there withdrawn and for pouring molten metal into each such received mold, a mold elevator functioning to receive each of the said poured molds and to separate the cope and drag flasks thereof and to lift those separated flasks to a raised elevation that is higher than said low-elevation cope charging apparatus at said other station, a cope shakeout also at said raised elevation organized to receive each separated cope flask from said elevator, and a track inclining downwardly from said high elevation cope shakeout to said low elevation cope charging apparatus and serving to return each empty cope flask from the shakeout to that apparatus under the action of gravity.

References Cited in the file of this patent
UNITED STATES PATENTS

| | | |
|---|---|---|
| 997,306 | Maclean | July 11, 1911 |
| 1,512,721 | Sutton | Oct. 21, 1924 |
| 1,970,779 | Spikerman et al. | Aug. 21, 1934 |
| 2,651,087 | Fellows | Sept. 8, 1953 |
| 2,767,865 | Lasater et al. | Oct. 23, 1956 |
| 2,798,267 | Anderson | July 9, 1957 |